United States Patent
Zeng et al.

(10) Patent No.: US 11,397,258 B2
(45) Date of Patent: Jul. 26, 2022

(54) METHOD, APPARATUS, AND SYSTEM FOR OUTDOOR TARGET TRACKING

(71) Applicants: Xiaolu Zeng, Beijing (CN); Feng Zhang, Greenbelt, MD (US); Beibei Wang, Clarksville, MD (US); K. J. Ray Liu, Potomac, MD (US); Oscar Chi-Lim Au, San Jose, CA (US); Chenshu Wu, Hong Kong (CN)

(72) Inventors: Xiaolu Zeng, Beijing (CN); Feng Zhang, Greenbelt, MD (US); Beibei Wang, Clarksville, MD (US); K. J. Ray Liu, Potomac, MD (US); Oscar Chi-Lim Au, San Jose, CA (US); Chenshu Wu, Hong Kong (CN)

(73) Assignee: ORIGIN WIRELESS, INC., Greenbelt, MD (US)

( * ) Notice: Subject to any disclaimer, the term of this patent is extended or adjusted under 35 U.S.C. 154(b) by 0 days.

(21) Appl. No.: 16/790,627

(22) Filed: Feb. 13, 2020

(65) Prior Publication Data
US 2020/0182995 A1 Jun. 11, 2020

Related U.S. Application Data

(63) Continuation-in-part of application No. 15/326,112, filed as application No. PCT/US2015/041037 on Jul. 17, 2015, application No. 16/790,627, which is a continuation-in-part of application No. 16/127,151, filed on Sep. 10, 2018, now Pat. No. 11,012,285, (Continued)

(51) Int. Cl.
G01S 13/72 (2006.01)
G01S 7/41 (2006.01)
G01S 13/00 (2006.01)

(52) U.S. Cl.
CPC ............ *G01S 13/723* (2013.01); *G01S 7/415* (2013.01); *G01S 13/003* (2013.01)

(58) Field of Classification Search
CPC combination set(s) only.
See application file for complete search history.

(56) References Cited

U.S. PATENT DOCUMENTS

| | | | |
|---|---|---|---|
| 9,735,940 B1 * | 8/2017 | Bakr | H04L 5/0053 |
| 2005/0116823 A1 * | 6/2005 | Paulsen | G01S 5/06 340/539.13 |

(Continued)

*Primary Examiner* — Zhiyu Lu

(57) ABSTRACT

Methods, apparatus and systems for outdoor target tracking are described. In one example, a described system comprises: a transmitter, a receiver, and a processor. The transmitter is configured for transmitting a first wireless signal through a wireless multipath channel. The receiver is configured for receiving a second wireless signal through the wireless multipath channel. One of the transmitter and the receiver is a located device at a known location. The other of the transmitter and the receiver is a moving device. The second wireless signal differs from the first wireless signal due to the wireless multipath channel which is impacted by a movement of the moving device. The processor is configured for: obtaining a plurality of time series of channel information of the wireless multipath channel based on the second wireless signal, computing a spatial-temporal information (STI), and tracking the moving device based on the STI.

25 Claims, 23 Drawing Sheets

Related U.S. Application Data which is a continuation-in-part of application No. PCT/US2017/021963, filed on Mar. 10, 2017, application No. 16/790,627, which is a continuation-in-part of application No. 16/127,092, filed on Sep. 10, 2018, now Pat. No. 10,476,730, which is a continuation-in-part of application No. PCT/US2017/021957, filed on Mar. 10, 2017, application No. 16/790,627, which is a continuation-in-part of application No. 16/125,748, filed on Sep. 9, 2018, now Pat. No. 10,833,912, which is a continuation-in-part of application No. PCT/US2017/015909, filed on Jan. 31, 2017, application No. 16/790,627, which is a continuation-in-part of application No. 15/861,422, filed on Jan. 3, 2018, now Pat. No. 11,025,475, and a continuation-in-part of application No. 16/200,608, filed on Nov. 26, 2018, now Pat. No. 10,735,298, and a continuation-in-part of application No. 16/200,616, filed on Nov. 26, 2018, now Pat. No. 10,495,725, and a continuation-in-part of application No. 16/446,589, filed on Jun. 19, 2019, now Pat. No. 10,742,475, which is a continuation-in-part of application No. 15/584,052, filed on May 2, 2017, now Pat. No. 10,447,094, and a continuation-in-part of application No. 15/434,813, filed on Feb. 16, 2017, now Pat. No. 10,129,862, said application No. 16/446,589 is a continuation-in-part of application No. PCT/US2017/027131, filed on Apr. 12, 2017, and a continuation-in-part of application No. 15/384,217, filed on Dec. 19, 2016, now Pat. No. 10,440,705, which is a continuation-in-part of application No. 16/060,710, filed as application No. PCT/US2016/066015 on Dec. 9, 2016, now Pat. No. 10,380,881, said application No. 16/446,589 is a continuation-in-part of application No. 15/873,806, filed on Jan. 17, 2018, now Pat. No. 10,270,642, and a continuation-in-part of application No. 16/101,444, filed on Aug. 11, 2018, now Pat. No. 10,291,460, and a continuation-in-part of application No. 16/203,299, filed on Nov. 28, 2018, now Pat. No. 10,374,863, and a continuation-in-part of application No. 16/203,317, filed on Nov. 28, 2018, now Pat. No. 10,397,039, application No. 16/790,627, which is a continuation-in-part of application No. 16/667,648, filed on Oct. 29, 2019, now Pat. No. 11,035,940, and a continuation-in-part of application No. 16/667,757, filed on Oct. 29, 2019, now abandoned.

(60) Provisional application No. 62/806,688, filed on Feb. 15, 2019, provisional application No. 62/806,694, filed on Feb. 15, 2019, provisional application No. 62/846,686, filed on May 12, 2019, provisional application No. 62/846,688, filed on May 12, 2019, provisional application No. 62/849,853, filed on May 18, 2019, provisional application No. 62/331,278, filed on May 3, 2016, provisional application No. 62/734,224, filed on Sep. 20, 2018, provisional application No. 62/744,093, filed on Oct. 10, 2018, provisional application No. 62/753,017, filed on Oct. 30, 2018, provisional application No. 62/868,782, filed on Jun. 28, 2019, provisional application No. 62/873,781, filed on Jul. 12, 2019, provisional application No. 62/900,565, filed on Sep. 15, 2019, provisional application No. 62/902,357, filed on Sep. 18, 2019, provisional application No. 62/950,093, filed on Dec. 18, 2019.

(56) References Cited

U.S. PATENT DOCUMENTS

| | | | | |
|---|---|---|---|---|
| 2008/0077326 | A1* | 3/2008 | Funk | G01C 21/165 701/500 |
| 2008/0248808 | A1* | 10/2008 | Alizadeh-Shabdiz | H04W 64/006 455/456.1 |
| 2012/0007779 | A1* | 1/2012 | Klepal | G01S 5/0252 342/451 |
| 2012/0319903 | A1* | 12/2012 | Huseth | G01S 3/74 342/386 |
| 2013/0332064 | A1* | 12/2013 | Funk | G01C 21/00 701/409 |
| 2014/0045520 | A1* | 2/2014 | Lim | H04W 4/023 455/456.1 |
| 2017/0013403 | A1* | 1/2017 | Sen | H04B 17/27 |

* cited by examiner

METHOD, APPARATUS, AND SYSTEM FOR OUTDOOR TARGET TRACKING

CROSS-REFERENCE TO RELATED APPLICATIONS

The present application hereby incorporates by reference the entirety of the disclosures of and claims priority to, each of the following cases:

(a) U.S. patent application Ser. No. 15/326,112, entitled "WIRELESS POSITIONING SYSTEMS", filed on Jan. 13, 2017,
  (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
(b) U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
  (1) which is a continuation-in-part of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
(c) U.S. patent application Ser. No. 16/127,092, entitled "METHODS, APPARATUS, SERVERS, AND SYSTEMS FOR HUMAN IDENTIFICATION BASED ON HUMAN RADIO BIOMETRIC INFORMATION", filed on Sep. 10, 2018,
  (1) Which is a continuation-in-part of PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017, published as WO2017/156487A1 on Sep. 14, 2017,
(d) U.S. patent application Ser. No. 16/125,748, entitled "METHODS, DEVICES, SERVERS, APPARATUS, AND SYSTEMS FOR WIRELESS INTERNET OF THINGS APPLICATIONS", filed on Sep. 9, 2018,
  (1) which is a continuation-in-part of PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017,
(e) U.S. patent application Ser. No. 15/861,422, entitled "METHOD, APPARATUS, SERVER, AND SYSTEMS OF TIME-REVERSAL TECHNOLOGY", filed on Jan. 3, 2018,
(f) U.S. Provisional Patent application 62/753,017, entitled "METHOD, APPARATUS, AND SYSTEM FOR HUMAN IDENTIFICATION BASED ON HUMAN RADIO BIOMETRIC INFORMATION", filed on Oct. 30, 2018,
(g) U.S. patent application Ser. No. 16/200,608, entitled "METHOD, APPARATUS, SERVER AND SYSTEM FOR VITAL SIGN DETECTION AND MONITORING", filed on Nov. 26, 2018,
(h) U.S. patent application Ser. No. 16/200,616, entitled "METHOD, APPARATUS, SERVER AND SYSTEM FOR REAL-TIME VITAL SIGN DETECTION AND MONITORING", filed on Nov. 26, 2018,
(i) U.S. Provisional Patent application 62/806,688, entitled "METHOD, APPARATUS, AND SYSTEM FOR WIRELESS GAIT RECOGNITION", filed on Feb. 15, 2019,
(j) U.S. Provisional Patent application 62/806,694, entitled "METHOD, APPARATUS, AND SYSTEM FOR OUTDOOR TARGET TRACKING", filed on Feb. 15, 2019,
(k) U.S. Provisional Patent application 62/846,686, entitled "METHOD, APPARATUS, AND SYSTEM FOR WIRELESS INERTIAL MEASUREMENT", filed on May 12, 2019,
(l) U.S. Provisional Patent application 62/846,688, entitled "Method, Apparatus, and System for Processing and Presenting Life Log based on a Wireless Signal", filed on May 12, 2019,
(m) U.S. Provisional Patent application 62/849,853, entitled "Method, Apparatus, and System for Wireless Artificial Intelligent in Smart Car", filed on May 18, 2019,
(n) U.S. patent application Ser. No. 16/446,589, entitled "METHOD, APPARATUS, AND SYSTEM FOR OBJECT TRACKING AND SENSING USING BROADCASTING", filed on Jun. 19, 2019,
  (1) which is a Continuation-in-Part of U.S. patent application Ser. No. 15/326,112, entitled "WIRELESS POSITIONING SYSTEMS", filed on Jan. 13, 2017,
    a. which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
  (2) which is a Continuation-in-Part of U.S. patent application Ser. No. 15/584,052, entitled "METHOD, SYSTEM, AND APPARATUS FOR WIRELESS POWER TRANSMISSION BASED ON POWER WAVEFORMING", filed on May 2, 2017,
    a. which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
  (3) which is a Continuation-in-Part of U.S. patent application Ser. No. 15/434,813, entitled "METHODS, DEVICES, APPARATUS, AND SYSTEMS FOR MEDIUM ACCESS CONTROL IN WIRELESS COMMUNICATION SYSTEMS UTILIZING SPATIAL FOCUSING EFFECT", filed on Feb. 16, 2017, issued as U.S. Pat. No. 10,129,862 on Nov. 13, 2018,
  (4) which is a Continuation-in-Part of U.S. patent application Ser. No. 16/127,151, entitled "METHODS, APPARATUS, SERVERS, AND SYSTEMS FOR VITAL, SIGNS DETECTION AND MONITORING", filed on Sep. 10, 2018,
    a. which is a national stage entry of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
  (5) which is a Continuation-in-Part of U.S. patent application Ser. No. 16/127,092, entitled "METHODS, APPARATUS, SERVERS, AND SYSTEMS FOR HUMAN IDENTIFICATION BASED ON HUMAN RADIO BIOMETRIC INFORMATION", filed on Sep. 10, 2018,
  a. which is a continuation-in-part of PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017, published as WO2017/156487A1 on Sep. 14, 2017,
(6) which is a Continuation-in-Part of PCT patent application PCT/US2017/027131, entitled "METHODS, APPARATUS, SERVERS, AND SYSTEMS FOR OBJECT TRACKING", filed on Apr. 12, 2017, published as WO2017/180698A1 on Oct. 19, 2017,
(7) which is a Continuation-in-Part of U.S. patent application Ser. No. 15/384,217, entitled "METHOD, APPARATUS, SERVER, AND SYSTEMS OF TIME-REVERSAL TECHNOLOGY", filed on Dec. 19, 2016, published as US2017/0188359A1 on Jun. 29, 2017,
(8) which is a Continuation-in-Part of U.S. patent application Ser. No. 16/125,748, entitled "METHODS, DEVICES, SERVERS, APPARATUS, AND SYSTEMS FOR WIRELESS INTERNET OF THINGS APPLICATIONS", filed on Sep. 9, 2018,
  a. which is a national stage entry of PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017,
(9) which is a Continuation-in-Part of U.S. patent application Ser. No. 15/861,422, entitled "METHOD, APPARATUS, SERVER, AND SYSTEMS OF TIME-REVERSAL TECHNOLOGY", filed on Jan. 3, 2018,
(10) which is a Continuation-in-Part of U.S. patent application Ser. No. 16/060,710, entitled "METHOD, APPARATUS, AND SYSTEMS FOR WIRELESS EVENT DETECTION AND MONITORING", filed on Jun. 8, 2018,
  a. which is a national stage entry of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017,
(11) which is a Continuation-in-Part of U.S. patent application Ser. No. 15/873,806, entitled "METHOD, APPARATUS, AND SYSTEM FOR OBJECT TRACKING AND NAVIGATION", filed on Jan. 17, 2018, issued as U.S. Pat. No. 10,270,642 on Apr. 23, 2019,
(12) which is a Continuation-in-Part of U.S. patent application Ser. No. 16/101,444, entitled "METHOD, APPARATUS, AND SYSTEM FOR WIRELESS MOTION MONITORING", filed on Aug. 11, 2018, issued as U.S. Pat. No. 10,291,460 on May 14, 2019,
(13) which claims priority to U.S. Provisional Patent application 62/734,224, entitled "METHOD, APPARATUS, AND SYSTEM FOR WIRELESS SLEEP MONITORING", filed on Sep. 20, 2018,
(14) which claims priority to U.S. Provisional Patent application 62/744,093, entitled "METHOD, APPARATUS, AND SYSTEM FOR WIRELESS PROXIMITY AND PRESENCE MONITORING", filed on Oct. 10, 2018,
(15) which claims priority to U.S. Provisional Patent application 62/753,017, entitled "METHOD, APPARATUS, AND SYSTEM FOR HUMAN IDENTIFICATION BASED ON HUMAN RADIO BIOMETRIC INFORMATION", filed on Oct. 30, 2018,
(16) which is a Continuation-in-Part of U.S. patent application Ser. No. 16/200,608, entitled "METHOD, APPARATUS, SERVER AND SYSTEM FOR VITAL SIGN DETECTION AND MONITORING", filed on Nov. 26, 2018,
(17) which is a Continuation-in-Part of U.S. patent application Ser. No. 16/200,616, entitled "METHOD, APPARATUS, SERVER AND SYSTEM FOR REAL-TIME VITAL SIGN DETECTION AND MONITORING", filed on Nov. 26, 2018,
(18) which is a Continuation-in-Part of U.S. patent application Ser. No. 16/203,299, entitled "APPARATUS, SYSTEMS AND METHODS FOR EVENT RECOGNITION BASED ON A WIRELESS SIGNAL", filed on Nov. 28, 2018,
(19) which is a Continuation-in-Part of U.S. patent application Ser. No. 16/203,317, entitled "APPARATUS, SYSTEMS AND METHODS FOR FALL-DOWN DETECTION BASED ON A WIRELESS SIGNAL", filed on Nov. 28, 2018,
(20) which claims priority to U.S. Provisional Patent application 62/806,688, entitled "METHOD, APPARATUS, AND SYSTEM FOR WIRELESS GAIT RECOGNITION", filed on Feb. 15, 2019,
(21) which claims priority to U.S. Provisional Patent application 62/806,694, entitled "METHOD, APPARATUS, AND SYSTEM FOR OUTDOOR TARGET TRACKING", filed on Feb. 15, 2019,
(22) which claims priority to U.S. Provisional Patent application 62/846,686, entitled "METHOD, APPARATUS, AND SYSTEM FOR WIRELESS INERTIAL MEASUREMENT", filed on May 12, 2019,
(23) which claims priority to U.S. Provisional Patent application 62/846,688, entitled "Method, Apparatus, and System for Processing and Presenting Life Log based on a Wireless Signal", filed on May 12, 2019,
(24) which claims priority to U.S. Provisional Patent application 62/849,853, entitled "Method, Apparatus, and System for Wireless Artificial Intelligent in Smart Car", filed on May 18, 2019,
(o) U.S. Provisional Patent application 62/868,782, entitled "METHOD, APPARATUS, AND SYSTEM FOR VITAL SIGNS MONITORING USING HIGH FREQUENCY WIRELESS SIGNALS", filed on Jun. 28, 2019,
(p) U.S. Provisional Patent application 62/873,781, entitled "METHOD, APPARATUS, AND SYSTEM FOR IMPROVING TOPOLOGY OF WIRELESS SENSING SYSTEMS", filed on Jul. 12, 2019,
(q) U.S. Provisional Patent application 62/900,565, entitled "QUALIFIED WIRELESS SENSING SYSTEM", filed on Sep. 15, 2019,
(r) U.S. Provisional Patent application 62/902,357, entitled "METHOD, APPARATUS, AND SYSTEM FOR AUTOMATIC AND OPTIMIZED DEVICE-TO-CLOUD CONNECTION FOR WIRELESS SENSING", filed on Sep. 18, 2019, (s) U.S. patent application Ser. No. 16/667,648, entitled "METHOD, APPARATUS, AND SYSTEM FOR WIRELESS PROXIMITY AND PRESENCE MONITORING", filed on Oct. 29, 2019, (t) U.S. patent application Ser. No. 16/667,757, entitled "METHOD, APPARATUS, AND SYSTEM FOR HUMAN IDENTIFICATION BASED ON HUMAN RADIO BIOMETRIC INFORMATION", filed on Oct. 29, 2019, (u) U.S. Provisional Patent application 62/950,093, entitled "METHOD, APPARATUS, AND SYSTEM FOR TARGET POSITIONING", filed on Dec. 18, 2019.

TECHNICAL FIELD

The present teaching generally relates to outdoor target tracking. More specifically, the present teaching relates to localizing and tracking targets outdoor, based on wireless channel information obtained from a massive multiple-input multiple-output (MIMO) system.

BACKGROUND

Target localization and tracking including indoor and outdoor have been the interest of corresponding researchers over several decades because of their crucial roles in modern navigation and search-rescue system. In general, accurate indoor localization system can greatly improve people's life such as navigating a passenger to the airport gate, helping customers to find their favorite items in a big mall. Moreover, it can also guide the programmed robots to move heavy objects to our desirable destination, which can not only emancipate people from the boring and time wasting work but also greatly improve the efficiency of modern automatic production line. On the other hand, a reliable outdoor location system such as the most famous global positioning system (GPS) has been widely used in civil, military and commercial applications all over the world. However, GPS requires an unobstructed line-of-sight (LOS) path to at least four GPS satellites to compute the location of corresponding targets. GPS resource which can be utilized by civil and commercial services are strictly limited. Thus, it only provides 10 meters accuracy in daily activities although centimeter.

Generally, outdoor localization method use direction-of-arrival (DOA) to measure the bearing while time-of-arrival (TOA) to compute the range of the target with respect to the receiver. Evidently, they require accurate time measurements which are very sensitive to the distortion and noise in practice. Moreover, outdoor localization performance based on DOA and AOA is also strongly limited by its angular resolution which is related to the aperture, dimension and elements of the antenna deployed. Existing methods computed the source location from the data directly. To get a more accurate result, they often call for data association or center fusion process, which turns to be an NP-hard problem usually. Finding the optimal solution for such a kind of questions is either computation prohibited or requiring special devices.

Recently, a fifth regeneration (5G) technology called massive MIMO is introduced to mainly focus on communication related problems such as spectral efficiency, resource allocation, communication complexity, inner user interference, channel capacity and estimation. However, related work about how to use massive MIMO to develop an efficient way for outdoor target localization and tracking is still open.

Navigation systems have been widely used in modern applications, among which GPS is the most popular one. However, GPS cannot work well in non-line-of-sight (NLOS) situation because of its requirement of an unobstructed line-of-sight (LOS) to four or more GPS satellites. As a result, inertial navigation system (INS) has been regarded as a supplement of GPS because it is a self-contained navigation technique. In an INS, moving speed and direction estimations are necessary to dead reckon the position of a moving object. As a result, how to estimate the moving speed and direction of a target has also been studied.

Accelerometer, gyroscope and magnetometer are the three most commonly used sensors in an INS. In general, INS adopts certain data fusion methods to jointly use the information extracted from different sensors to estimate the moving speed and direction of the target. They can be accurate when the target is relatively stable. However, they suffer from the unavoidable mechanical resistance or magnetic interference, which causes accumulative errors from the truth, especially over a long time.

Vision/image based method aided by camera devices is another kind of popular ways to detect the moving speed and direction for metro vehicles. For example, the continuous image sequences of the road surface texture are analyzed to get the vehicle speed and direction estimations. To solve the high frame rate requirement, two parallel vehicle-borne devices are adopted to take the images simultaneously. Then, the vehicle speed and moving direction are extracted by image matching and parameter calibration schemes. Although those vision based methods can achieve good accuracy after rounds of improvement, their requirements of sufficient image resolution and computational power becomes a bottleneck in real-time applications.

In addition, a fifth regeneration (5G) network will be deployed with ultra-wide bandwidths at Giga-Hertz frequency and large antenna arrays to offer Giga-Hertz data rates. But no effective positioning method has been disclosed for 5G networks.

Thus, existing systems and methods for target positioning and tracking are not entirely satisfactory, and it is desirable for supplementary technologies that can enable high accuracy outdoor localization.

SUMMARY

The present teaching generally relates to localizing and tracking a target outdoor, based on wireless channel information obtained from a massive multiple-input multiple-output (MIMO) system.

In one embodiment, a tracking system is described. The tracking system comprises: a transmitter, a receiver, and a processor. The transmitter is configured for transmitting a first wireless signal through a wireless multipath channel. The receiver is configured for receiving a second wireless signal through the wireless multipath channel between the transmitter and the receiver. One of the transmitter and the receiver is a located device at a known location. The other of the transmitter and the receiver is a moving device. The second wireless signal differs from the first wireless signal due to the wireless multipath channel which is impacted by a movement of the moving device. At least one of the transmitter and the receiver comprises a number of antennas. The number is larger than a threshold. The processor is configured for: obtaining a plurality of time series of channel information (CI) of the wireless multipath channel based on the second wireless signal, computing a spatial-temporal information (STI) of the moving device based on at least one of: the plurality of time series of CI (TSCI) and a past STI, and tracking the moving device based on the STI. According to various embodiments, the processor may be physically coupled to at least one of the transmitter and the receiver.

In one embodiment, an additional transmitter may be installed at a reset location (e.g. an entrance, or at the top of a door frame) where it repeatedly broadcast an additional wireless signals into a particular area (e.g. the door opening). The additional wireless signals serve like a beacon from a lighthouse. Any receiver receiving the beacon signal knows where it is.

A location is near the target area and adaptively determined based on at least one of: a height of the moving device and a likelihood of the height. The additional transmitter may be at the top of a door frame aiming the beacon signal downward. The coverage area is basically a beam or a cone, which has a relatively large uncertainty of the location of the receiver. If the height of the receiver (moving device) is known, the location of the moving device can be refined. In other words, the coverage area can be narrowed based on the height.

In one embodiment, the additional transmitter is stationary. In another embodiment, the additional transmitter (and/or the transmitter) is not stationary and does not use directional antenna. Instead, the additional transmitter (and/or the transmitter) may move around and use an omni-antenna. The additional transmitter (and/or the transmitter) has a way to obtain its instantaneous location (e.g. based on GPS, Bluetooth). When the receiver receives the beacon signal from the additional transmitter (and/or the transmitter), it can obtain a "reset" location based on the instantaneous location of the additional transmitter (and/or the transmitter). There may be a server (location database) that keep track of the instantaneous location of the additional transmitter (and/or the transmitter) and share the location with the moving device.

In one embodiment, the object may have a complex motion (e.g. both leg motion and hand motion). The wireless signal may capture the leg motions of a person and the additional wireless signal may capture the hand motions of the person.

In one embodiment, only one wearable receiver receiving sounding signals from two different transmitters. As the multipaths are different, the two received wireless (sounding) signal may be dominated by different motions of the person. If one transmitter is at a lower position, the wireless signal may capture predominantly the foot/leg motion. Perhaps the second transmitter is at a high position such that the second wireless signal may capture predominant the hand motion.

In another embodiment, an apparatus for object tracking is disclosed. The described apparatus comprises: a processor and at least one of the transmitter and the receiver. The transmitter is configured for transmitting a first wireless signal through a wireless multipath channel. The receiver is configured for receiving a second wireless signal through the wireless multipath channel. One of the transmitter and the receiver is a located device. The other of the transmitter and the receiver is a moving device moving with an object. The second wireless signal differs from the first wireless signal due to the wireless multipath channel which is impacted by a movement of the object. At least one of the transmitter and the receiver comprises at least 16 antennas. The processor is configured for: obtaining a plurality of time series of channel information (CI) of the wireless multipath channel based on the second wireless signal, computing an intermediate quantity (IQ) of a current movement of the moving device based on a set of similarity scores associated with many pairs of CI of the plurality of time series of CI (TSCI), each pair comprising two temporally adjacent CI of a TSCI of the plurality of TSCI, computing a spatial-temporal information (STI) of the current movement of the moving device based on at least one of the IQ, the plurality of TSCI, a time quantity associated with the current movement, a past IQ, and a past STI, and tracking, based on the STI, at least one of: the moving device and the object.

In one embodiment, the apparatus includes the receiver but not the transmitter. The receiver receives the second wireless signal and extracts the CI, e.g. a channel state information (CSI), for performing the object tracking. In another embodiment, the apparatus includes the transmitter but not the receiver. The CSI is extracted by the receiver and obtained by the processor for object tracking. In still another embodiment, the apparatus includes the transmitter but not the receiver. The CSI is extracted at the receiver that sends the CSI to the transmitter. The object tracking is performed at the transmitter.

In a different embodiment, a method is described. The method comprises: obtaining a plurality of time series of channel information (CI) of a wireless multipath channel, using a processor, a memory communicatively coupled with the processor, and a set of instructions stored in the memory to be executed by the processor. The plurality of time series of CI (TSCI) are extracted from a wireless signal transmitted between a transmitter and a receiver through the wireless multipath channel. Each of the plurality of TSCI is associated with a pair of a transmit antenna on the transmitter and a receive antenna on the receiver. One of the transmitter and the receiver is a located device at a known location. The other of the transmitter and the receiver is a moving device moving with an object. The wireless multipath channel is impacted by a movement of the object. At least one of the transmitter and the receiver comprises more than 16 antennas. The method further comprises' computing a spatial-temporal information (STI) of the moving device based on at least one of: the plurality of TSCI and a past STI, and tracking the object based on the STI.

Other concepts relate to software for implementing the present teaching on wireless object tracking in a rich-scattering environment. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1:
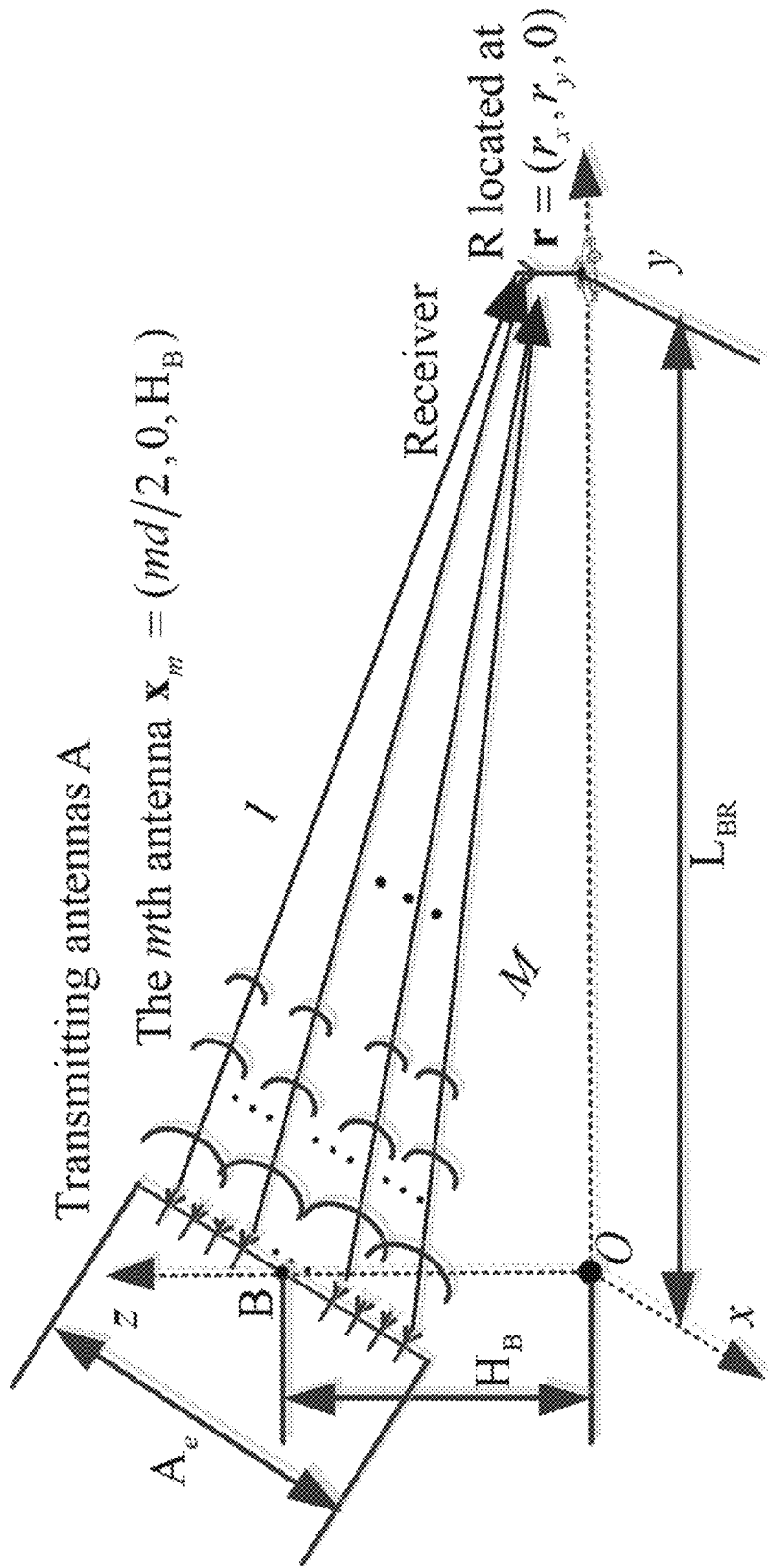
FIG. 1 illustrates an exemplary set-up for a base station with massive MIMO antennas, according to one embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In one embodiment, the present teaching discloses a method, apparatus, device, system, and/or software (method/apparatus/device/system/software) of a wireless monitoring system. A time series of channel information (CI) of a wireless multipath channel (channel) may be obtained (e.g. dynamically) using a processor, a memory communicatively coupled with the processor and a set of instructions stored in the memory. The time series of CI (TSCI) may be extracted from a wireless signal (signal) transmitted between a Type 1 heterogeneous wireless device (e.g. wireless transmitter, TX) and a Type 2 heterogeneous wireless device (e.g. wireless receiver, RX) in a venue through the channel. The channel may be impacted by an expression (e.g. motion, movement, expression, and/or change in position/pose/shape/expression) of an object in the venue. A characteristics and/or a spatial-temporal information (STI, e.g. motion information) of the object and/or of the motion of the object may be monitored based on the TSCI. A task may be performed based on the characteristics and/or STI. A presentation associated with the task may be generated in a user-interface (UI) on a device of a user. The TSCI may be a wireless signal stream. The TSCI or each CI may be preprocessed. A device may be a station (STA). The symbol "A/B" means "A and/or B" in the present teaching.

The expression may comprise placement, placement of moveable parts, location, position, orientation, identifiable place, region, spatial coordinate, presentation, state, static expression, size, length, width, height, angle, scale, shape, curve, surface, area, volume, pose, posture, manifestation, body language, dynamic expression, motion, motion sequence, gesture, extension, contraction, distortion, deformation, body expression (e.g. head, face, eye, mouth, tongue, hair, voice, neck, limbs, arm, hand, leg, foot, muscle, moveable parts), surface expression (e.g. shape, texture, material, color, electromagnetic (EM) characteristics, visual pattern, wetness, reflectance, translucency, flexibility), material property (e.g. living tissue, hair, fabric, metal, wood, leather, plastic, artificial material, solid, liquid, gas, temperature), movement, activity, behavior, change of expression, and/or some combination.

The wireless signal may comprise: transmitted/received signal, EM radiation, RF signal/transmission, signal in licensed/unlicensed/ISM band, bandlimited signal, baseband signal, wireless/mobile/cellular communication signal, wireless/mobile/cellular network signal, mesh signal, light signal/communication, downlink/uplink signal, unicast/multicast/broadcast signal, standard (e.g. WLAN, WWAN, WPAN, WBAN, international, national, industry, defacto, IEEE, IEEE 802, 802.11/15/16, WiFi, 802.11n/ac/ax/be, 3G/4G/LTE/5G/6G/7G/8G, 3GPP, Bluetooth, BLE, Zigbee, RFID, UWB, WiMax) compliant signal, protocol signal, standard frame, beaconipilot/probe/enquiryiacknowledgement/handshake/synchronization signal, management/control/data frame, management/control/data signal, standardized wireless/cellular communication protocol, reference signal, source signal, motion probe/detection/sensing signal, and/or series of signals. The wireless signal may comprise a line-of-sight (LOS), and/or a non-LOS component (or path/link). Each CI may be extracted/generated/computed/sensed at a layer (e.g. PHY/MAC layer in OSI model) of Type 2 device and may be obtained by an application (e.g. software, firmware, driver, app, wireless monitoring software/system).

The wireless multipath channel may comprise: a communication channel, analog frequency channel (e.g. with analog carrier frequency near 700/800/900 MHz, 1.8/1.8/2.4/3/5/6/27/60 GHz), coded channel (e.g. in CDMA), and/or channel of a wireless network/system (e.g. WLAN, WiFi, mesh, LTE, 4G/5G, Bluetooth, Zigbee, UWB, RFID, microwave). It may comprise more than one channel. The channels may be consecutive (e.g. with adjacent/overlapping bands) or non-consecutive channels (e.g. non-overlapping WiFi channels, one at 2.4 GHz and one at 5 GHz).

The TSCI may be extracted from the wireless signal at a layer of the Type 2 device (e.g. a layer of OSI reference model, physical layer, data link layer, logical link control layer, media access control (MAC) layer, network layer, transport layer, session layer, presentation layer, application layer, TCP/IP layer, internet layer, link layer). The TSCI may be extracted from a derived signal (e.g. baseband signal, motion detection signal, motion sensing signal) derived from the wireless signal (e.g. RF signal). It may be (wireless) measurements sensed by the communication protocol (e.g. standardized protocol) using existing mechanism (e.g. wireless/cellular communication standard/network, 3G/LTE/4G/5G/6G/7G/8G, WiFi, IEEE 802.11/15/16). The derived signal may comprise a packet with at least one of: a preamble, a header and a payload (e.g. for data/control/management in wireless links/networks). The TSCI may be extracted from a probe signal (e.g. training sequence, STF, LTF, L-STF, L-LTF, L-SIG, HE-STF, HE-LTF, HE-SIG-A, HE-SIG-B, CEF) in the packet. A motion detection/sensing signal may be recognized/identified base on the probe signal. The packet may be a standard-compliant protocol frame, management frame, control frame, data frame, sounding frame, excitation frame, illumination frame, null data frame, beacon frame, pilot frame, probe frame, request frame, response frame, association frame, reassociation frame, disassociation frame, authentication frame, action frame, report frame, poll frame, announcement frame, extension frame, enquiry frame, acknowledgement frame, RTS frame, CTS frame, QoS frame, CF-Poll frame, CF-Ack frame, block acknowledgement frame, reference frame, training frame, and/or synchronization frame.

The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network) may be used to store the TSCI, characteristics, STI, signatures, patterns, behaviors, trends, parameters, analytics, output responses, identification information, user information, device information, channel information, venue (e.g. map, environmental model, network, proximity devices/networks) information, task information, class/category information, presentation (e.g. UI) information, and/or other information.

The Type 1/Type 2 device may comprise at least one of: electronics, circuitry, transmitter (TX)/receiver (RX)/transceiver, RF interface, "Origin Satellite"/"Tracker Bot", unicast/multicast/broadcasting device, wireless source device, source/destination device, wireless node, hub device, target device, motion detection device, sensor device, remote/wireless sensor device, wireless communication device, wireless-enabled device, standard compliant device, and/or receiver. The Type 1 (or Type 2) device may be heterogeneous because, when there are more than one instances of Type 1 (or Type 2) device, they may have different circuitry, enclosure, structure, purpose, auxiliary functionality, chip/IC, processor, memory, software, firmware, network connectivity, antenna, brand, model, appearance, form, shape, color, material, and/or specification. The Type 1/Type 2 device may comprise: access point, router, mesh router, internet-of-things (IoT) device, wireless terminal, one or more radio/RF subsystem/wireless interface (e.g. 2.4 GHz radio, 5 GHz radio, front haul radio, backhaul radio), modem, RF front end, RF/radio chip or integrated circuit (IC).

At least one of: Type 1 device, Type 2 device, a link between them, the object, the characteristics, the STI, the monitoring of the motion, and the task may be associated with an identification (ID) such as UUID The Type 1/Type 2/another device may obtain/store/retrieve/access/preprocess/condition/process/analyze/monitor/apply the TSCI. The Type 1 and Type 2 devices may communicate network traffic in another channel (e.g. Ethernet, HDMI, USB, Bluetooth, BLE, WiFi, LTE, other network, the wireless multipath channel) in parallel to the wireless signal. The Type 2 device may passively observe/monitor/receive the wireless signal from the Type 1 device in the wireless multipath channel without establishing connection (e.g. association/authentication) with, or requesting service from, the Type 1 device.

The transmitter (i.e. Type 1 device) may function as (play role of) receiver (i.e. Type 2 device) temporarily, sporadically, continuously, repeatedly, interchangeably, alternately, simultaneously, concurrently, and/or contemporaneously; and vice versa. A device may function as Type 1 device (transmitter) and/or Type 2 device (receiver) temporarily, sporadically, continuously, repeatedly, simultaneously, concurrently, and/or contemporaneously. There may be multiple wireless nodes each being Type 1 (TX) and/or Type 2 (RX) device. A TSCI may be obtained between every two nodes when they exchange/communicate wireless signals. The characteristics and/or STI of the object may be monitored individually based on a TSCI, or jointly based on two or more (e.g. all) TSCI.

The motion of the object may be monitored actively (in that Type 1 device, Type 2 device, or both, are wearable of/associated with the object) and/or passively (in that both Type 1 and Type 2 devices are not wearable of/associated with the object). It may be passive because the object may not be associated with the Type 1 device and/or the Type 2 device. The object (e.g. user, an automated guided vehicle or AGV) may not need to carry/install any wearables/fixtures (i.e. the Type 1 device and the Type 2 device are not wearable/attached devices that the object needs to carry in order perform the task). It may be active because the object may be associated with either the Type 1 device and/or the Type 2 device. The object may carry (or installed) a wearable/a fixture (e.g. the Type 1 device, the Type 2 device, a device communicatively coupled with either the Type 1 device or the Type 2 device).

The presentation may be visual, audio, image, video, animation, graphical presentation, text, etc. A computation of the task may be performed by a processor (or logic unit) of the Type 1 device, a processor (or logic unit) of an IC of the Type 1 device, a processor (or logic unit) of the Type 2 device, a processor of an IC of the Type 2 device, a local server, a cloud server, a data analysis subsystem, a signal analysis subsystem, and/or another processor. The task may be performed with/without reference to a wireless fingerprint or a baseline (e.g. collected, processed, computed, transmitted and/or stored in a training phase/survey/current survey/previous survey/recent survey/initial wireless survey, a passive fingerprint), a training, a profile, a trained profile, a static profile, a survey, an initial wireless survey, an initial setup, an installation, a re-training, an updating and a reset.

The Type 1 device (TX device) may comprise at least one heterogeneous wireless transmitter. The Type 2 device (RX device) may comprise at least one heterogeneous wireless receiver. The Type 1 device and the Type 2 device may be collocated. The Type 1 device and the Type 2 device may be the same device. Any device may have a data processing unit/apparatus, a computing unit/system, a network unit/system, a processor (e.g. logic unit), a memory communicatively coupled with tie processor, and a set of instructions stored in the memory to be executed by the processor. Some processors, memories and sets of instructions may be coordinated.

There may be multiple Type 1 devices interacting (e.g. communicating, exchange signal/control/notification/other data) with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/Type 2 devices may operate independently and/or collaboratively. A Type 1 and/or Type 2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device).

Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type 2 device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling (e.g. association, authentication) from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second Type 2 device (or between the Type 2 device and the second Type 1 device) through the channel. A second TSCI of the channel extracted from the second signal may be obtained. The second signal may be the first signal. The characteristics, STI and/or another quantity of the object may be monitored based on the second TSCI The Type 1 device and the Type 2 device may be the same. The characteristics, STI and/or another quantity with different time stamps may form a waveform. The waveform may be displayed in the presentation.

The wireless signal and/or another signal may have data embedded. The wireless signal may be a series of probe signals (e.g. a repeated transmission of probe signals, a re-use of one or more probe signals). The probe signals may change/vary over time. A probe signal may be a standard compliant signal, protocol signal, standardized wireless protocol signal, control signal, data signal, wireless communication network signal, cellular network signal, WiFi signal, LTE/5G/6G/7G signal, reference signal, beacon signal, motion detection signal, and/or motion sensing signal. A probe signal may be formatted according to a wireless network standard (e.g. WiFi), a cellular network standard (e.g. LTE/5G/6G), or another standard. A probe signal may comprise a packet with a header and a payload. A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the STI (e.g. motion information), initial STI, initial time, direction, instantaneous location, instantaneous angle, and/or speed, of the object.

The processor, the memory and/or the set of instructions may be associated with the Type 1 device, one of the at least one Type 2 device, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (e.g. association, authentication) with any Type 2 device, and without any Type 2 device requesting services from the Type 1 device. The Type 1 device may transmit to a particular media access control (MAC) address common for more than one Type 2 devices. Each Type 2 device may adjust its MAC address to the particular MAC address. The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals.

For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-storey building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address.

A location of a Type 2 device in the venue may be computed based on the particular MAC address, the series of probe signals, and/or the at least one TSCI obtained by the Type 2 device from the probe signals. The computing may be performed by the Type 2 device.

The particular MAC address may be changed (e.g. adjusted, varied, modified) over time. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan. The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel.

The selected channel may be changed (e.g. adjusted, varied, modified) over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, WiFi, NFC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection (e.g. association, authentication) between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device. The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection (e.g. association, authentication) with any Type 2 device. The Type 1 device may reply to the third special signal by transmitting a fourth handshake signal to the another device. The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device. The another device may not communicate (or suspend communication) with the Type 1 device after establishing connection with the Type 1 device. Suspended communication may be resumed. The another device may enter an inactive mode, hibernation mode, sleep mode, stand-by mode, low-power mode, OFF mode and/or power-down mode, after establishing the connection with the Type 1 device. The another device may have the particular MAC address so that the Type 1 device sends the signal to the particular MAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue. A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection (e.g. association, authentication) established between the Type 1 device and any Type 2 device. The first and second antennas may be same/different.

The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device. Some first Type 2 device(s) and some second Type 2 device(s) may be the same. The first and second series of probe signals may be synchronous/asynchronous. A probe signal may be transmitted with data or replaced by a data signal. The first and second antennas may be the same.

The first series of probe signals may be transmitted at a first rate (e.g. 30 Hz). The second series of probe signals may be transmitted at a second rate (e.g. 200 Hz). The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time.

The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time. Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), identifier, household, house, physical address, location, geographic coordinate, IP subnet, SSID, home device, office device, and/or manufacturing device.

Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device.

The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for switching signal source, and/or information of a user, account, access info, parameter, characteristics, and/or signal strength (e.g. associated with the Type 1 device and/or the respective Type 2 receiver).

Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g. between current probe signal and immediate past probe signal, or between next probe signal and current probe signal) received from current signal source of the Type 2 device exceeds a first threshold; (2) signal strength associated with current signal source of the Type 2 device is below a second threshold, (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1.1, 1.2, or 1.5) of the current signal source.

If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices. A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01 s for 100 Hz), but each probe signal may experience small time perturbation, perhaps due to timing requirement, timing control, network control, handshaking, message passing, collision avoidance, carrier sensing, congestion, availability of resources, and/or another consideration.

The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds). In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying) A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals. In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually.

The characteristics and/or STI (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, environmental model of the venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID), SSID, network characteristics, network settings, and/or network parameters, etc.

The two channels may be associated with different kinds of wireless system (e.g. two of the following: WiFi, LTE, LTE-A, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth, BLE, RFID, UWB, microwave system, radar like system). For example, one is WiFi and the other is LTE.

The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events. A CI or TSCI associated with an event may be considered/ may comprise a wireless sample/characteristics/fingerprint associated with the event (and/or the venue, the environment, the object, the motion of the object, a state/emotional state/mental state/condition/stage/gesture/gait/action/movement/activity/daily activity/history/event of the object, etc.).

For each of the multiple known events happening in the venue in a respective training (e.g. surveying, wireless survey, initial wireless survey) time period associated with the known event, a respective training wireless signal (e.g. a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed. The training may be a wireless survey (e.g. during installation of Type 1 device and/or Type 2 device).

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the channel in the venue in the current time period associated with the current event.

At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may partition TSCI (or the characteristics/STI or other analytics or output responses) into clusters and associate the clusters to specific events/objects/subjects/locations/movements/activities. Labels/tags may be generated for the clusters. The clusters may be stored and retrieved. The classifier may be applied to associate the current TSCI (or characteristics/STI or the other analytics/output response, perhaps associated with a current event) with, a cluster, a known/specific event, a class/category/group/grouping/list/cluster/set of known events/subjects/locations/movements/activities, an unknown event, a class/category/group/grouping/list/cluster/set of unknown events/subjects/locations/movements/activities, and/or another even/subject/location/movement/activity/class/category/group/grouping/list/cluster/set. Each TSCI may comprise at least one CI each associated with a respective timestamp. Two TSCI associated with two Type 2 devices may be different with different: starting time, duration, stopping time, amount of CI, sampling frequency, sampling period. Their CI may have different features. The first and second Type 1 devices may be at same location in the venue. They may be the same device. The at least one second Type 2 device (or their locations) may be a permutation of the at least one first Type 2 device (or their locations). A particular second Type 2 device and a particular first Type 2 device may be the same device.

A subset of the first Type 2 device and a subset of the second Type 2 device may be the same. The at least one second Type 2 device and/or a subset of the at least one second Type 2 device may be a subset of the at least one first Type 2 device. The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device. The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first TSCI and a second section of a second time duration of the second section of the second TSCI may be aligned. A map between items of the first section and items of the second section may be computed. The first section may comprise a first segment (e.g. subset) of the first TSCI with a first starting/ending time, and/or another segment (e.g. subset) of a processed first TSCI. The processed first TSCI may be the first TSCI processed by a first operation. The second section may comprise a second segment (e.g. subset) of the second TSCI with a second starting time and a second ending time, and another segment (e.g. subset) of a processed second TSCI. The processed second TSCI may be the second TSCI processed by a second operation. The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many. At least one function of at least one of the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration. A section of a time duration of a TSCI may be determined adaptively (and/or dynamically). A tentative section of the TSCI may be computed. A starting time and an ending time of a section (e.g. the tentative section, the section) may be determined. The section may be determined by removing a beginning portion and an ending portion of the tentative section. A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time T1 may comprise at least one of: (1) a first function of the item at time T1 and an item at time T1−D1, wherein D1 is a pre-determined positive quantity (e.g. a constant time offset), (2) a second function of the item at time T1 and an item at time T1+D1, (3) a third function of the item at time T1 and an item at time T2, wherein T2 is a pre-determined quantity (e.g. a fixed initial reference time; T2 may be changed (e.g. adjusted, varied, modified) over time; T2 may be updated periodically, T2 may be the beginning of a time period and T1 may be a sliding time in the time period), and (4) a fourth function of the item at time T1 and another item.

At least one of: the first function, the second function, the third function, and/or the fourth function may be a function (e.g. $F(X, Y, \ldots)$) with at least two arguments: X and Y. The two arguments may be scalars. The function (e.g. F) may be a function of at least one of X, Y, (X−Y), (Y−X), abs(X−Y), $X^a$, $Y^b$, abs($X^a-Y^b$), $(X-Y)^a$, (X/Y), (X+a)/(Y+b), ($X^a/Y^b$), and (($X/Y)^a-b$), wherein a and b are may be some predetermined quantities. For example, the function may simply be abs(X−Y), or $(X-Y)^2$, $(X-Y)^4$. The function may be a robust function. For example, the function may be $(X-Y)^2$ when abs (X−Y) is less than a threshold T, and (X−Y)+a when abs(X−Y) is larger than T. Alternatively, the function may be a constant when abs(X−Y) is larger than T. The function may also be bounded by a slowly increasing function when abs(X−y) is larger than T, so that outliers cannot severely affect the result. Another example of the function may be (abs(X/Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative. In another example, both arguments X and Y may be n-tuples such that X=($x\_1$, $x\_2, \ldots, x\_n$) and Y=($y\_1, y\_2, \ldots, y\_n$). The function may be a function of at least one of: $x\_i$, $y\_i$, ($x\_i-y\_i$), ($y\_i-x\_i$), abs($x\_i-y\_i$), $x\_i^a$, $y\_i^b$, abs($x\_i^a-y\_i^b$), $(x\_i-y\_i)^a$, ($x\_i/y\_i$), ($x\_i+a$)/($y\_i+b$), ($x\_i^a/y\_i^b$), and (($x\_i/y\_i)^a-b$), wherein i is a component index of the n-tuple X and Y, and $1 \leq i \leq n$, e.g. component index of $x\_1$ is i=1, component index of $x\_2$ is i=2. The function may comprise a component-by-component summation of another function of at least one of the following: $x\_i$, $y\_i$, ($x\_i-y\_i$), ($y\_i-x\_i$), abs($x\_i-y\_i$), $x\_i^a$, $y\_i^b$, abs($x\_i^a-y\_i^b$), $(x\_i-y\_i)^a$, ($x\_i/y\_i$), ($x\_i+a$)/($y\_i+b$), ($x\_i^a/y\_i^b$), and (($x\_i/y\_i)^a-b$), wherein i is the component index of the n-tuple X and Y. For example, the function may be in a form of $\text{sum}\_{\{i=1\}}^n (\text{abs}(x\_i/y\_i)-1)/n$, or $\text{sum}\_{\{i=1\}}^n w\_i^* (\text{abs}(x\_i/y\_i)-1)$, where $w\_i$ is some weight for component i.

The map may be computed using dynamic time warping (DTW). The DTW may comprise a constraint on at least one of the map, the items of the first TSCI the items of the second TSCI, the first time duration, the second time duration, the first section, and/or the second section. Suppose in the map, the $i^{\{th\}}$ domain item is mapped to the $j^{\{th\}}$ range item. The constraint may be on admissible combination of i and j (constraint on relationship between i and j). Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCI. With each link, one of the first items with a first timestamp may be associated with one of the second items with a second timestamp. A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, . . . ), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated.

The first section of the first time duration of the first TSCI may be a sliding section of the first TSCI. The second section of the second time duration of the second TSCI may be a sliding section of the second TSCI.

A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or tie another event, based on the mismatch cost.

The classifier may be applied to at least one of each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/ group/grouping/list/set of unknown events, and/or the another event, based on the mismatch cost. The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%).

In another example, the current event may be associated with a known event that achieves smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost. The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2. The current event may be associated with at least one of: the known event, the unknown event and/or the another event, based on the mismatch cost and additional mismatch cost associated with at least one additional section of the first TSCI and at least one additional section of the second TSCI. The known events may comprise at least one of: a door closed event, door open event, window closed event, window open event, multi-state event, on-state event, off-state event, intermediate state event, continuous state event, discrete state event, human-present event, human-absent event, sign-of-life-present event, and/ or a sign-of-life-absent event.

A projection for each CI may be trained using a dimension reduction method based on the training TSCI. The dimension reduction method may comprise at least one of principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training TSCI associated with the at least one event, and/or the current TSCI, for the classifier.

The classifier of the at least one event may be trained based on the projection and the training TSCI associated with the at least one event. The at least one current TSCI may be classified/categorized based on the projection and the current TSCI. The projection may be re-trained using at least one of the dimension reduction method, and another dimension reduction method, based on at least one of: the training TSCI, at least one current TSCI before retraining the projection, and/or additional training TSCI. The another dimension reduction method may comprise at least one of: principal component analysis (PCA), PCA with different kernels, independent component analysis (ICA), Fisher linear discriminant, vector quantization, supervised learning unsupervised learning, self-organizing maps, auto-encoder, neural network, deep neural network, and/or yet another method. The classifier of the at least one event may be re-trained based on at least one of the re-trained projection, the training TSCI associated with the at least one events, and/or at least one current TSCI. The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values. Each training TSCI may be weighted in the training of the projection. The projection may comprise more than one projected components. The projection may comprise at least one most significant projected component. The projection may comprise at least one projected component that may be beneficial for the classifier.

Channel/channel information/venue/spatial-temporal info/motion/object.

The channel information (CI) may be associated with/may comprise signal strength, signal amplitude, signal phase, spectral power measurement, modem parameters (e.g. used in relation to modulation/demodulation in digital communication systems such as WiFi, 4G/LTE), dynamic beamforming information, transfer function components, radio state (e.g. used in digital communication systems to decode digital data, baseband processing state, RF processing state, etc.), measurable variables, sensed data, coarse-grained/ fine-grained information of a layer (e.g. physical layer, data link layer, MAC layer, etc.), digital setting, gain setting, RF filter setting, RF front end switch setting, DC offset setting, DC correction setting, IQ compensation setting, effect(s) on the wireless signal by the environment (e.g. venue) during propagation, transformation of an input signal (the wireless signal transmitted by the Type 1 device) to an output signal (the wireless signal received by the Type 2 device), a stable behavior of the environment, a state profile, wireless channel measurements, received signal strength indicator (RSSI), channel state information (CSI), channel impulse response (CIR), channel frequency response (CFR), characteristics of frequency components (e.g. subcarriers) in a bandwidth, channel characteristics, channel filter response, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/ minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel. The TSCI may be a stream of wireless signals (e.g. CI).

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of: a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem). The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device. Each CI may be associated with an antenna of the Type 1 device and an antenna of the Type 2 device.

The CI may be obtained from a communication hardware (e.g. of Type 2 device, or Type 1 device) that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc. The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc. Each CI may be associated with a timestamp. Each CI may comprise N1 components (e.g. N1 frequency domain components in CFR, N1 time domain components in CIR, or N1 decomposition components). Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index A TSCI may be divided into N1 component time series. Each respective component time series is associated with a respective component index. The characteristics/STI of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristic of a component-feature time series of a TSCI may be computed. The component-wise characteristics may be a scalar (e.g. energy) or a function with a domain and a range (e.g. an autocorrelation function, transform, inverse transform). The characteristics/STI of the motion of the object may be monitored based on the component-wise characteristics. A total characteristics (e.g. aggregate characteristics) of the TSCI may be computed based on the component-wise characteristics of each component time series of the TSCI. The total characteristics may be a weighted average of the component-wise characteristics. The characteristics/STI of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NFC, BILE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmitting/receiving antenna. Each CI may be associated with one of the transmitting antenna of the Type 1 device and one of the receiving antenna of the Type 2 device.

Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g. 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI. The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or STI (e.g. motion information) may comprise: location, location coordinate, change in location, position (e.g. initial position, new position), position on map, height, horizontal location, vertical location, distance, displacement, speed, acceleration, rotational speed, rotational acceleration, direction, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, temporal change, change of CI, change in frequency, change in timing, change of gait cycle, timing, starting time, initiating time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/location) of the object, tool motion, machine motion, complex motion, and/or combination of multiple motions, event, signal statistics, signal dynamics, anomaly, motion statistics, motion parameter, indication of motion detection, motion magnitude, motion phase, similarity score, distance score, Euclidean distance, weighted distance, $L\_1$ norm, $L\_2$ norm, $L\_k$ norm for $k>2$, statistical distance, correlation, correlation indicator, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting/initiating location, ending location, starting/initiating quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, analytics, output responses, and/or another information. The characteristics and/or STI may be computed/monitored based on a feature computed from a CI or a TSCI (e.g. feature computation/extraction) A static segment or profile (and/or a dynamic segment/profile) may be identified/computed/analyzed/monitored/extracted/obtained/marked/presented/indicated/highlighted/stored/communicated based on an analysis of the feature. The analysis may comprise a motion detection/movement assessment/presence detection. Computational workload may be shared among the Type 1 device, the Type 2 device and another processor.

The Type 1 device and/or Type 2 device may be a local device. The local device may be: a smart phone, smart device, TV, sound bar, set-top box, access point, router, repeater, wireless signal repeater/extender, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT) device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (ID). The ID may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, user, subject, passenger, child, older person, baby, sleeping baby, baby in vehicle, patient, worker, high-value worker, expert, specialist, waiter, customer in mall, traveler in airport/train station/bus terminal/shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object.

The object itself may be communicatively coupled with some network, such as WiFi, MiFi, 3G/4G/LTE/5G/6G/7G, Bluetooth, NFC, BLE, WiMax, Zigbee, UMTS, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc. The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device. The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable. The portable device, the nearby device, a local server (e.g. hub device) and/or a cloud server may share the computation and/or storage for a task (e.g. obtain TSCI, determine characteristics/STI of the object associated with the movement (e.g. change in position/location) of the object, computation of time series of power (e.g. signal strength) information, determining/computing the particular function, searching for local extremum, classification, identifying particular value of time offset, denoising, processing, simplification, cleaning, wireless smart sensing task, extract CI from signal, switching, segmentation, estimate trajectory/path/track, process the map, processing trajectory/path/track based on environment models/constraints/limitations, correction, corrective adjustment, adjustment, map-based (or model-based) correction, detecting error, checking for boundary hitting, thresholding) and information (e.g. TSCI). The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device. The nearby device and/or at least one processor associated with the wireless receiver, the wireless transmitter, the another wireless receiver, the another wireless transmitter and/or a cloud server (in the cloud) may determine the initial STI of the object. Two or more of them may determine the initial spatial-temporal info jointly. Two or more of them may share intermediate information in the determination of the initial STI (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial STI (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known. In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter (e.g. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a sensing area, room, house, office, property, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, roof top, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space. The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), WiFi, LTE, NFC, ZigBee). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, access point, mobile WiFi (MiFi), dongle with USB/micro USB/Firewire/other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/bucket/container, smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID)/identifier as described above.

An event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball), two-body action (e.g. a person letting go a balloon, catching a fish, molding a clay, writing a paper, person typing on a computer), car moving in a garage, person carrying a smart phone and walking around an airport/mall/government building/office/etc., autonomous moveable object/machine moving around (e.g. vacuum cleaner, utility vehicle, car, drone, self-driving car).

The task or the wireless smart sensing task may comprise: object detection, presence detection, proximity detection, object recognition, activity recognition, object verification, object counting, daily activity monitoring, well-being monitoring, vital sign monitoring, health condition monitoring, baby monitoring, elderly monitoring, sleep monitoring, sleep stage monitoring, walking monitoring, exercise monitoring, tool detection, tool recognition, tool verification, patient detection, patient monitoring, patient verification, machine detection, machine recognition, machine verification, human detection, human recognition, human verification, baby detection, baby recognition, baby verification, human breathing detection, human breathing recognition, human breathing estimation, human breathing verification, human heart beat detection, human heart beat recognition, human heart beat estimation, human heart beat verification, fall-down detection, fall-down recognition, fall-down estimation, fall-down verification, emotion detection, emotion recognition, emotion estimation, emotion verification, motion detection, motion degree estimation, motion recognition, motion estimation, motion verification, periodic motion detection, periodic motion recognition, periodic motion estimation, periodic motion verification, repeated motion detection, repeated motion recognition, repeated motion estimation, repeated motion verification, stationary motion detection, stationary motion recognition, stationary motion estimation, stationary motion verification, cyclo-stationary motion detection, cyclo-stationary motion recognition, cyclo-stationary motion estimation, cyclo-stationary motion verification, transient motion detection, transient motion recognition, transient motion estimation, transient motion verification, trend detection, trend recognition, trend estimation, trend verification, breathing detection, breathing recognition, breathing estimation, breathing estimation, human biometrics detection, human biometric recognition, human biometrics estimation, human biometrics verification, environment informatics detection, environment informatics recognition, environment informatics estimation, environment informatics verification, gait detection, gait recognition, gait estimation, gait verification, gesture detection, gesture recognition, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, model-based processing/correction, irregularity detection, locationing, room sensing, tracking, multiple object tracking, indoor tracking, indoor position, indoor navigation, energy management, power transfer, wireless power transfer, object counting, car tracking in parking garage, activating a device/system (e.g. security system, access system, alarm, siren, speaker, television, entertaining system, camera, heater/air-conditioning (HVAC) system, ventilation system, lighting system, gaming system, coffee machine, cooking device, cleaning device, housekeeping device), geometry estimation, augmented reality, wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server (e.g. hub device), edge server, a cloud server, and/or another device. The task may be based on TSCI between any pair of Type 1 device and Type 2 device. A Type 2 device may be a Type 1 device, and vice versa. A Type 2 device may play/perform the role (e.g. functionality) of Type 1 device temporarily, continuously, sporadically, simultaneously, and/or contemporaneously, and vice versa. A first part of the task may comprise at least one of: preprocessing, processing, signal conditioning, signal processing, post-processing, processing sporadically/continuously/simultaneously/contemporaneously/dynamically/adaptive/on-demand/as-needed, calibrating, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder (and/or illegal action) detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/Hi Fi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc. Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

A motion may comprise at least one of a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with man-made object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, sub-surface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio. The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination. The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802.11ah, 802.11ax, 802.11ay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination. The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art. The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text), symbolic way (e.g. emoticon, signs, hand gesture), or mechanical way (e.g. vibration, actuator movement, haptics, etc.)

Basic Computation

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCI, autocorrelation, features of TSCI). An operation may be preprocessing, processing and/or postprocessing. The preprocessing, processing and/or postprocessing may be an operation. An operation may comprise preprocessing, processing, postprocessing, scaling, computing a confidence factor, computing a line-of-sight (LOS) quantity, computing a non-LOS (NLOS) quantity, a quantity comprising LOS and NLOS, computing a single link (e.g. path, communication path, link between a transmitting antenna and a receiving antenna) quantity, computing a quantity comprising multiple links, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (DFT), fast FT (FFT), wavelet transform, Laplace transform, Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise, scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, measure of variation, spread, dispersion, deviation, divergence, range, interquartile range, total variation, absolute deviation, total deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function, Beta function, Gamma function, integral function, Gaussian function, Poisson function, etc.

Machine learning, training, discriminative training, deep learning, neural network, continuous time processing, distributed computing, distributed storage, acceleration using GPU/DSP/coprocessor/multicore/multiprocessing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity/feature from a TSCI may be computed. The quantity may comprise statistic of at least one of: motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, signal intensity, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heart beat, statistical parameters, cardiopulmonary statistics/analytics (e.g. output responses), daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another measurable quantity/variable.

Sliding Window/Algorithm

Sliding time window may have time varying window width. It may be smaller at the beginning to enable fast acquisition and may increase over time to a steady-state size. The steady-state size may be related to the frequency, repeated motion, transient motion, and/or STI to be monitored. Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects.

The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics (e.g. characteristic value, or characteristic point) of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a maximum, minimum, extremum, local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained maximum, constrained minimum, constrained extremum, significant maximum, significant minimum, significant extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n^th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, measure of variation, spread, dispersion, deviation, divergence, range, interquartile range, total variation, absolute deviation, total deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude) of the local maximum over the same quantity of the local minimum. It may also be the function of a difference between the quantity of the local maximum and the same quantity of the local minimum. Significant local peaks may be identified or selected. Each significant local peak may be a local maximum with SNR-like parameter greater than a threshold T1 and/or a local maximum with amplitude greater than a threshold T2. The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/STI of the object may be computed based on the set of selected significant local peaks and frequency values associated with the set of selected significant local peaks. In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak—peaks that may have happened in the past, especially those peaks that have been identified for a long time.

For example, if a finite state machine (FSM) is used, it may select the peak(s) based on the state of the FSM.

Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or STI may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum aposterior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/state. The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/STI/size/property/trait/habit/behavior, the venue, feature/fixture/furniture/barrier/material/machine/living thing/thing/object/boundary/surface/medium that is in/at/of the venue, map, constraint of the map (or environmental model), the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g. offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function.

The regression analysis may minimize at least one of: error, aggregate error, component error, error in projection domain, error in selected axes, error in selected orthogonal axes, absolute error, square error, absolute deviation, square deviation, higher order error (e.g. third order, fourth order), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation. Error associated with different links may have different weights. One possibility is that some links and/or some components with larger noise or lower signal quality metric may have smaller or bigger weight.), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost.

The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or STI of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the motion or movement (e.g. change in position/location) of the object, at least one characteristics and/or STI of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

In the presentation, information may be displayed with a map (or environmental model) of the venue. The information may comprise: location, zone, region, area, coverage area, corrected location, approximate location, location with respect to (w.r.t.) a map of the venue, location w.r.t. a segmentation of the venue, direction, path, path w.r.t the map and/or the segmentation, trace (e.g. location within a time window such as the past 5 seconds, or past 10 seconds, the time window duration may be adjusted adaptively (and/or dynamically); the time window duration may be adaptively (and/or dynamically) adjusted w.r.t. speed, acceleration, etc.), history of a path, approximate regions/zones along a path, history/summary of past locations, history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, identity (ID) or identifier of the respect object (e.g. pet, person, self-guided machine/device, vehicle, drone, car, boat, bicycle, self-guided vehicle, machine with fan, air-conditioner, TV, machine with movable part), identification of a user (e.g. person), information of the user, location/speed/acceleration/direction/motion/gesture/gesture control/motion trace of the user, ID or identifier of the user, activity of the user, state of the user, sleeping/resting characteristics of the user, emotional state of the user, vital sign of the user, environment information of the venue, weather information of the venue, earthquake, explosion, storm, rain, fire, temperature, collision, impact, vibration, event, door-open event, door-close event, window-open event, window-close event, fall-down event, burning event, freezing event, water-related event, wind-related event, air-movement event, accident event, pseudo-periodic event (e.g. running on treadmill, jumping up and down, skipping rope, somersault, etc.), repeated event, crowd event, vehicle event, gesture of the user (e.g. hand gesture, arm gesture, foot gesture, leg gesture, body gesture, head gesture, face gesture, mouth gesture, eye gesture, etc.).

The location may be 2-dimensional (e.g. with 2D coordinates), 3-dimensional (e.g. with 3D coordinates). The location may be relative (e.g. w.r.t. a map or environmental model) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, status of a device/machine, remaining power of a device, status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc.

The map (or environmental model) may be 2-dimensional, 3-dimensional and/or higher-dimensional. (e.g. a time varying 2D/3D map/environmental model) Walls, windows, doors, entrances, exits, forbidden areas may be marked on the map or the model. The map may comprise floor plan of a facility. The map or model may have one or more layers (overlays). The map/model may be a maintenance map/model comprising water pipes, gas pipes, wiring, cabling, air ducts, crawl-space, ceiling layout, and/or underground layout. The venue may be segmented/subdivided/zoned/grouped into multiple zones/regions/geographic regions/sectors/sections/territories/districts/precincts/localities/neighborhoods/areas/stretches/expanse such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map/model. Different regions may be color-coded. Different regions may be presented with a characteristic (e.g. color, brightness, color intensity, texture, animation, flashing, flashing rate, etc.). Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-storey town house in Seattle, Wash. Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc.). If Stephen pays a monthly fee (e.g. $10/month), a service company (e.g. security company) will receive the warning signal through wired network (e.g. broadband) or wireless network (e.g. home WiFi, LTE, 3G, 2.5G, etc.) and perform a security procedure for Stephen (e.g. call him to verify any problem, send someone to check on the house, contact the police on behalf of Stephen, etc.). Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away.

Sometime later, Stephen is convinced that our wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI, CSI in domain, channel response, estimated channel response, channel impulse response (CIR), channel frequency response (CFR), channel characteristics, channel filter response, CSI of the wireless multipath channel, information of the wireless multipath channel, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory) and corresponding software components. According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease). The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and Type 2 devices may be deployed in an area to detect breathing of any intruders. There are numerous applications of wireless breathing monitoring without wearables.

Hardware modules may be constructed to contain the Type 1 transceiver and/or the Type 2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices, FDMA devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise: analytics, output response, selected time window, subsampling, transform, and/or projection. The presenting may comprise presenting at least one of: monthly/weekly/daily view, simplified/detailed view, cross-sectional view, small/large form-factor view, color-coded view, comparative view, summary view, animation, web view, voice announcement, and another presentation related to the periodic/repetition characteristics of the repeating motion.

A Type 1/Type 2 device may be an antenna, a device with antenna, a device with a housing (e.g. for radio, antenna, data/signal processing unit, wireless IC, circuits), device that has interface to attach/connect to/link antenna, device that is interfaced to/attached to/connected to/linked to another device/system/computer/phone/network/data aggregator, device with a user interface (UI)/graphical U I/display, device with wireless transceiver, device with wireless transmitter, device with wireless receiver, internet-of-thing (IoT) device, device with wireless network, device with both wired networking and wireless networking capability, device with wireless integrated circuit (IC), Wi-Fi device, device with Wi-Fi chip (e.g. 802.11a/b/g/n/ac/ax standard compliant), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UMTS, 3GPP, GSM, EDGE, TDMA, FDMA, CDMA, WCDMA, TD-SCDMA), cellular device, base station, mobile network base station, mobile network hub, mobile network compatible device, LTE device, device with LTE module, mobile module (e.g. circuit board with mobile-enabling chip (IC) such as Wi-Fi chip, LTE chip, BLE chip), Wi-Fi chip (IC), LTE chip, BLE chip, device with mobile module, smart phone, companion device (e.g. dongle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, harddisk, network card, instrument, racket, ball, shoe, wearable, clothing, glasses, hat, necklace, food, pill, small device that moves in the body of creature (e.g. in blood vessels, in lymph fluid, digestive system), and/or another device. The Type 1 device and/or Type 2 device may be communicatively coupled with: the internet, another device with access to internet (e.g. smart phone), cloud server (e.g. hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc. In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment. All the Type A and Type B devices form a tree structure. The root may be a Type B device with network (e.g. internet) access. For example, it may be connected to broadband service through a wired connection (e.g. Ethernet, cable modem, ADSL/HDSL modem) connection or a wireless connection (e.g. LTE, 3G/4G/5G, WiFi, Bluetooth, microwave link, satellite link, etc.). In one embodiment, all the Type A devices are leaf node. Each Type B device may be the root node, non-leaf node, or leaf node.

The present teaching discloses systems for target or object tracking, based on time reversal and massive MIMO, in an outdoor environment. Outdoor environment is known to be lacking or scarce in multipath, which is difficult for time reversal to be applied. The present teaching discloses an alternative way to realize time reversal (TR) in an outdoor environment—using massive MIMO antenna arrays to contribute additional multipaths. Although multipaths may not be rich for each antenna in outdoor environment, combined multipaths can be rich due to the massive amount of antennas in massive MIMO. Similar to the spatial "focusing ball" achieved by time reversal in indoor environment, a spatial "focusing beam" can be achieved by combining time reversal with massive MIMO. Based on this spatial focusing bean, the present teaching discloses a highly accurate target localization method suitable for outdoor environment. Extensive simulation results show that the disclosed system can obtain centimeter accuracy for outdoor localization and tracking.

One main advantage of the disclosed system over GPS based tracking and navigation systems is NLOS operation. GPS requires direct LOS with multiple GPS satellites in space and thus would not work in partially covered/blocked areas such as football stadium (e.g. Super Bowl stadium with top opened), parking structures, down-town areas (e.g. New York city Manhattan area) with dense, tall buildings/skyscrapers, forest with mildly dense trees/vegetations, maze, canyons/valleys, etc. The disclosed system can work equally well in both LOS and NLOS conditions. Thus, unlike GPS, the disclosed system can operate perfectly well in these problematic areas of GPS.

In a primary set up: a wireless transmitter (Type 1 device) is stationary (e.g. an installed router or access point, AP) with massive amount of antennas (e.g. more than 20) while a wireless receiver (Type 2 device) is a mobile device (e.g. smart phone, car, AGV) with at least one antenna. The mobile device (Type 2 device) is the device of which the location is to be tracked.

In an alternative set up in another embodiment: a wireless transmitter (Type 1 device) is stationary (e.g. an installed router or access point, AP) with at least one antenna while a wireless receiver (Type 2 device) is a mobile device (e.g. smart phone, car, AGV) with massive amount of antennas (e.g. more than 20). The mobile device (Type 2 device) is the device to be tracked. In an alternative set up in another embodiment: a wireless receiver (Type 2 device) is stationary (e.g. an installed router or access point, AP) with massive amount of antennas (e.g. more than 20) while a wireless transmitter (Type 1 device) is a mobile device (e.g. smart phone, car, AGV) with at least one antenna. The mobile device (Type 1 device) is the device to be tracked. In an alternative set up in another embodiment: a wireless receiver (Type 2 device) is stationary (e.g. an installed router or access point, AP) with at least one antenna while a wireless transmitter (Type 1 device) is a mobile device (e.g. smart phone, car, AGV) with massive amount of antennas (e.g. more than 20). The mobile device (Type 1 device) is the device to be tracked.

In another embodiment, instead of "a distance", "a speed" or "an acceleration" of the current movement of the moving device is computed. In yet another embodiment, instead of "a distance", a function of "a distance", "a speed" and/or "an acceleration" is computed. In one embodiment, the "distance" may be based on an autocorrelation focusing strength (ACFS).

The "first spatial-temporal information" or first STI may comprise at least one of: a distance, a height, a depth, a displacement, a location, a speed, an acceleration, an angle, an angular speed, an angular acceleration, a derivative, a high order derivative, an integration, a direction, a time, a time period, a timing, a time trend, an incremental change of a spatial-temporal information (STI), an aggregate change of STI, a timed change of STI, a set of STI, and/or another spatial-temporal quantity. Similarly, the second STI may comprise at least one of: a distance, a height, a depth, a displacement, a location, a speed, an acceleration, an angle, an angular speed, an angular acceleration, a derivative, a high order derivative, an integration, a direction, a time, a time period, a timing, a time trend, an incremental change of a spatial-temporal information (STI), an aggregate change of STI, a timed change of STI, a set of STI, and/or another spatial-temporal quantity. The second STI may be computed based on the first STI. For example, the first STI may be a distance, a directional distance, or a projection of a distance in a certain direction. In one embodiment, the first STI may be a distance in an orthogonal direction of an "axis". The axis connects a center of the MIMO antenna of the stationary device (e.g. base station) and a center of the antenna of the moving device (or object). In another example, the moving device may have the MIMO antennas (the large number of antennas, e.g. 50, or 100 or 200 or 1000 or 10000, etc.) while the stationary device may have only a few antennas (e.g. 1, 2, 3, or 4).

The first STI may be computed based on a "focusing beam principle". That is, a CSI-based feature such as time reversal resonating strength or auto-correlation focusing strength may be a sinc function of the distance of the orthogonal direction. The CSI-based feature may form a beam around the axis, with the beam strength being a sinc function of the radial distance. The CSI-based feature (e.g. ACFS) may be first computed and then the first STI (e.g. distance) may be computed based on the CSI-based feature and the sinc function (e.g. by using table look-up, or by computing/ estimating the inverse sinc function).

The ACFS may be computed between the current CSI at time t, and a past CSI at time t-k (where k is an integer). The k may be allowed to change from 1 to 2, 2 to 3, and so on, in search of a k such that the ACFS between the CSI at time t and the CSI at time t-k is a characteristic point of ACFS (e.g. a local minimum, a local maximum, the first local minimum, the first local maximum, etc.)

The first STI may be computed based on a trigonometric function (e.g. it may comprise at least one of: sine, cosine, tangent, arc-sine, arc-cosine, arc-tangent, secant, cosecant, co-tangent, or another trigonometric function) of an angle between the axis and another axis of the MIMO antenna of the stationary device (e.g. base station). For example, the MIMO antenna may be a 1-dimensional array of equally spaced antenna, and the another axis may be the straight line formed by the antenna array, and the axis may be connecting the center of the antenna array of the stationary device to the moving device. The first STI may be the distance travelled by the moving device in the orthogonal direction (e.g. a projection of the distance travelled by the moving device onto the orthogonal direction) between time t-k and time t. The first STI may be computed based on an aperture of the MIMO antenna. If there are L antennas in a straight line equally spaced at d, the aperture may be (L-1)d. The antennas may not be equally spaced. The MIMO antennas may not be in a 1-dimensional configuration. For example, the MIMO antennas may comprise several groups of antennas, each group forming a straight line. The straight lines may/may not be co-planar. In another example, the MIMO antennas may be in a 2-dimensional lattice, or a 3-dimensional lattice. In another example, the MIMO antennas may be at pseudo-random locations in a 2-D or 3-D area. The first STI may be computed based on a distance between the center of the antenna array and the moving device (e.g. at time t-k).

The second STI may be a location. The location (second STI) of the moving device (or location of the object) may be computed based on the first STI. The second STI may be computed as a point on a line which is parallel to the axis and at a distance of the first STI from the axis.

The first STI and second STI may be computed at different rates: e.g. 1 Hz, 2 Hz, 3 Hz, 5 Hz, 10 Hz, 20 Hz, 30 Hz, 50 Hz, 100 Hz, 200 Hz, 300 Hz, 500 Hz, 1000 Hz, 1500 Hz, 2000 Hz, 3000 Hz, 5000 Hz, 10000 Hz, etc. For example, the first STI may be computed at 100 Hz while the second STI may be computed at 1 Hz.

The "object" may be a person, an animal, another device, a vehicle, a machine, a movable structure, a structure/material subject to a force (e.g. wind, earthquake, vibration, impact, stress, tension, buoyance, fluid flow, etc.), a robotic device, an AGV. In another embodiment, the "distance" may be a first STI computed and used to compute a second STI.

TR has been proved to be effective in localizing the target accurately even in environment with serious multipath signals. By further exploring the resonance phenomenon in spatial domain, a high accuracy indoor speed estimation system has been developed. Inspired by this promising property, the present teaching discloses that: in far field scenario, massive MIMO can harvest a similar spatial focusing beam as TR does. As such, a high accuracy target localization method is developed.

The present teaching discloses a target speed estimation using the focusing beam of multiple distributed base stations equipped with future 5G massive MIMO antennas. Furthermore, a new target localization method is disclosed based on the speed estimation results. Extensive numerical simulations show that this new method can achieve centimeter accuracy in some ideal case while at least sub-meter accuracy in some extreme environments.

In one embodiment, the disclosed method enjoys a low complexity because the computation of ACFS distribution is linear proportional to the received data size. Based on the speed estimation, a method is disclosed to estimate the moving direction by further using the BS deployment information. Most of the existing works such as DOA estimation methods can only estimate the local direction of the target, while the disclosed method can obtain the absolute direction. In addition, the disclosed method can achieve less than 2 degrees accuracy in the presence of NLOS components, which outperforms the benchmark methods.

In another embodiment, some lower-layer details (e.g. a mode, an operation, a transmission, a measurement, a capability, an information, a feedback) of a method/system/device may enable a higher layer application (e.g. software) to perform wireless sensing. Wireless sensing enablement (WSE) is for enabling of wireless sensing. Suppose an application (e.g. a software application, a mobile app, an embedded software, a firmware, etc.) wants to perform wireless sensing based on some wireless data (e.g. WSE measurement) obtained at some lower layers. In the present teaching, WSE refers to anything (e.g. a mode, a capability, a wireless transmission, a measurement, an operation, an information, a feedback) in the Physical (PHY) layer, or Median-Access (MAC) layer, or other layers below the application layer, of any Type 1 heterogeneous wireless device (transmitter or TX) or any Type 2 heterogeneous wireless device (receiver or Rx) or another device (e.g. a local server, a cloud server) that enable the applications to perform wireless sensing.

Navigation systems have been widely used in modern applications in which the moving speed and direction estimations are two key steps. Instead of using traditional device-based orientation sensor such as accelerometer and magnetometer to estimate the moving direction, the present teaching discloses a novel radio frequency (RF) signal-based moving direction sensing scheme by using 5G massive multiple input and output (MIMO) system. The energy distribution of the received signal in massive MIMO in both near- and far-field scenarios is developed herein. The energy distribution in near-field is here proved to be highly related to the geometric shape of the antenna deployment. In contrast, the energy distribution turns out to be a stationary sinc-like focusing beam in far-field scenario. Inspired by such an observation, a novel method is disclosed to estimate the speed of a moving target with respect to a single based station. The moving direction can be further determined by jointly considering the speed estimation results and the geometric property of the locations between the target and nearby base stations. Finally, numerical simulations show that the disclosed RF-based method can achieve a high accuracy in which the moving speed estimation error is less than 1.5 m/s while the moving direction estimation error is within 2 degrees.

The present teaching utilizes the time-reversal resonating strength (TRRS), which is proved to be a stationary and location-independent focusing-ball shaped distribution around the receiver. By leveraging such an observation, a target tracking method with centimeter-level accuracy has been disclosed and verified by extensive experiments.

In the present teaching, a massive MIMO system utilizes multiple antennas to physically generate a large number of signal components which play similar roles as multipaths in a rich-scattering environment. In addition, the incident signals generated by massive MIMO can only get to the receiver from the transmitter side. One can prove that in far-field scenario, the autocorrelation function strength (ACFS) distribution of the received signal around the receiver exhibits a sine-like beam in spatial domain, which can provide direction information. By further using the dense deployment of 5G massive MIMO base stations (BSs), a new radio frequency (RF) signal based moving speed and direction estimation method is disclosed. In addition, it leverages the natural superposition property of the received signal, which reduces the computational load greatly.

In one embodiment, the ACFS distribution of the received signal of a massive MIMO communication system in both near- and far-field scenarios is derived. In near-field situation, the ACFS distribution is closely related to the geometric parameters of the antenna array while it shows a stationary sinc-like beam in far-field scenario.

In one embodiment, considering the practical far-field scenario, a moving speed estimation algorithm is developed by using the aforementioned ACFS distribution, which achieves high accuracy with the speed estimation error less than 1.5 ms. Because the ACFS distribution of the received signal is stable, meaning the computation complexity for calculating the ACFS is linearly proportional to the received data size, the disclosed speed estimation algorithm also enjoys a low complexity.

In one embodiment, based on the speed estimation, an approach is disclosed to estimate the moving direction by further using the BS deployment information. Numerical simulations show that the method is environment independent and the moving direction estimation error is less than 2 degrees, which outperforms the benchmark methods.

In a signal model of one embodiment, a base station (BS) equipped with a massive MIMO array of M antennas communicates with a receiver fixed on a mobile object. In a typical downlink system, BS transmits probing signals which are recorded by the receiver. FIG. 1 illustrates the set-up of the communication system in which 'B' and 'R' represents the center of the base station and receiver respectively. $H_B$ and $L_{BR}$ denote the altitude of the BS and the horizontal distance between the BS and the receiver respectively. $A_e$ is the aperture of the antenna A.

Assume the inner element space is d, the aperture can be expressed as $A_e=(M-1)d$ where $d=\lambda$ equals to the wavelength of the transmitting signal. Then, in a far-field scenario, it is reasonable that $L_{BR} \gg A_e$ holds. In addition, one can assume that all the transducers are deployed with omni-directional antennas. In a free space with no boundary, the receiving signal at baseband can be expressed as $$y(t) = \sum_{m=1}^{M} \frac{\exp(j(k|x_m - r| + \phi_m))}{4\pi |x_m - r|} + n(t), \quad (1)$$

where $k=2\lambda/\lambda$ is the wave number and $|x\_m-r|$ denotes the Euclidean spatial distance between the m-th antenna and the receiver. n(t) represents the additive Gaussian noise. $\phi\_m$ (m=1, 2, ..., M) is the synthetic phase distortion of the m-th propagation path including initial phase, phase error caused by inner system interference, propagation attenuation, reflectors and so on. In general, this synthetic phase distortion can be assumed as i.i.d. uniform distributions over $[\pi,\pi)$ for all m=1, 2, ..., M.

TR is a signal processing technique which tries to utilize the channel state information (CSI) embedded in multipath signals. Consider a rich-scattering environment such as indoor or urban area, usually there are many obstacles between the transmitter and receiver, which causes the unavoidable non-line-of-sight (NLOS) multipath propagation. Given a sufficiently large bandwidth, these multipath components (MPCs) can be decomposed into different taps in discrete-time. Here, one can denote the channel impulse response (CIR) from the transmitter T to receiver R at the kth tap as h(k; T→R). Typically, in wireless communication system, the receiver R first transmits a pilot impulse which is then captured by transmitter T. One can then easily estimate the CIR h(k; R→T) by analyzing the relationship between the signal collected by the transmitter and original pilot impulse. Then, the transmitter T sends back a reversed and conjugate counterpart of the CIR, i.e., h*(-k; R→T) where * is complex conjugation operation. When the channel reciprocity holds, which has been verified by experiments, the receiving signal at position $R_s$ can be given by $$r_s(k;R) = \sum_{l=0}^{L-1} h(l;R_s) h^*(l-k;R), \quad (2)$$

where L is the length of the CIR, i.e., h(l-k;R)=0 when $(l-k) \notin \{0, 1, ..., L-1\}$ and $k \in \{-(L-1), ..., (L-1)\}$. Here and after, one can simplify h(k; T→$R_s$) as h(k; $R_s$) because the transmitter T is fixed usually. In addition, the CIR length L is related with the channel state and also the bandwidth of transmitting signal. From (2), only when $R_s$=R and k=0, one can get the maximum value $\sum_{l=0}^{L-1} |h(l, R)|^2$. This means that all the MPCs add up coherently at the exact position R and a specific time instance. Energy of the receiving signal at other positions or time stamps, or both different time and location decays differently. This is the so called spatial-temporal focusing in TR system.

In one embodiment, one can fix k=0 and mainly study the TR focusing effect in spatial domain, in which one can estimate the target speed and location. To further quantify the TR focusing strength (TRFS), one can define the normalized energy of the received signal at location $R_s$ as $$\rho(R, R_s) = \left| \frac{r_s(0; R)}{\sqrt{\sum_{l=0}^{L-1} |h(l; R)|^2} \sqrt{\sum_{l=0}^{L-1} |h(l; R_s)|^2}} \right|^2, \quad (3)$$

From the previous description about TRFS, one can easily conclude that rich multipath signals is one necessary condition to obtain the TRFS effect. In signal processing terminology, TR scheme takes large bandwidth to resolve multipaths naturally existing in a rich-scattering environment and control each of them. However, in an open-air environment such as a street, plaza or an outdoor parking lot, there is usually not enough multipath signals. Moreover, bandwidth is limited in real communication system. Thanks for the booming massive MIMO technique, one can explore a good alternative which can achieve similar performance to TR system for outdoor localization problem. Intuitively, a massive MIMO system utilizes multiple antennas to physically generate a large number of signal components which play the similar roles to multipaths in a rich-scattering environment. Instead of computing the TRFS, one can make a tiny change by compute the autocorrelation function (ACF) of the receiving signal. The reason is that ACF is more tolerable with noise in practical system by self-averaging process automatically. Different from the TRFS which is a ball, the ACF distribution in massive MIMO system turns out to a focusing beam. To distinguish it from the previous TRFS, one can name it as autocorrelation focusing strength (ACFS) whose derivation is as follows.

Recall (1), one can denote the positions of the moving object in two different time stamps $t_0$ and $t_s$ as $r_0$ and $r_s$, respectively. Then, the autocorrelation function (ACF) of the received energy between $r_0$ and $r_s$ is given by $$\eta_y(r_0, r_s) = \eta_y(t_0, t_s) = \mathbb{E}[y(t_0)y*(t_s)] = \sum_{i=1}^{M}\sum_{m=1}^{M}\mathbb{E}_\phi\left\{\frac{\exp(j(k|x_i - r_0| + \phi_j))}{4\pi|x_i - r_0|} \cdot \frac{\exp(-j(k|x_m - r_s| + \phi_m))}{4\pi|x_m - r_s|}\right\}, \quad (4)$$

where $\mathbb{E}$ represents expectation operator. Note that the Gaussian noise n(t) does not impact the ACF distribution of the receiving signal when SNR is high because it is independent with the signal. However, when SNR decreases, n(t) influences the ACF distribution in some extent, which is interpreted in the simulation part. Moreover, by the far-field approximation where $L_{BR} \gg A_e$, $|x_i-r_0|$ and $|x_m-r_s|$ in the denominator of (4) can be approximated as the same for all elements, i.e., $|x_i-r_0| \approx |x_0-r_0|$ and $|x_m-r_s| \approx |x_0-r_s|$. This approximation is reasonable because $|x_i-r_0|$ and $|x_m-r_s|$ in the denominator of (4) only scale the amplitude of $\eta_y(t_0, t_s)$. However, similar approximation cannot be applied in the numerator of (4) because there is an extra wave number factor $k=2\pi/\lambda$. In other words, the phase term in (4) will change $2\pi$ rad whenever $|x_i-r_0|$ and $|x_m-r_s|$ in the numerator change by $\lambda=1/f_c$, which is very small for 5G communication system because the carrier frequency $f_c$ (could be 28 GHz) is usually very high. In the next derivation process, one can omit the denominator part of (4) for simplicity because they can be regarded as a constant in far field scenario.

Next, one can decompose (4) into two different cases, i.e., a) i=m and b) i≠m. For notation simplicity, one can define the following two phase terms $$\psi_{i,0}=k|x_i-r_0|, \psi_{m,s}=k|x_m-r_s|, \quad (5)$$

Subsequently, $\eta_y(r_0, r_s)$ is derived for each of the two cases. Consider i=m, one can have $$\eta_y^{1st}(r_0, r_s) = \sum_{m=1}^{M}\exp(jk(\psi_{m,o}-\psi_{m,s})). \quad (6)$$

From FIG. 1, the coordinates of the mth transmitting antenna element is $(md/2, 0, H_B)$, then one can get $$|x_m-r_0|=\sqrt{x_m^2+L_{BR}^2+H_B^2}=\sqrt{x_m^2+L^2} \quad (7)$$

where $x_m=md/2$ and $L=\sqrt{L_{BR}^2+H_B^2}$ is the Euclidean spatial distance between the antenna center and the receiver. Next, one can define r and compute corresponding $|x_m-r_s|$.

Figure 2A:
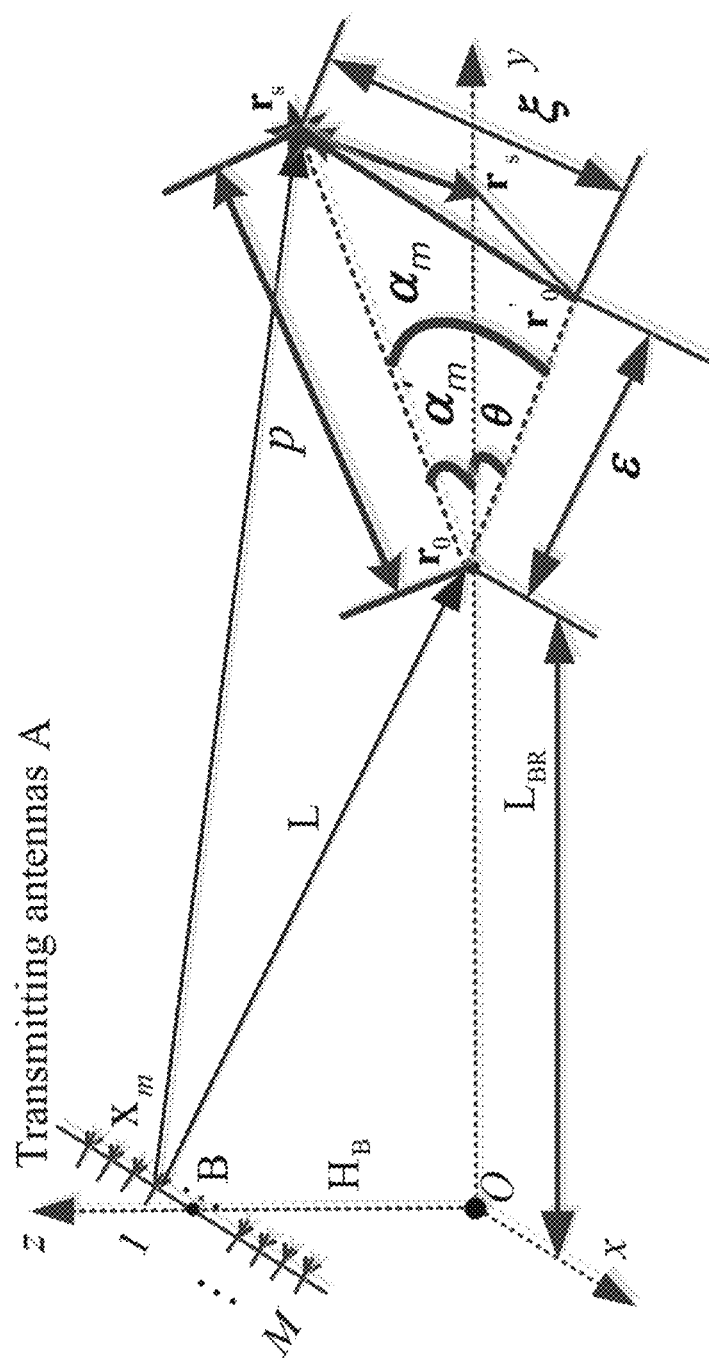
FIG. 2A illustrates an exemplary signal propagation geometry between $r_0$ and $r_s$ in a 3-D model, according to one embodiment of the present teaching.

Assume that $r_0$ and $r_s$ are in the xOy plane as shown in FIG. 2A, and p, ε and ξ represents the Euclidean spatial distance, range and cross-range between $r_0$ and $r_s$. From FIG. 2A, one can get the following equations by using the law of cosines $$\cos\alpha_m=\cos\alpha_m'\cdot\cos\theta \text{ and } \cos\theta=L_{BR}/\sqrt{H_B^2+L_{BR}^2}. \quad (8)$$

In a far field scenario, $L_{BR}$ is usually ten times or more bigger than $H_B$. Hence, the approximation $\cos\theta \approx 1$ holds.

Then, it is easy to obtain $\cos\alpha_m=\cos\alpha_m'$ by substituting $\cos\theta \approx 1$ into (8). Consequently, the 3-dimension signal propagation geometry shown in FIG. 2A can be simplified as FIG. 2B. Then, similar to (7), for $r_s$ close to $r_0$, $|x_m-r_s|$ can be expressed as $$|x_m-r_s|=\sqrt{(L+\varepsilon)^2+(x_m-\xi)^2}. \quad (9)$$

Figure 2B:
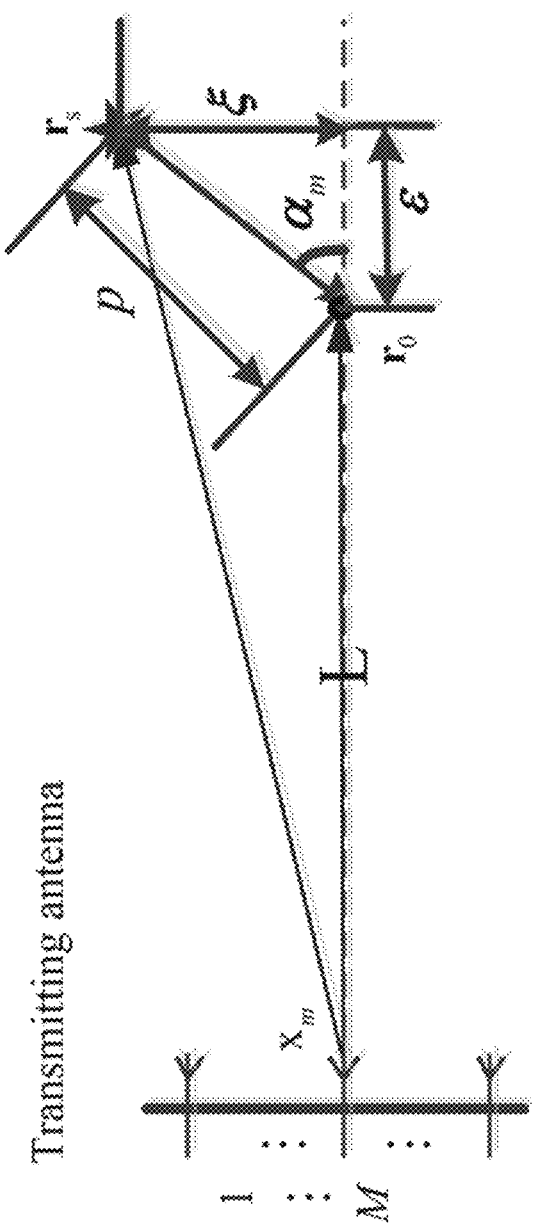
FIG. 2B illustrates an exemplary signal propagation geometry between $r_0$ and $r_s$ in a 2-D model, according to one embodiment of the present teaching.

As shown in FIG. 2B, the Euclidean spatial distance between $r_0$ and $r_s$ is p. However, the electromagnetic wave is a vector which contains both modulus and direction rather than just a scaler. From antenna propagation theory, the propagation path difference which finally influences the phase of the receiving signal at $r_s$ ($r_0$ working as the reference point) is the projection of p along $\overrightarrow{x_m r_0}$ direction, i.e., $\overrightarrow{Oy}$ shown in FIG. 2B. Based on the above analyses, one can have $$p\cos\alpha_m = \frac{|x_m - r_0|^2 + p^2 - |x_m - r_s|^2}{2|x_m - r_0|} = \frac{-L\varepsilon + x_m\xi}{\sqrt{L^2 + x_m^2}}, \quad (10)$$

Evidently, in far-field scenario, $L \gg x_m$ holds. By using parabolic approximation, one can get $$\sqrt{L^2 + x_m^2} \approx L + \frac{x_m^2}{2L} \approx L \quad (11)$$

Inserting (11) into (10), p cos $\alpha_m$ is re-written as $$p \cos \alpha_m = -\varepsilon + x_m\xi/L \quad (12)$$

Referring to (5) and (6), one can compute the phase difference ($\psi_{m,o}-\psi_{m,s}$) by $$\psi_{m,o}-\psi_{m,s}=-kp\cos\alpha_m=k(\varepsilon-x_m\xi/L). \quad (13)$$

Therefore, $\eta_y^{1st}(r_o, r_s)$ in (6) can be re-formulated as $$\eta_y^{1st}(r_0, r_s) = \sum_{m=1}^{M}\exp(jk(\varepsilon - x_m\xi/L)) \quad (14)$$
$$= \exp(jk\varepsilon)\sum_{m=1}^{M}\exp(-jkx_m\xi/L).$$

From the definition in (7), $x_m=md/2$ and d is very small (compared with aperture $A_e=Md/2$ and L). As a result, one can approximate the summation in (14) by an integration expressed as $$\eta_y^{1st}(r_0, r_s) = \exp(jk\varepsilon)\sum_{m=1}^{M}\exp(-jkmd\xi/(2L)) \quad (15)$$
$$= \frac{\exp(jk\varepsilon)}{d}\int_{-\frac{A_e}{2}}^{\frac{A_e}{2}}\exp(-jkx\xi/L)dx$$
$$= \frac{2L\exp(jk\varepsilon)}{dk\xi}\sin\left(\frac{k\xi A_e}{2L}\right)$$
$$= \frac{A_e\exp(jk\varepsilon)}{d}\text{sinc}\left(\frac{k\xi A_e}{2L}\right),$$

where sinc(t)=sin(t)/t. Take the square of $\eta_y^{1st}(r_0, r_s)$ in (15) and then normalize it, one can then obtain $$|\eta_y^{1st}(r_0, r_s)|^2 = \left|\text{sinc}\left(\frac{k\xi A_e}{2L}\right)\right|^2. \tag{16}$$

From (16), when $\xi=0$, $|\eta_y^{1st}(r_0, r_s)|^2$ can get the maximum value 1. Otherwise, when $\xi \neq 0$, $|\eta_y^{1st}(r_0, r_s)|^2$ will be smaller than 1.

Next, one can derive the case where $i \neq m$ in (4), i.e., $$\eta_y^{2nd}(r_0, r_s) = \tag{17}$$
$$\sum_{i=1}^{M}\sum_{m=1,m\neq i}^{M} \mathbb{E}_\phi\left\{\frac{\exp(j(k|x_i - r_0| + \phi_i))}{4\pi|x_i - r_0|} \cdot \frac{\exp(j(k|x_m - r_s| + \phi_m))}{4\pi|x_m - r_s|}\right\},$$

Similar to the analyses of (4), one can omit the denominator and also corresponding constant terms of (17). Then, the (i, m) pair of (17) can be given by $$\eta_y^{2nd}(r_0, r_s)_{i,m} = \mathbb{E}_\phi\{\exp[(j(k(\psi_{i,o}-\psi_{m,s})+\phi_i-\phi_m)]\}. \tag{18}$$

Exchanging the subscript i and m, one can get the symmetrical (m, i) counterpart of (18), i.e., $$\eta_y^{2nd}(r_0, r_s)_{m,i} = \mathbb{E}_\phi\{\exp[j(k(\psi_{m,0}-\psi_{i,s})+\phi_m-\phi_i)]\} = \tag{19}$$
$$\mathbb{E}_\phi\{\exp[-j(k(\psi_{i,0}-\psi_{m,s})+\phi_i-\phi_m)]\}.$$

The summation of (18) and (19) is simplified as $$\eta_y^{2nd}(r_0, r_s)_{\overline{i,m}} = \tag{20}$$
$$\eta_y^{2nd}(r_0, r_s)_{i,m} + \eta_y^{2nd}(r_0, r_s)_{m,i} = \mathbb{E}_\phi\{\cos[\underbrace{k(\psi_{i,0}-\psi_{m,s})}_{\Psi_{im}} + \underbrace{(\phi_i-\phi_m)}_{\Phi}]\}.$$

Since $\phi_i$ and $\phi_m$ are uniformly distributed over $[-\pi, \pi)$, the probability function of $\phi=(\phi_i-\phi_m)$ is $$f_\Phi(\phi) = \begin{cases} 2\pi + \phi, & -2\pi \leq \phi \leq 0 \\ 2\pi - \phi, & 0 \leq \phi \leq 2\pi \\ 0, & \text{others} \end{cases} \tag{21}$$

Then, the expectation in (20) can be reformulated as $$\eta_y^{2nd}(r_0,r_s)_{\overline{i,m}} = \int_{-2\pi}^{2\pi} f_\Phi(\phi)\cos(\Psi_{im}+\phi)d\phi = \int_{-2\pi}^{2\pi} f_\Phi(\phi)\cos\Psi_{im} \cos\phi d\phi - \int_{-2\pi}^{2\pi} f_\Phi(\phi)\sin\Psi_{im}\sin\phi d\phi. \tag{22}$$

Substituting $f_\phi(\phi)$ into (22), one can get the following equations when $-2\pi \leq \phi \leq 0$, $$\int_{-2\pi}^{0}(2\pi+\phi)\cos\Psi_{im}\cos\phi d\phi = 2\pi\cos\Psi_{im}\sin\phi|_{-2\pi}^{0} + \cos\Psi_{im}(\phi\sin\phi+\cos\phi)|_{-2\pi}^{0} = 0. \tag{23}$$

$$\int_{-2\pi}^{0}(2\pi+\phi)\sin\Psi_{im}\sin\phi d\phi = -2\pi\sin\Psi_{im}\cos\phi|_{-2\pi}^{0} + \sin\Psi_{im}(\sin\phi-\phi\cos\phi)|_{-2\pi}^{0} = 0. \tag{24}$$

Similar to (23) and (24), the integration value of (22) when $0 \leq \phi \leq 2\pi$ is also 0. Therefore, it is easy to conclude that $\eta_y^{2nd}(r_0, r_s)_{\overline{i,m}}=0$ holds. In addition, $\eta_y^{2nd}(r_0, r_s)_{\overline{i,m}}=0$ is independent with the subscript i and m, which can be verified by the derivation process in (23) and (24). Recall (17), one can directly get $$\eta_y^{2nd}(r_0, r_s) = \sum_{i=1}^{M}\sum_{\substack{m=1 \\ m\neq i}}^{M}, \eta_y^{2nd}(r_0, r_s)_{\overline{i,m}} = 0. \tag{25}$$

Combining equations (4), (16) and (25), take the square of $\eta_y(r_0, r_s)$ and then normalize it as $$|\eta_y(r_0, r_s)|^2 = \left||\eta_y^{1st}(r_0, r_s)| + \sum_{m=1,m\neq i}^{M}\eta_y^{2nd}(r_0, r_s)_{\overline{i,m}}\right|^2 = \tag{26}$$
$$|\eta_y^{1st}(r_0, r_s)|^2 = \left|\text{sinc}\left(\frac{k\xi A_e}{2L}\right)\right|^2.$$

Figure 3A:
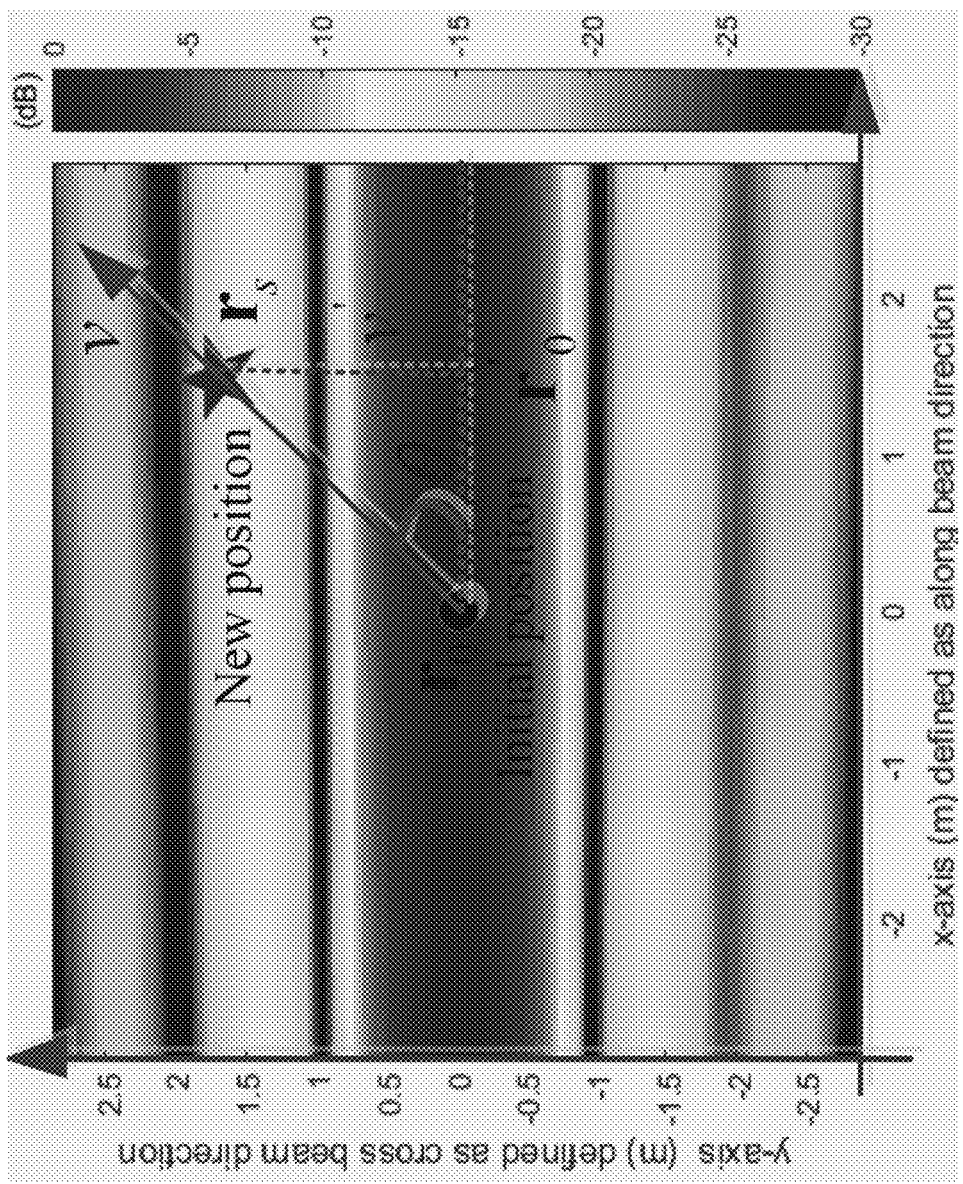
FIG. 3A illustrates an exemplary ACF distribution around an intended position (x=0, y=0) for a speed and position estimation, according to one embodiment of the present teaching.
Figure 3B:
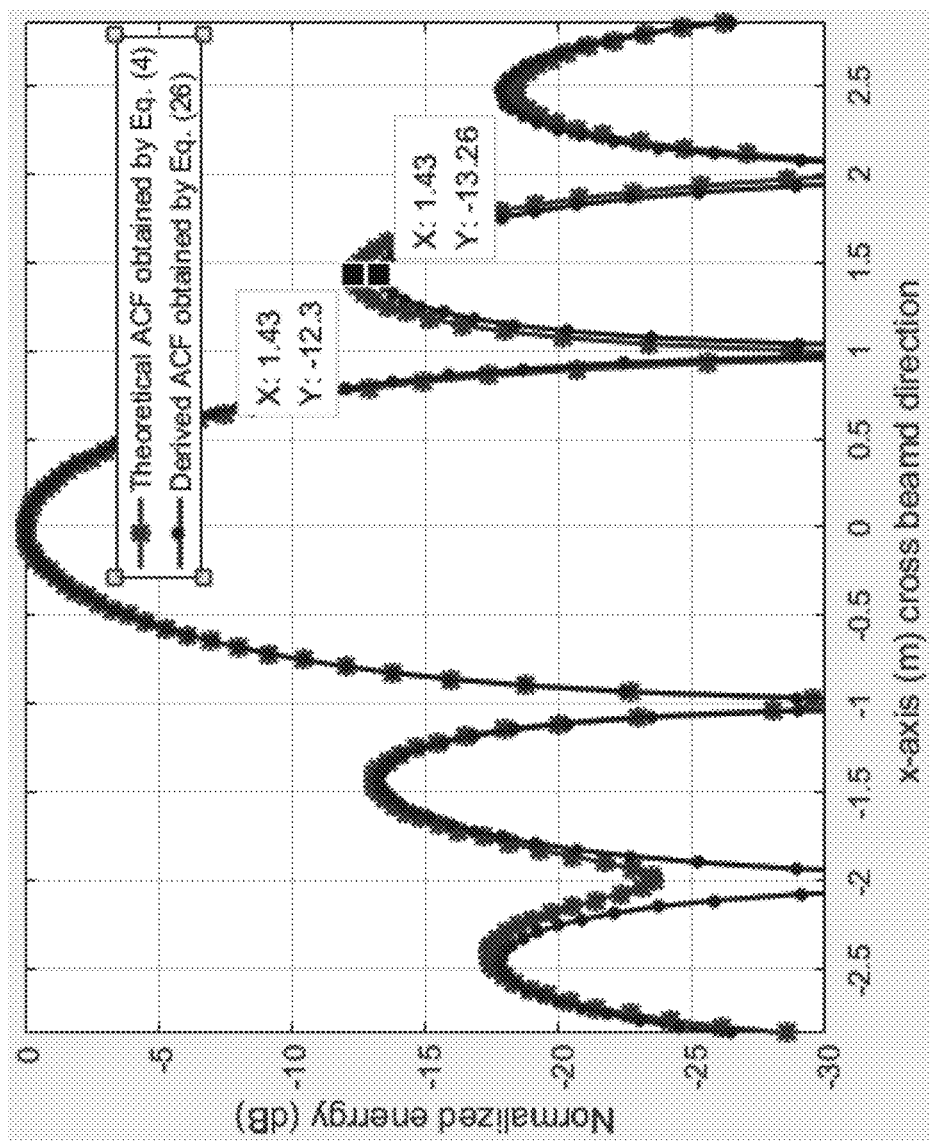
FIG. 3B illustrates an exemplary ACF distribution along the cross beam direction position (x=0) for a speed and position estimation, according to one embodiment of the present teaching.

Evidently, by computing the ACF of the received signal between position $r_0$ and $r_s$, one can get a similar autocorrelation focusing strength (ACFS) as the TRFS in time reversal scheme. To verify this conclusion, one can build a numerical simulation system using a massive MIMO antenna arrays with 50 elements. Also, one can consider a 5G communication system with carrier frequency $f_0=28$ GHz. In FIG. 3, $r_0$ is set as the center of square. The ACFS distribution around $r_0$ in the spatial domain is shown in FIG. 3A, while FIG. 3B specifically demonstrates the ACFS distribution along the cross-beam direction. In FIG. 3B, numerical simulation ACF obtained by (4) is represented by red solid line while the derived ACF obtained by (26) is plotted as blue solid line. FIG. 3 intuitively indicates that the derivation ACFS matches with the theoretical ACFS well in the positions of peaks and valleys.

Figure 4:
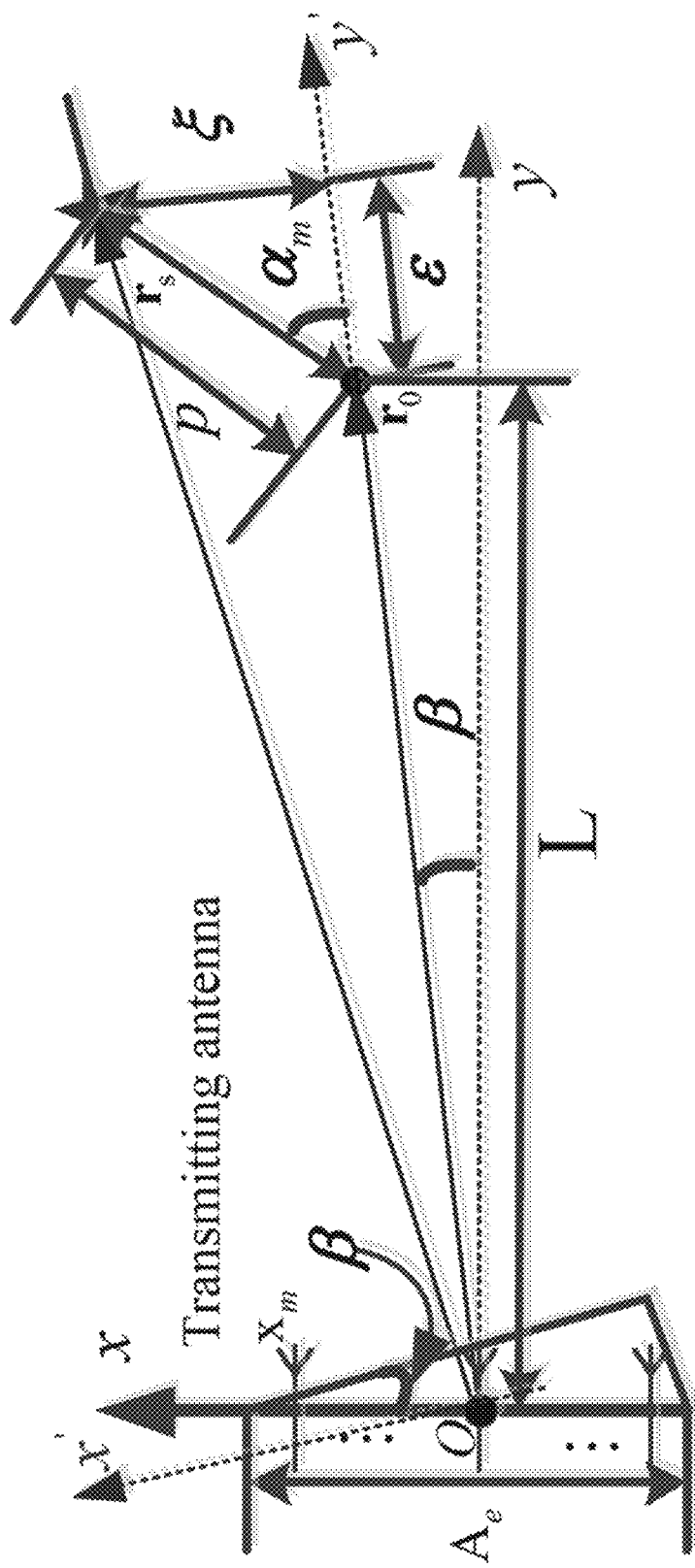
FIG. 4 illustrates an exemplary signal propagation geometry when $r_0$ moves, according to one embodiment of the present teaching.

When the target keeps moving, the line between the antenna center and $r_0$ (i.e., $\overleftarrow{Or_0}$) may not be perpendicular to the direction line (i.e., $\overleftarrow{Ox}$) of the antenna deployment. As shown in FIG. 4, $\overleftarrow{Or_0} \perp \overleftarrow{Ox}$ does not hold always. In this case, the effective aperture $A_e$ in (26) should be changed into $A_e \cos\beta$. Correspondingly, distance L should be replaced by $L/\cos\beta$. This variable transformation is also consistent with the effective aperture definition used in antenna propagation and electromagnetic. Also, interested readers can refer equation (15) for better understanding about this variable transformation process. Next, one can introduce a speed estimation and target localization method based on the ACFS obtained.

Figure 3C:
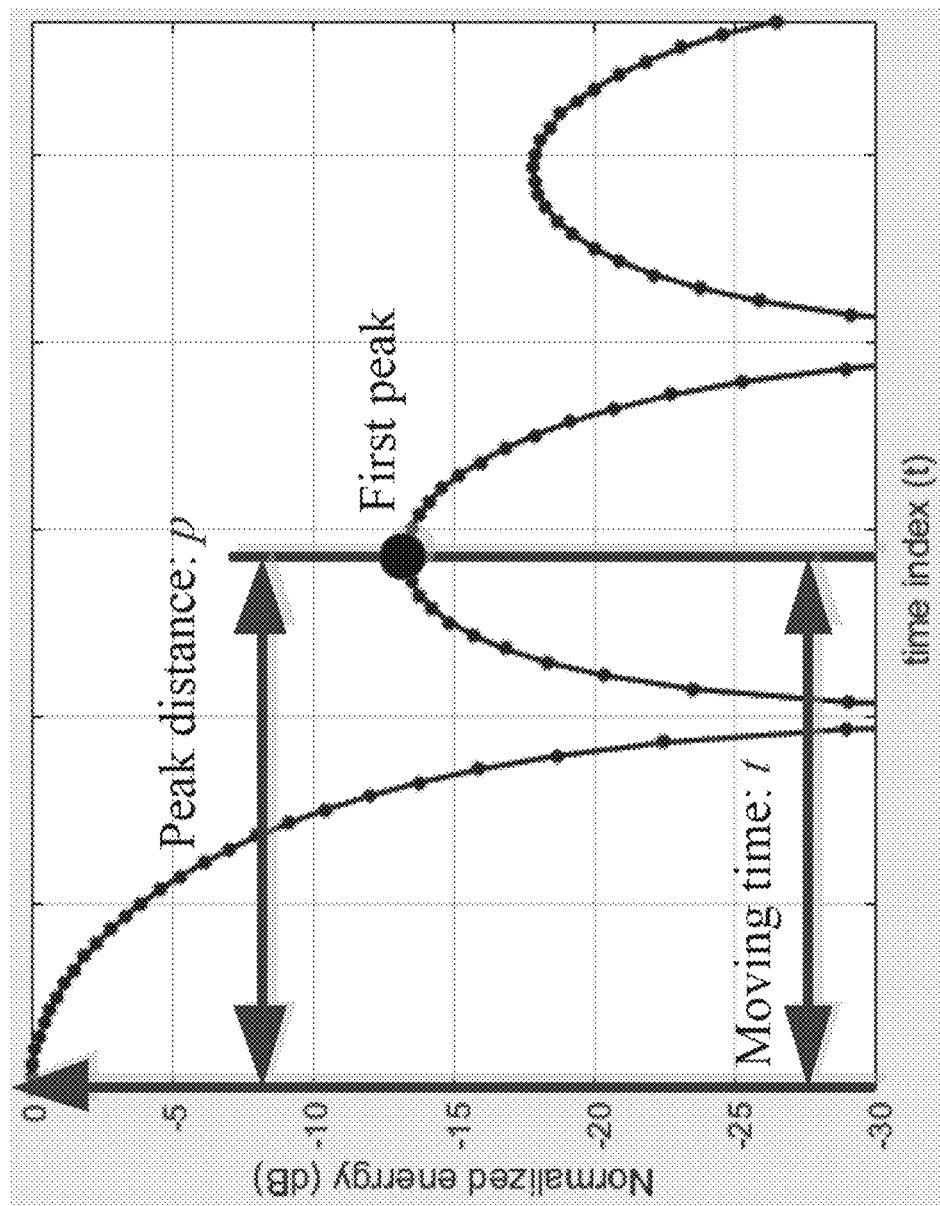
FIG. 3C illustrates an exemplary ACF distribution (x=0, y≥0) and corresponding peak definition for a speed and position estimation, according to one embodiment of the present teaching.

The present teaching discloses a novel target speed estimation method by using the ACFS derived for the massive MIMO system. For description clarity, one can start by defining two directions, i.e., along-beam direction and cross-beam direction as shown in FIG. 3A. Moreover, the peak distance p and corresponding moving time t during which the target moves from the reference position (t=0) to the first peak (time index t) are illustrated in FIG. 3C.

Dating back to the equation (26), the shape of ACFS distribution (shown in FIG. 3A) is determined by four parameters in total including wave number k, distance L, aperture $A_e$ and cross range $\xi$. Since k and $A_e$ are independent of specific locations, the retaining parameters which affect the ACFS distribution are L and $\xi$ only. Moreover, in the far field scenario, $\xi \ll L$ holds in general. In other words, once an initial point is chosen, L can be assumed as a constant when computing the ACFS in the neighbor area around the selected initial point. Therefore, the only parameter which determines the ACFS distribution with respect to an initial point is the cross-range $\xi$.

Consider a special case where the target moves along the cross-beam direction with a constant speed v and the receiver fixed on the target keeps recording signals transmitted by the massive MIMO array with a regular sampling rate. Then, the ACFS measured at the receiver is just a sampled version of function $$\left|\text{sinc}\left(\frac{k\xi A_e}{2L}\right)\right|^2$$

as depicted in FIG. 3B. In this case, the peak distance (denoted by p in FIG. 3C) between the initial point and the first peak of $$\left|\text{sinc}\left(\frac{k\xi A_e}{2L}\right)\right|^2$$

can be computed mathematically, i.e., $p=2.86\ L/kA_e \approx 1.432$ m. Evidently, it is very close to the result p=1.43 m obtained from a simulation experiment.

Next, to estimate the speed v, one can know the moving time t during which the receiver moves from the initial point to the first peak. This is feasible by searching for the time stamp $\hat{t}$ corresponding to the first peak of the ACFS distribution. Accordingly, one can get the speed estimation by $\hat{v}=p/\hat{t}$. Obviously, how to accurately localize the first peak so as to estimate the moving time $\hat{t}$ is a crucial step in this speed estimation method.

Figure 5:
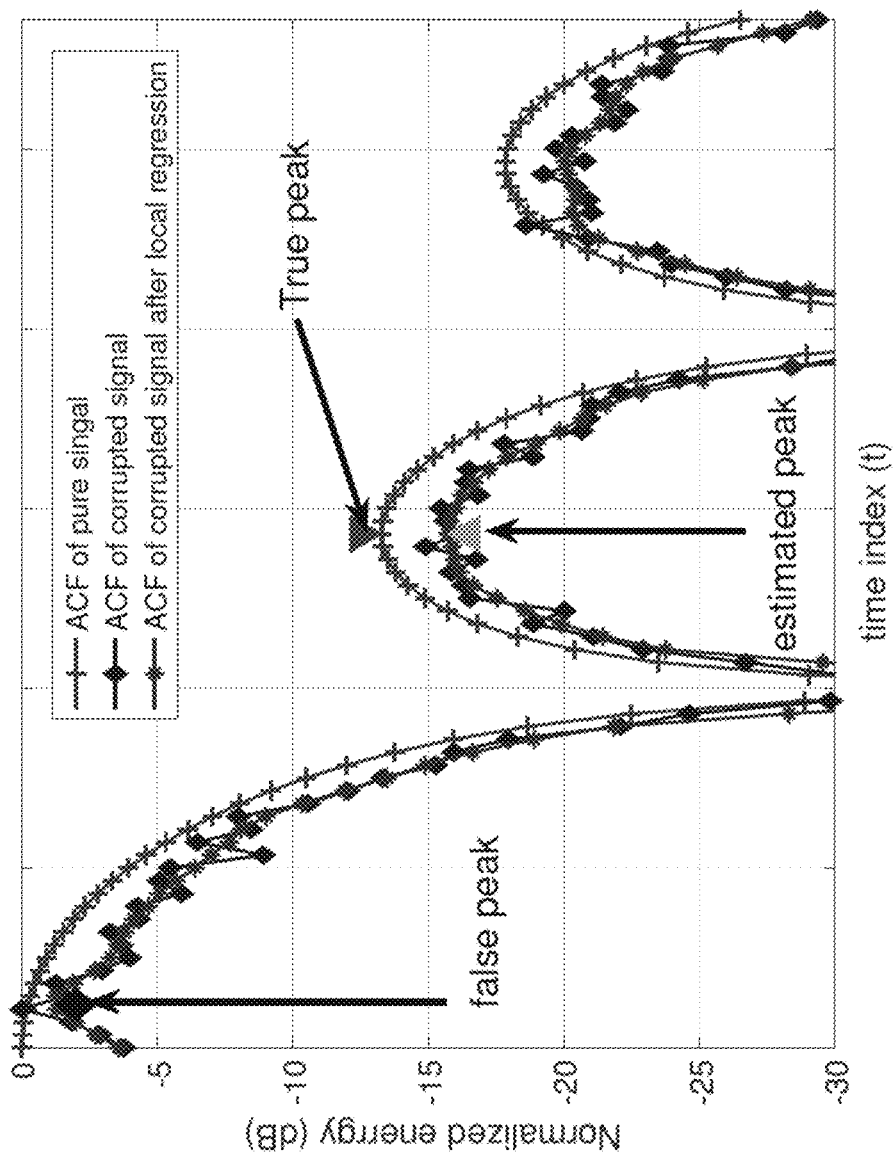
FIG. 5 illustrates an exemplary curve fitting by local regression, according to one embodiment of the present teaching.

To get a more robust result, one can take a local regression method to firstly fit the ACFS distribution curve from which one can find the statistical peak then. This pre-processing is necessary because in practice the true peak may be corrupted by the noise or other distortions. Hence, searching for a peak directly may cause unexpected time estimation error, thus, degrading the speed estimation performance seriously. Numerical simulation in FIG. 5 shows that when the signal is corrupted, there are many glitches in the ACF of the corrupted signal, thus, causing difficulties for us to find the true peak accurately. However, after local regression process, the estimated peak is very close to the actual peak, which shows the effectiveness of the local regression process. On the other hand, the true peak should not be too close to the reference point (t=0) because of the ACF distribution given by equation (26). In practice, the moving velocity is naturally limited (cannot be too fast) which implies that distance between the base station and receiver centers does not change so much during two adjacent measurements. As a result, one can use the last position to get a rough estimation about peak distance p which works as a new constraint to eliminate the obvious false peak shown in FIG. 5.

Figure 6:
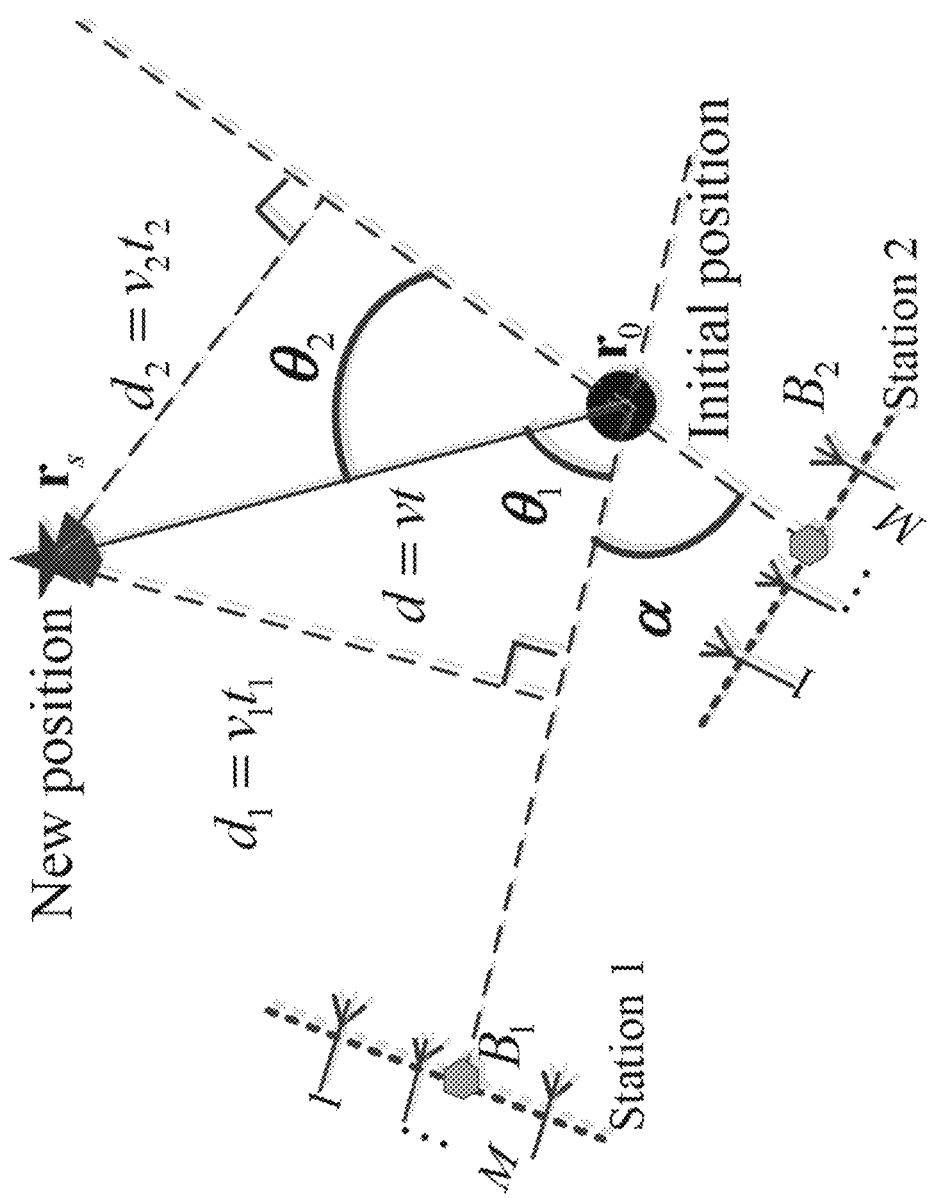
FIG. 6 illustrates an exemplary speed and direction estimation based on a scenario with two base stations, according to one embodiment of the present teaching.

In the former special case, one can easily obtain the speed estimation result under the assumption that the target moves along the cross-beam direction. However this assumption usually does not hold in practice. Take the moving direction $\overrightarrow{r_0 r_s}$ (different from the cross-beam direction) in FIG. 3A as an example. If one can estimate the speed by taking the same method as introduced in the previous special case 1), what one can obtain is actually the estimation of v' rather than the real speed v. The reason is that the peak distance p defined in FIG. 3C is along the cross-beam direction (the same as $\overrightarrow{r_0 r_s}$). Hence, one can only get the estimation of v' in this case. To solve this problem, one can introduce one more station as depicted in FIG. 6. Combining the speed estimation results from these two stations, one can get the equation as follows $$v = \frac{v_1}{\sin\theta_1} = \frac{v_2}{\sin\theta_2}. \quad (27)$$

However, one cannot obtain the value of $\theta_1$ and $\theta_2$ from equation (27) only. Further analysis about the positions of base center $B_1$, $B_2$ and the initial position $r_0$ gives us a promising way to solve $\theta_1$ and $\theta_2$. Specifically, one can get a new equation (28) from the triangular relationship among $B_1$, $B_2$ and $r_0$.

$$180°-\alpha=\theta_1+\theta_2. \quad (28)$$

Figure 7:
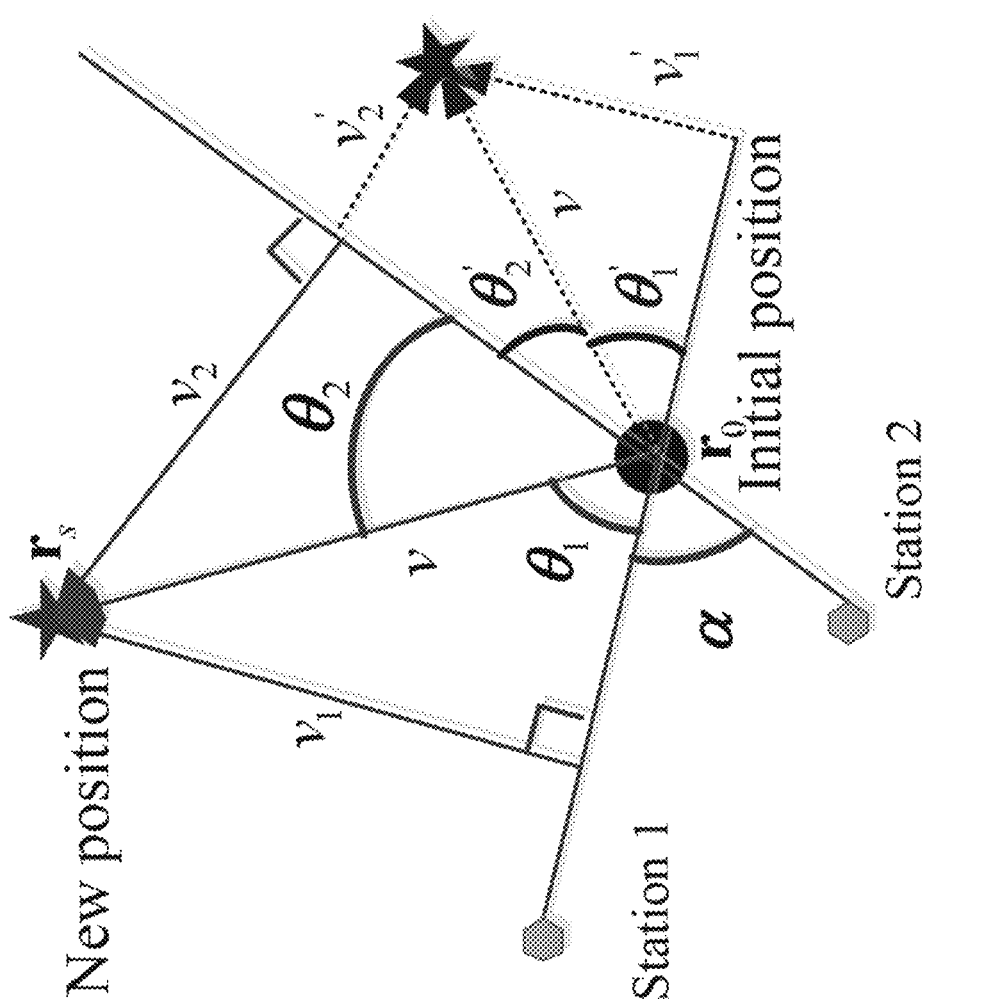
FIG. 7 illustrates an exemplary angle ambiguity caused by a complementary angle, according to one embodiment of the present teaching.

It seems that the problem has been solved perfectly because one can have already obtain an equation group composed by (27) and (28). On the contrary, the angle ambiguity becomes a new problem as shown in FIG. 7. In detail, for every pair of $(\theta_1, \theta_2)$, there exists a coupling pair $(\theta_1', \theta_2')$ because one can only know the ratio $$\frac{\sin\theta_1}{\sin\theta_2} = \frac{v_1}{v_2}$$

from (27) while the summation $\theta_1+\theta_2$ cannot be determined. In other words, without further priori information, one cannot determine whether $\alpha=\theta_1+\theta_2$ or $180°-\alpha=\theta_1+\theta_2$. For example, if one can assume $(\theta_1, \theta_2)=(50°, 70°)$, one may get the following coupling equation groups $$\begin{cases} \frac{\sin\theta_1}{\sin\theta_2} = \frac{v_1}{v_2} = 0.8152 \\ \theta_1 + \theta_2 = 120° \end{cases} \Rightarrow \begin{cases} \theta_1 = 50° \\ \theta_2 = 70°' \end{cases} \quad (29)$$

$$\begin{cases} \frac{\sin\theta_1'}{\sin\theta_2'} = \frac{v_1}{v_2} = 0.8152 \\ \theta_1' + \theta_2' = 60° \end{cases} \Rightarrow \begin{cases} \theta_1' = 26.63° \\ \theta_2' = 33.37°' \end{cases} \quad (30)$$

Figure 8:
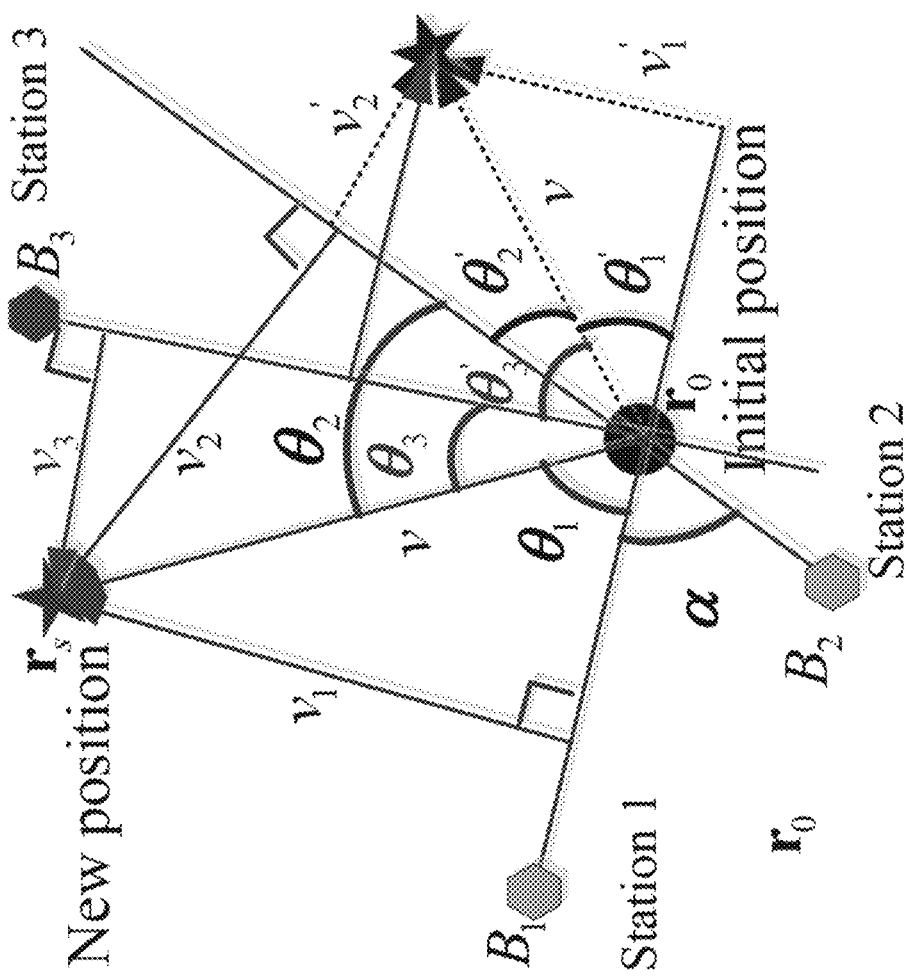
FIG. 8 illustrates an exemplary speed estimation based on a scenario with three base stations, according to one embodiment of the present teaching.

Next, one can firstly solve the angle ambiguity problem by introducing an extra station as shown in FIG. 8. To better understand the function of the third base station, one can take one particular case as an example. In FIG. 8, one can assume $(\theta_1, \theta_2, \theta_3)=(50°, 70°, 30°)$ is the true value. According to the aforementioned process, by only using base 1 and base 2, one can get the following results $$\begin{cases} \theta_1 = 50° \\ \theta_2 = 70° \end{cases} \Rightarrow \begin{cases} \theta_1' = 26.63° \\ \theta_2' = 33.37°' \end{cases} \quad (31)$$

Similarly, by using base 1 and base 3, one can get another pair of value $$\begin{cases} \theta_1 = 50° \\ \theta_3 = 30° \end{cases} \Rightarrow \begin{cases} \theta_1' = 64.05° \\ \theta_3' = 35.95°' \end{cases} \quad (32)$$

The true value of $\theta_1$ is unique. In other words, the $\theta_1$ value obtained from (31) and (32) should be the same. Hence, the value of $\theta_1$ can be accurately selected by comparing these two pair of results. In sequence, $\theta_2$ and $\theta_3$ can be further determined.

Figure 9:
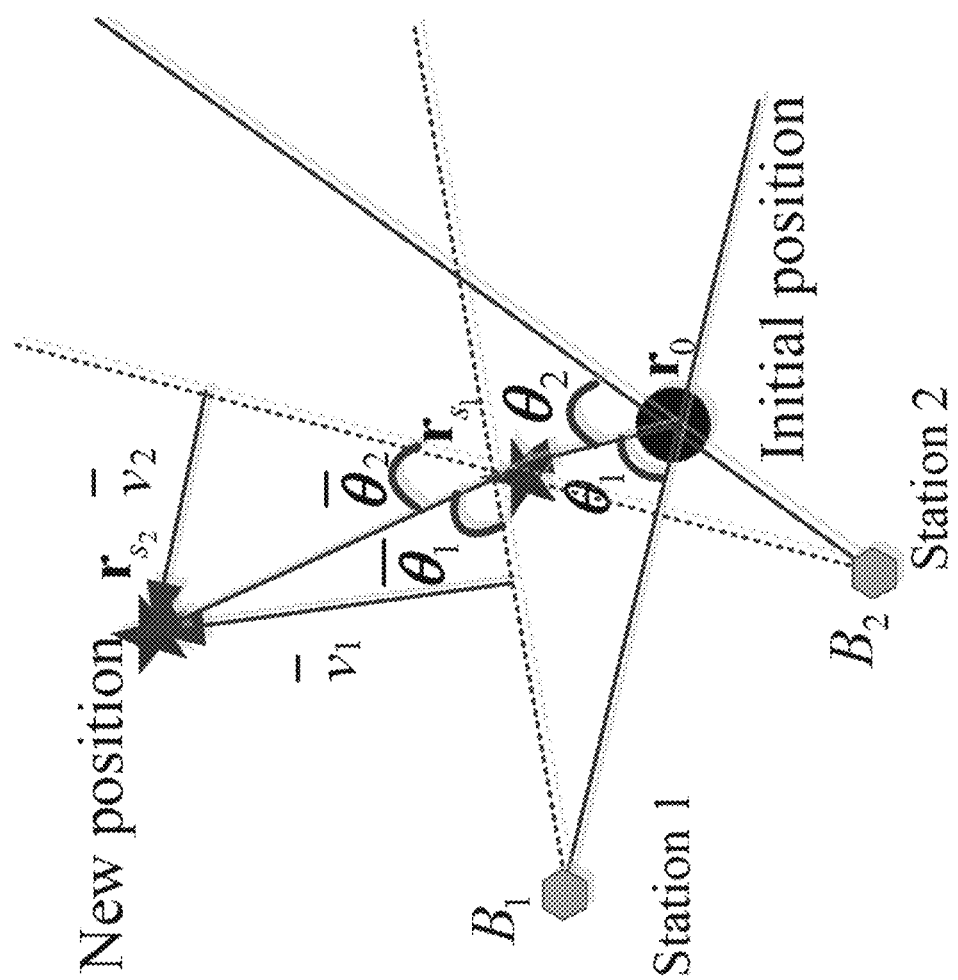
FIG. 9 illustrates two adjacent positions $r_{s_1}$ and $r_{s_2}$, according to one embodiment of the present teaching.

Once one gets the initial value of $(\theta_1, \theta_2, \theta_3)$, the third station can be omitted in the following process because one can get a new constraint. Specifically, due to the natural limitations about the moving velocity and the high sampling rates of the devices (embedded in the receiver), the direction of one particular moving object cannot be changed too rapidly between two adjacent locations. FIG. 9 intuitively demonstrates the new constraint. If the value $(\theta_1, \theta_2)=(50°, 70°)$ is already known, then in next position $r_{s_1}$, one may get two pair of values $(\overline{\theta}_1, \overline{\theta}_2)=(51°, 29°)$ and $(\overline{\theta}_1', \overline{\theta}_2')=(65.43°, 34.57°)$. With the new constraint, $(\overline{\theta}_1, \overline{\theta}_2)$ holds a high probability to be $(\overline{\theta}_1, \overline{\theta}_2)=(51°, 29°)$ because they are more close to the previous value $(\theta_1, \theta_2)=(50°, 70°)$. From this point of view, one can effectively eliminate the angle ambiguity by using just two stations as long as one can get the initial value of $(\overline{\theta}_1, \overline{\theta}_2)$. In consequently, real speed v can be estimated.

Figure 10A:
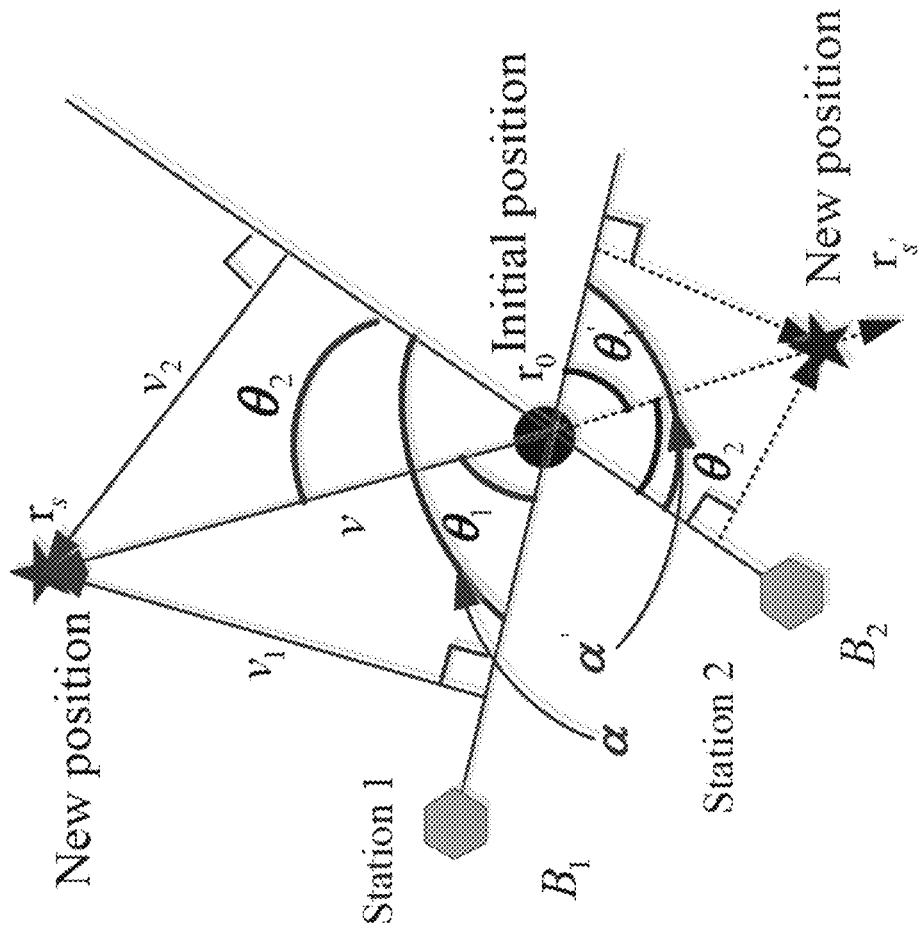
FIG. 10A shows a geometrical illustration of opposite vertical angle ambiguity for two stations, according to one embodiment of the present teaching.
Figure 10B:
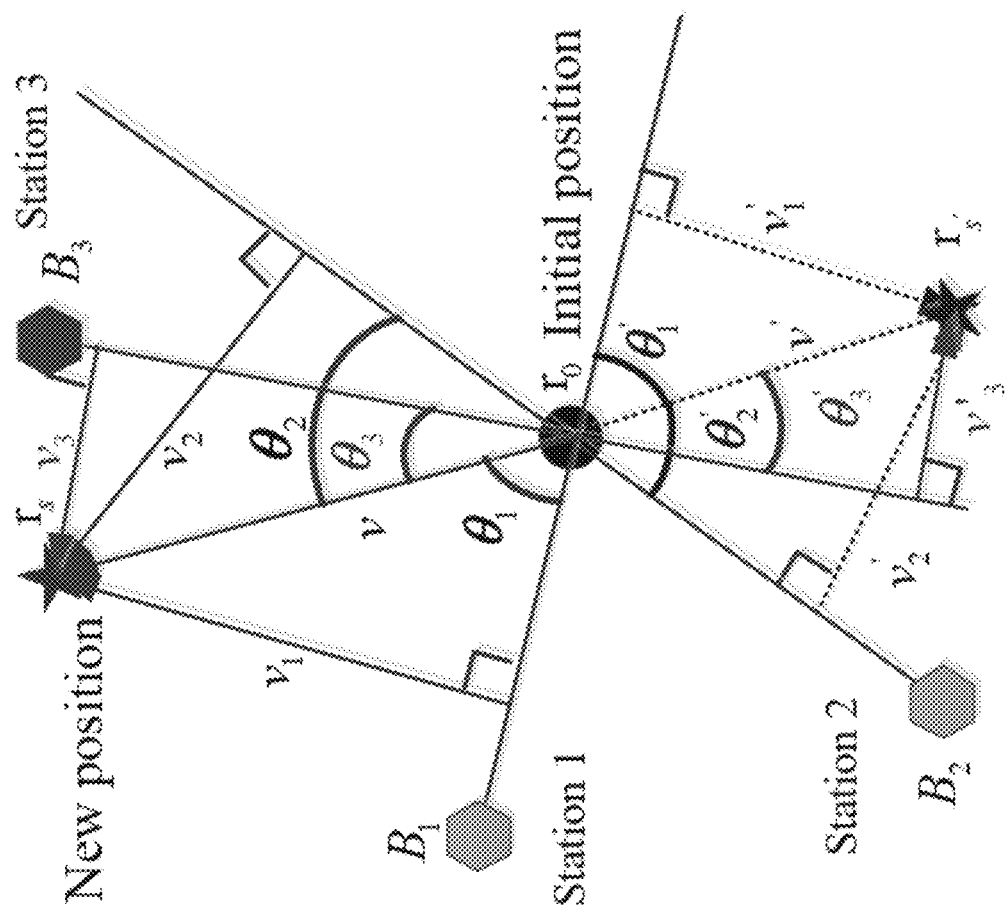
FIG. 10B shows a geometrical illustration of opposite vertical angle ambiguity for three stations, according to one embodiment of the present teaching.
Figure 11:
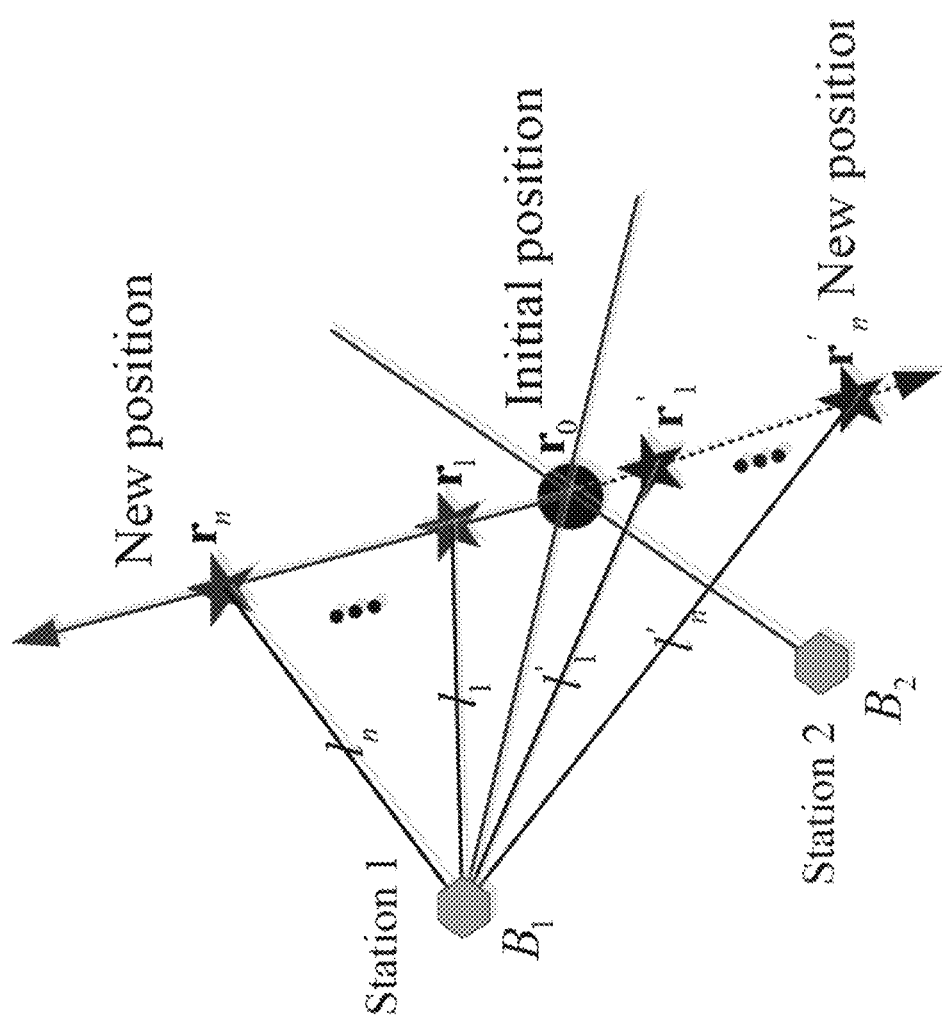
FIG. 11 shows a geometrical illustration of two adjacent positions $r_{s_1}$ and $r_{s_2}$, according to one embodiment of the present teaching.

As illustrated in FIG. 10A, even one knows the initial angle of $(\theta_1, \theta_2)$, one cannot distinguish it from its opposite vertical angle pair $(\theta_1', \theta_2')$ painted in blue. In this case, simply adding an extra station $B_3$ does not help. FIG. 10B intuitively depicts the reason that there is also another opposite vertical angle $\theta_3'$ with respect to $\theta_3$. Clearly, it is a geometrical ambiguity problem which is independent with the station number. This problem is solved by considering a consecutive movement process shown in FIG. 11. Assuming sequence $r_0, r_1, \ldots, r_n$ is the true position of the target moving, one can denote the peak distance between two adjacent positions $r_{i-1}, r_i$ as $p_{(i-1,i)}$, $i \in [1, 2, \ldots, n]$. As a result, $p_{(i-1,i)}$ will either increase of decrease with the target moving toward to or far away from the reference base station $B_1$. The intrinsic reason comes from the ACFS distribution expressed in (26) which shows that the peak distance p is proportional to the distance L between the base center and the receiver. From this point of view, then variation trend (increasing or decreasing) of $p_{(i-1,i)}$ works as a sign to judge the moving direction. Note that Doppler frequency of the receiving signal may be another way to judge the moving direction since it increases when the target moves close to the base station and decreases with the target moves away. Then, one can estimate the target localization by the following methods.

Figure 12:
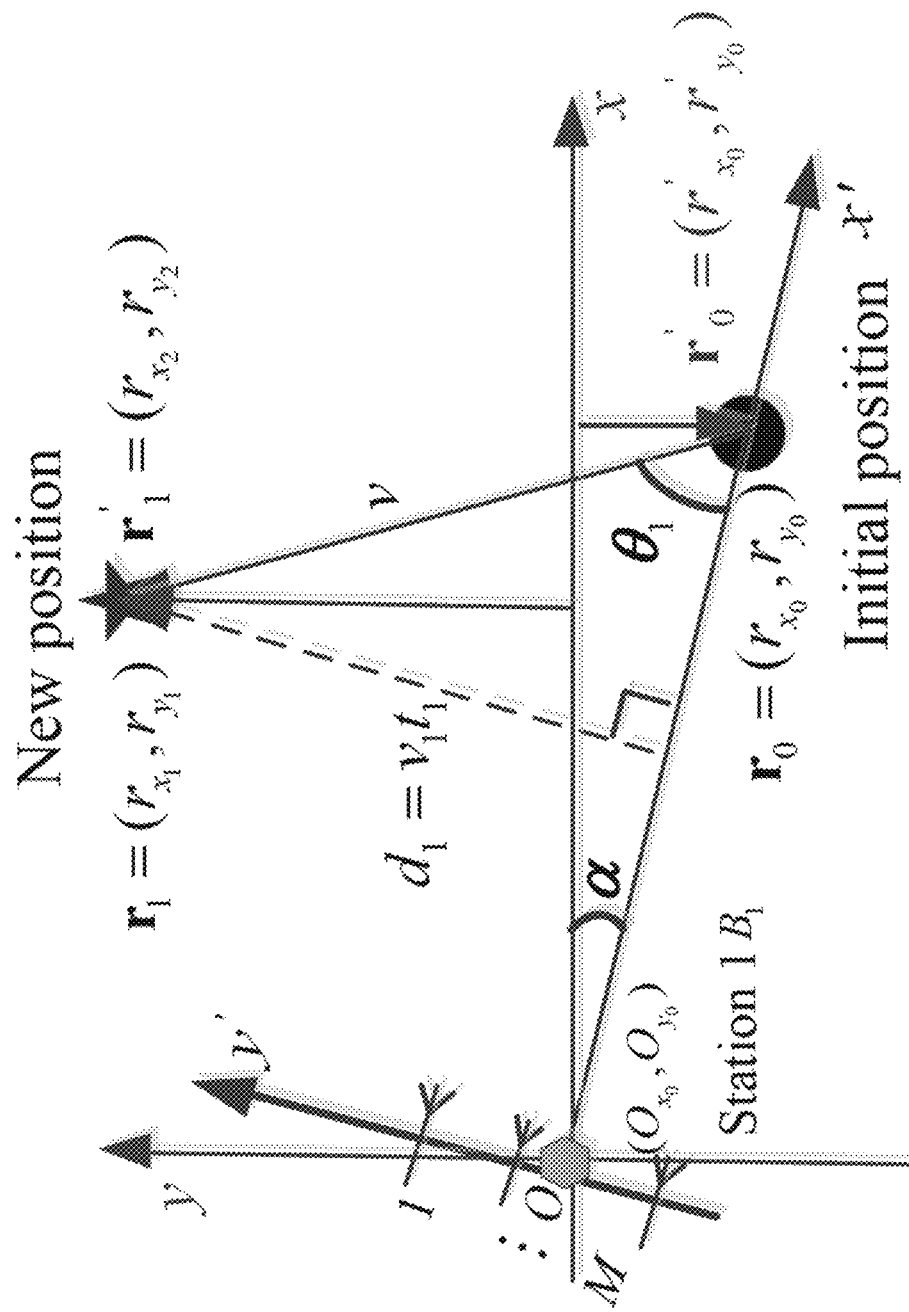
FIG. 12 shows another geometrical illustration of opposite vertical angle ambiguity, according to one embodiment of the present teaching.

Once one can get the accurate value of $\theta_1$, peak distance pi and the sign (close to or far away from) the base station (take station 1 as an example shown in FIG. 12), one can compute the coordinates of the new position $r_1$ in the x'Oy' Cartesian coordinates as follows $$\begin{cases} r_{x_1} = r_{x_0} - p_1\cos\theta_1 \\ r_{y_1} = r_{y_0} + p_1\sin\theta_1 \end{cases}, \quad (33)$$

Then, by a simple coordinate system transformation, one can transform the $(r_{x_1}, r_{y_1})$ into the absolute coordinate system xOy by the following $$\begin{bmatrix} r_{x_1'} \\ r_{y_1'} \end{bmatrix} = \begin{bmatrix} r_{x_1} r_{y_1} \\ r_{y_1} - r_{x_1} \end{bmatrix} \begin{bmatrix} \cos\alpha \\ \sin\alpha \end{bmatrix}. \quad (34)$$

Consequently, one can get the new position of $r_1$ with respect to the xOy coordinate system which takes the base station center $B_1$ as the original point. Since the base station position information in 5G systems is a-priori, one can easily compute the exact position of $r_1$ as well. By updating $r_1$ as the new initial point and repeating the aforementioned localization process, one can then get the new position sequence $r_2, r_3, \ldots, r_n$, which tracks the target timely.

Figure 14:
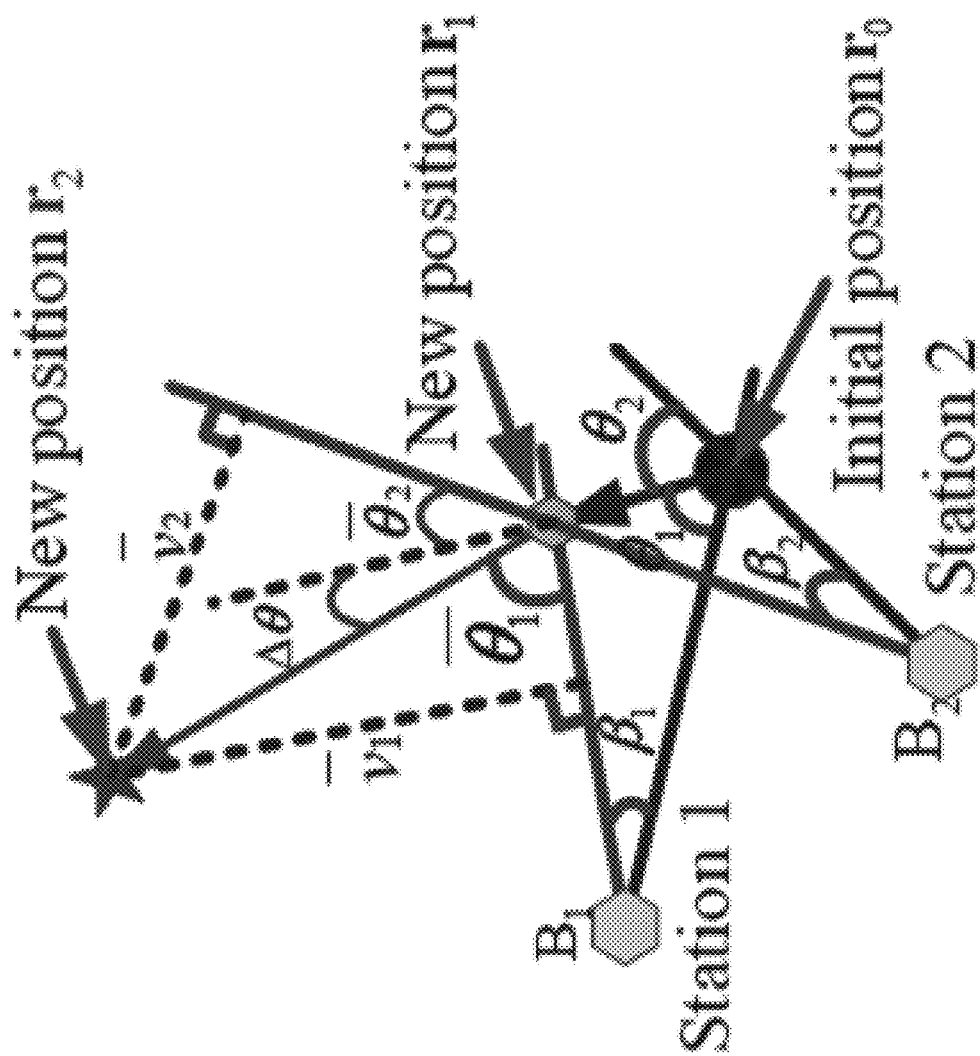
FIG. 14 illustrates an exemplary method for direction updating, according to some embodiments of the present teaching.

FIG. 14 shows three consecutive adjacent points $r_0, r_1$ and $r_2$ along the moving trace. $r_0$ is the initial point and $\Delta\theta$ is the turning angle. From equations (27) and (28), one can obtain the estimation of $\theta_1, \theta_2$ and the true speed v. Thus, one can have $|r_0r_1|=vt$ and the distance between the target and BS $$|B_1r_1|=\sqrt{|B_1r_0|^2+|r_0r_1|^2-2|B_1r_0||r_0r_1|\cos\theta_1}. \quad (35)$$

Once the new $|B_1r_1|$ is obtained, one can update the ACFS distribution to estimate a new pair of $(\overline{v}_1, \overline{v}_2)$. By using triangular relationships, one can also easily get $\beta_1, \beta_2$ and $$\begin{matrix} \overline{\theta_1} + \Delta\theta = \theta_1 + \beta_1 \\ \overline{\theta_2} = \theta_2 - \beta_2 \end{matrix} \Rightarrow \overline{\theta_1} + \overline{\theta_2} + \Delta\theta \text{ is obtained.} \quad (36)$$

Then, one can update equations (27) and (28). Finally, one may use $(\overline{v}_1, \overline{v}_2)$ and $\overline{\theta_1}+\overline{\theta_2}+\Delta\theta$ to estimate $\overline{\theta_1}$ and $\overline{\theta_2}$ respectively.

In one embodiment, assuming that $r_0$ is the initial location and target moves from $r_0$ to $r_1$, the main steps of a massive MIMO algorithm according to a disclosed method can be summarized as the following steps.

Step 1: get the initial location information about the base station $B_1$, $B_2$ and $r_0$; and compute the initial distance $L_1=|B_1r_0|$, $L_2=|B_2r_0|$.

Step 2: compute $\theta_1+\theta_2$ according to the location information of $B_1$, $B_2$, $r_0$. In the initial iteration, a third base station is needed to determine whether $\theta_1+\theta_2$ is an acute angle or obtuse angle because they own same after "sin(•)" However, after the initial iteration, the third BS is not needed any more, because the previous $\theta_1+\theta_2$ can be an auxiliary constraint to help to determine whether $\theta_1+\theta_2$ is an acute angle or obtuse angle.

Step 3: based on the received signal, compute the ACFS to get the peak width $d_1$ and $d_2$.

Step 4: when a target moves from $r_0$ to $r_1$, use the following equations (A1) and (A2) to compute $\theta_1, \theta_2$ and absolute moving speed v.

$$v = \frac{v_1}{\sin\theta_1} = \frac{v_2}{\sin\theta_2}. \quad (A1)$$

$$180° - \alpha = \theta_1 + \theta_2. \quad (A2)$$

Step 5: compute the moving distance $p=v \cdot T_{win}$. $T_{win}$ is a pre-set parameter.

Step 6: once p, $\theta_1$ and $\theta_2$ are obtained, the location of $r_0$ can be estimated by $$\begin{cases} r_{x_1} = r_{x_0} - p_1\cos\theta_1 \\ r_{y_1} = r_{y_0} + p_1\sin\theta_1 \end{cases}. \quad (A3)$$

Step 7: transform the $(r_{x_1}, r_{y_1})$ into the absolute coordinate system xOy by the following (A4) to get the location of $r_1$.

$$\begin{bmatrix} r_{x'_1} \\ r_{y'_1} \end{bmatrix} = \begin{bmatrix} r_{x_1} r_{y_1} \\ r_{y_1} -r_{x_1} \end{bmatrix} \begin{bmatrix} \cos\alpha \\ \sin\alpha \end{bmatrix} \quad (A4)$$

Step 8: go back to Step 1 and Step 2 and update $L_1=|B_1 r_0|$, $L_2=|B_2 r_0|$ and $\theta_1+\theta_2$, and continue to track the target.

Simulations are conducted to verify the speed and location estimation performance of the disclosed method by using future 5G communication system. The carrier frequency is set as $f_c=28$ GHz. The range between the base station and receiver is assumed to within 200 m. The inner element distance is set as $\lambda_0$, wavelength of the signal.

Figure 13A:
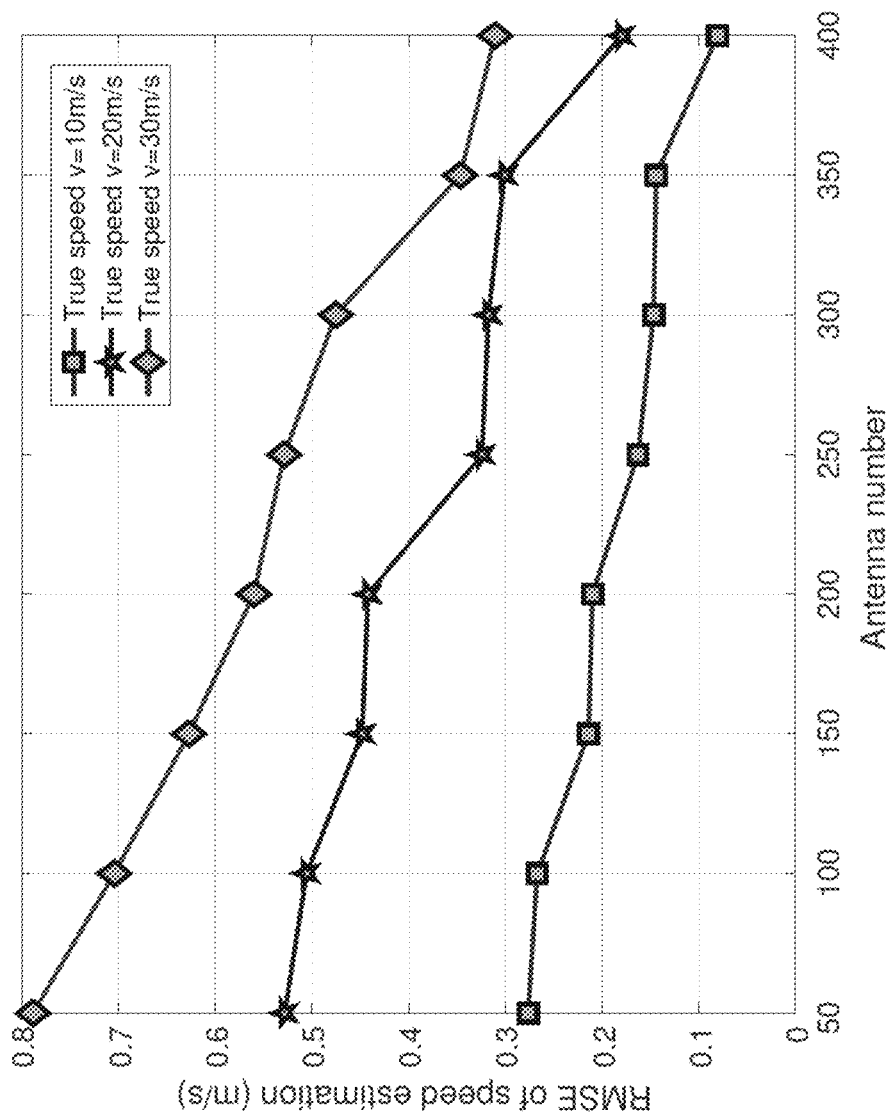
FIG. 13A illustrates speed estimation error versus antenna number, according to one embodiment of the present teaching.
Figure 13B:
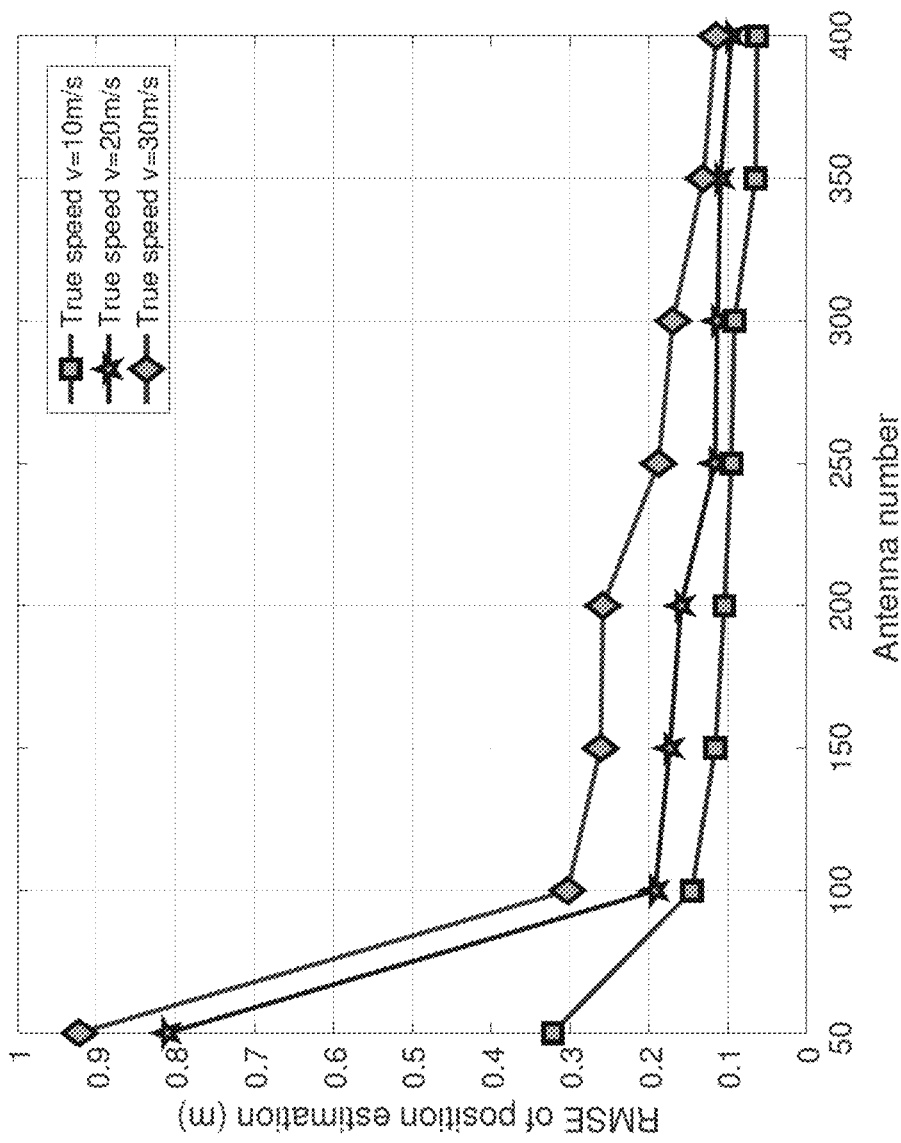
FIG. 13B illustrates position estimation error versus antenna number, according to one embodiment of the present teaching.
Figure 13C:
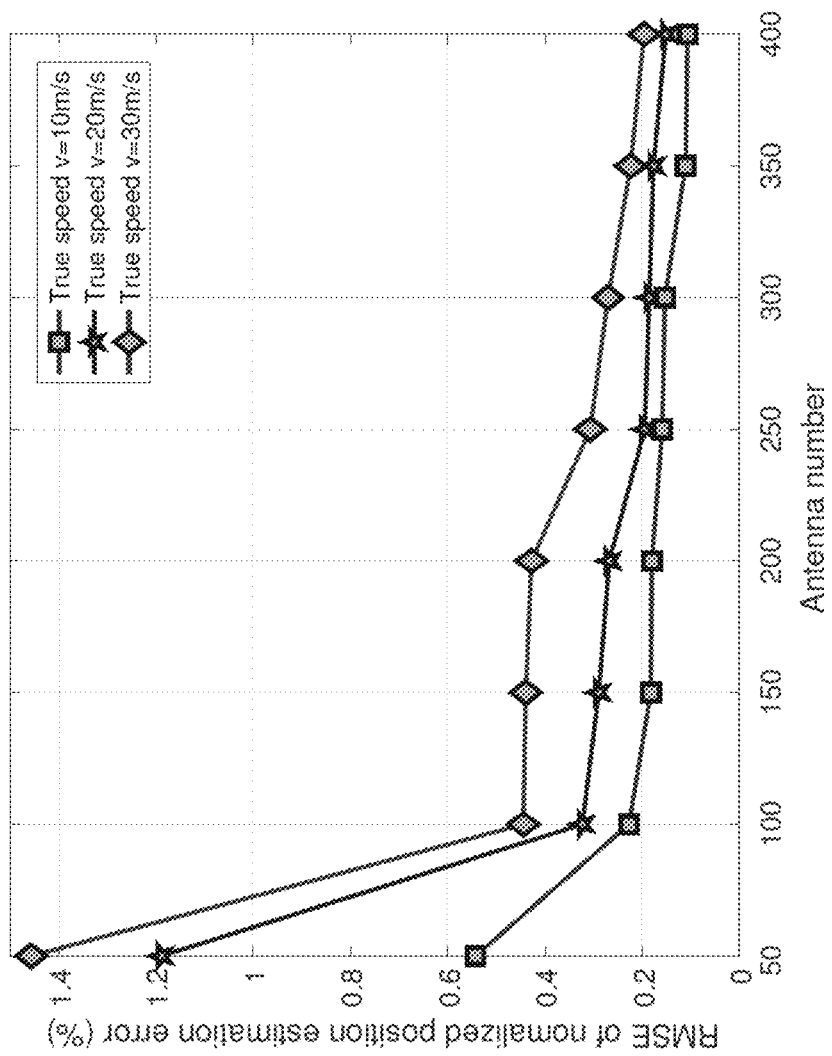
FIG. 13C illustrates normalized position estimation error versus antenna number, according to one embodiment of the present teaching.

To explore how antenna number impacts the speed and position estimation performance, one can conduct extensive Monte Carlo simulations with SNR fixed as 10 dB to get the Root Mean Square Error (RMSE) of corresponding estimation results as shown in FIGS. 13A-13C. It is evident that both speed and position estimation accuracy are improved with the increment of antenna number. Specifically, when antenna number is less than 100, it may not work well when the moving velocity is too fast (e.g., v=30 m/s in FIGS. 13A-13C). However, the disclosed system can localize the target within 0.3 m accuracy for different speed scenarios when the antenna number is no less than 100. However, when M is greater than a specific threshold, i.e., M=200, this approximation does not improve obviously anymore. Note that when antenna number M approaches to 400, the position estimation error can be as low as 8 cm, which indicates centimeter accuracy in another aspect.

The disclosed method works especially well when antenna number is greater than 50. Intuitively, one cannot harvest enough signal components to observe the so called TRFS phenomenon. In mathematical terminology, approximation in equation (15) does not hold when M is too small.

The disclosed outdoor tracking is a new candidate for outdoor target localization when the 5G based massive MIMO deployment is applicable and the when GPS satellite signal is blocked by buildings in the urban area. The disclosed system can guide pedestrians to their destination with a centimeter accuracy in a typical metropolitan area where skyscrapers stand along the street densely which will block the GPS from functioning reliably. The disclosed system is also capable of estimating the walking speed of user, which can be used for health monitoring. The gathered walking information of pedestrians in a specific area can also be used to perform geographical based behavior and activity analysis.

In one embodiment, some lower-layer details (e.g. a mode, an operation, a transmission, a measurement, a capability, an information, a feedback) of a method/system/device may enable a higher layer application (e.g. software) to perform wireless sensing. WSE means an enabling of wireless sensing. Suppose an application (e.g. a software application, a mobile app, an embedded software, a firmware, etc.) wants to perform wireless sensing based on some wireless data (e.g. WSE measurement) obtained at some lower layers. In the present teaching, WSE refers to anything (e.g. a mode, a capability, a wireless transmission, a measurement, an operation, an information, a feedback) in the Physical (PHY) layer, or Median-Access (MAC) layer, or other layers below the application layer, of any Type 1 heterogeneous wireless device (transmitter or TX) or any Type 2 heterogeneous wireless device (receiver or Rx) or another device (e.g. a local server, a cloud server) that enable the applications to perform wireless sensing.

WSE mode is a mode that enables wireless sensing. It may be a standard-compliant mode in PHY layer or MAC layer or other layer below the application layer. In the WSE mode, standard-compliant devices (e.g. the Type 1 device(s), and/or the Type 2 device(s)) may perform a WSE operation, request/set up WSE transmissions, make WSE measurements (e.g. compute CSI) based on the WSE transmission, make the WSE measurement, information, and feedback available to the application for the sake of wireless sensing.

WSE capability is a capability of a device that enables wireless sensing. The Type 1 device and/or Type 2 device and/or another device may have WSE capability because they are capable of performing WSE operations, request/set up/perform/handle WSE transmission, make WSE measurements, compute/generate/handle WSE information, etc. A device compliant to a standard with a WSE mode will automatically be WSE capable.

WSE transmission is a (wireless) transmission that enables wireless sensing. The wireless signal (e.g. probe signal, beacon signal, null data packet, etc.) sent from the Type 1 device to the Type 2 device is a WSE transmission that allows the Type 2 device to make WSE measurements (e.g. CSI), especially in a WSE mode. WSE measurement is a measurement that enables wireless sensing. For example a Type 2 device may receive the wireless signal from the Type 1 device and compute WSE measurements (e.g. CSI) based on the received wireless signal. WSE operation is an operation that enables wireless sensing. The operation may comprise request/set up WSE transmissions, make WSE measurements (e.g. compute CSI) based on the WSE transmission, make the WSE measurement, information, and feedback available to the application for the sake of wireless sensing. WSE information is information related to the WSE measurements. WSE feedback is a feedback related to the WSE measurements, the WSE transmission, the WSE operations.

In one embodiment, the application to perform wireless sensing may use an interface above MAC layer to request, control (e.g. set up, set alert) and obtain WSE transmission and WSE measurements in the MAC and/or PHY layers. The request and the control may cause the Type 1 device and/or the Type 2 device (both devices with WSE capability) to operate in a standard-compliant WSE mode. The Type 1 device and the Type 2 device may exchange (e.g. handshake) WSE capabilities. In the standard-compliant WSE mode, the Type 1 device transmits a wireless signal to the Type 2 device, wherein the wireless signal is a WSE transmission. The wireless signal may include an indication (e.g. a bit or a flag) that it is a WSE transmission from which any compatible Type 2 device can make WSE measurements.

The WSE transmission by the Type 1 device may be requested by the Type 2 device or another device. The WSE transmission may also be unsolicited (i.e. transmitted by the Type 1 device without any request from the Type 2 device or another device). The WSE transmission may be partly requested and/or partly unsolicited WSE measurements, WSE information and/or WSE feedback may be exchanged by the Type 2 device with another device (e.g. the Type 1 device, a local server, a cloud server), the application and/or another application. The exchange may be secured. The WSE measurement may be in a secure format. A transmission of the WSE measurement may be secured.

Figure 15:
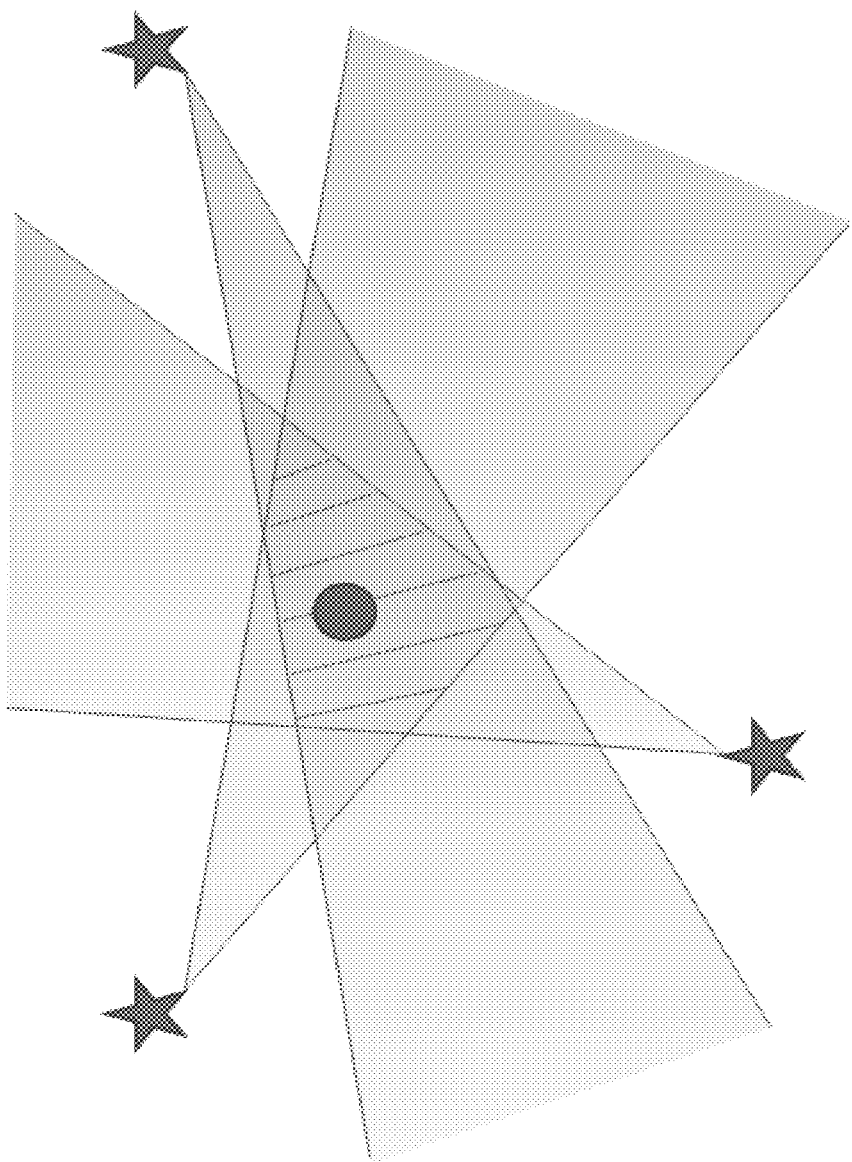
FIG. 15 illustrates a convex hull formed by AoA measurements, according to one embodiment of the present teaching.

In one embodiment, considering 5G networks, a receiver measures the received signal strength (RSS) and beam direction information (a.k.a., Angle of Arrival, AoA) from multiple 5G base stations. Denote the RSS measurements as $R=\{r_1, r_2, \ldots, r_N\}$ and the AoA as $\Theta=\{\theta_1, \theta_2, \ldots, \theta_N\}$, where $r_1$ and $\theta_1$ are the RSS and AoA of the ith hearable base station $b_1$ and N is the total number of nearby base stations. The locations of the N base stations are known as $X=\{x_1, x_2, \ldots, x_N\}$. The positioning task is to obtain the location estimate of the receiver, denoted as x. FIG. 15 illustrates a convex hull formed by AoA measurements.

The AoA measurements can determine a feasible zone of x as convex hull. Considering an error term of the AoA estimate, arising from both the imperfect beam patterns and the measurement noises, the feasible direction to a base station $b_i$ becomes $[\theta_i-\Delta\theta, \theta_i+\Delta\theta]$, forming a cone area for candidate locations of x. Such zones of multiple base stations, assuming the AoA estimates are accurate, will intersect a convex hull, denoted as ConvexHull($\hat{\Theta}$), in which the true location of the receiver falls. Here $\hat{\Theta}=\{\Theta+\Delta\theta, \Theta-\Delta\theta\}$ denotes the directional beams given the AoA measurements $\Theta$, and $\Delta\theta$ is the known beam width of the base stations plus a minor error term to account for measurement noises.

Figure 16:
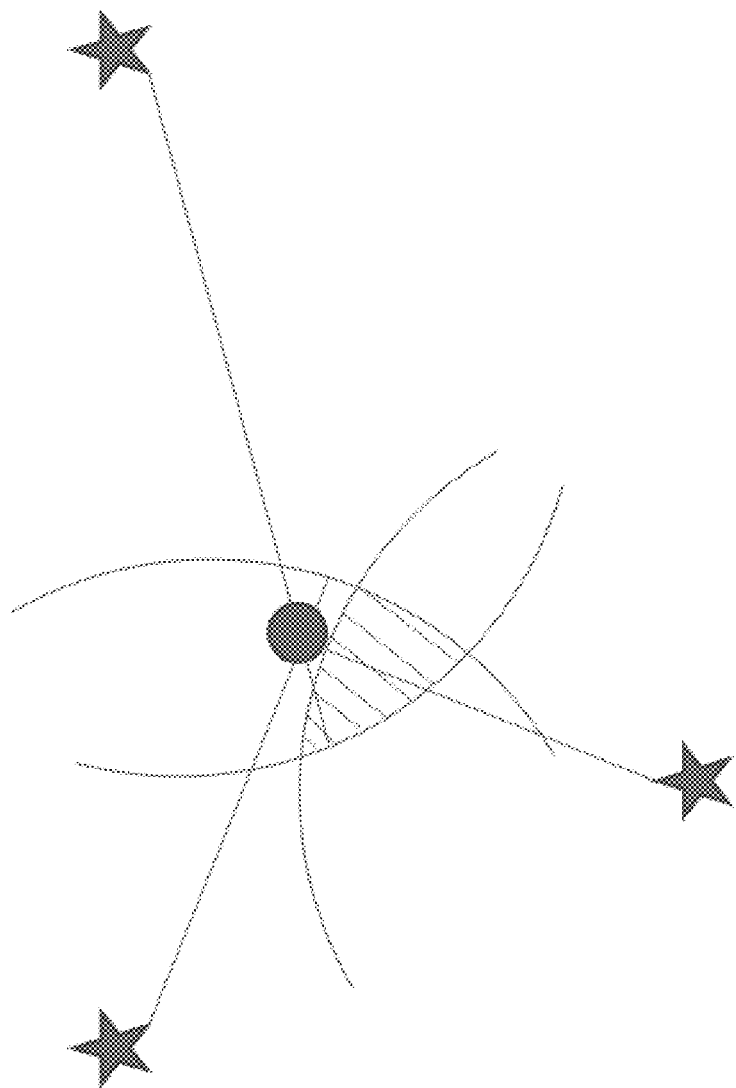
FIG. 16 illustrates a method of target positioning by RSS-based ranging, according to one embodiment of the present teaching.

The RSS measurements R could be converted into distance estimates via certain signal propagation models. Thanks to the high carrier frequency of 5G networks, typically at millimeter wave frequency band, the signals mainly undergo Line-Of-Sight propagation with few multipath effects, underpinning high-precision distance estimation from RSS. And like AoA, such distance constrains, if sufficiently accurate, will intersect an area as the feasible zone for x. FIG. 16 illustrates a method of target positioning by RSS-based ranging. While the location of the receiver can be obtained by either AoA or RSS measurements separately, the accuracy may be limited due to potential measurement errors. Therefore, an algorithm is disclosed to jointly leverage the AoA and RSS information for precise positioning of the receiver.

The distance estimation based on RSS will be derived from the log-normal shadowing path loss model with reasonable accuracy in 5G networks.

$$r_i = PL(d_0) + 10\eta\log_{10}\frac{\|x-x_i\|}{d_0} + n,$$

where $PL(d_0)$ is a known reference power value in dBm at a reference distance $d_0$ from the base station, $\eta$ is the path loss exponent, and n denotes a noise term as a zero-mean Gaussian distributed random variable with standard deviation a, i.e., $n \sim \mathcal{N}(0, \sigma^2)$.

The task is formulated as an optimization problem. Given observations R, $\Theta$, X, the location with maximum likelihood is found by $$x^* = \underset{x}{\mathrm{argmax}} P(x|R, \Theta)$$
$$\text{s.t. } x \text{ in } ConvexHull(\hat{\Theta}).$$

Assuming the RSS and AoA measurements from different base stations are independent from each other, $P(x|R, \Theta)$ can be expressed as $$P(x|R, \Theta) = \prod_{j=1}^{N} P(x|r_i, \theta_i) =$$

-continued
$$\frac{1}{(2\pi\sigma^2)^{N/2}} \prod_{i=1}^{N} \exp\left(-\frac{1}{2\sigma^2}\left(PL(d_0) + 10\eta\log_{10}\frac{\|x-x_i\|}{d_0} + G_i(\theta_i) - r_i\right)^2\right).$$

Here $G\_i$ ($\theta\_i$) indicates the beamforming gain under the specific beam pattern associated with $\theta\_i$ of base station $b\_i$. The above problem can be solved by many solvers, such as Expectation-Maximization (EM) algorithms. Alternating Direction Method of Multipliers, Genetic Algorithms, or Simulated Annealing algorithms.

The probability P(x|r_i,$\theta$_i) is expressed with one theoretical path loss model. Other models could also be used here, especially accounting the channel propagation properties of 5G networks. The path loss model can also be derived from experimental data measurements rather than a theoretical one Using a different model does not change the above problem formulation and so the solver.

The disclosed algorithm is not only limited to AoA and RSS but is extensible to account for other dimensions of channel parameters such as time of flight (ToF), provided they are available. In one embodiment, the disclosed method includes: first, the target/object/device listens to wireless signals from N base stations (BSs) (N>=3); second, a computing unit on the target (or some server) calculates feasible region based on the wireless signals features from the N base stations (based on e.g., AoA, ToF, RSS, etc.); third, the computing unit calculates tie target position by solving an optimization problem, wherein the objective function is the expected likelihood probability, such that the position is inside the feasible region. The optimization problem is solved by utilizing RSS and AoA, which is novel, e.g. considering the gain as a function of direction G_i ($\theta$_i).

Figure 17:
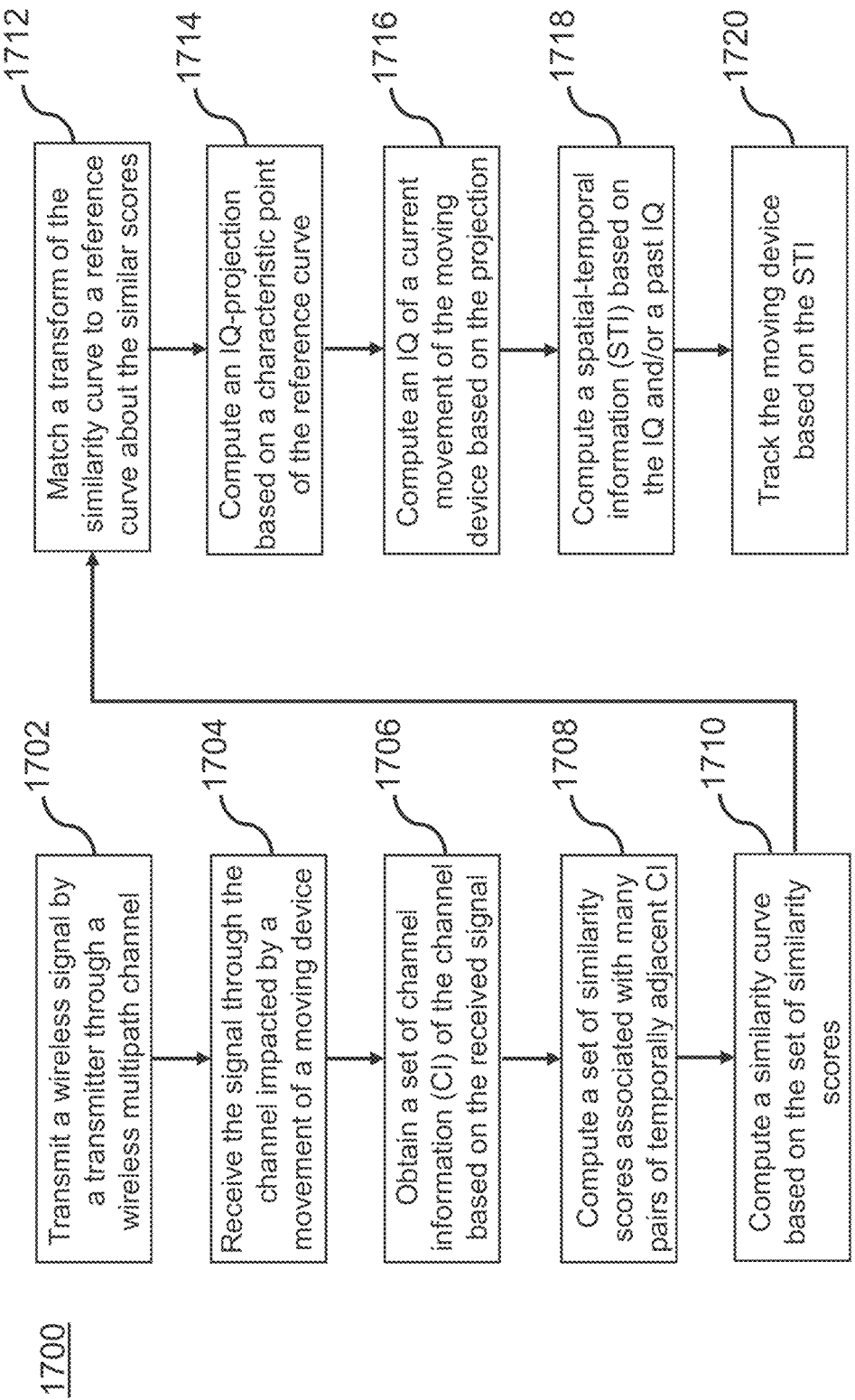
FIG. 17 illustrates a flow chart of an exemplary method for wireless object tracking, according to some embodiments of the present teaching.

FIG. 17 illustrates a flow chart of an exemplary method 1700 for wireless object tracking, according to some embodiments of the present teaching. At operation 1702, a wireless signal is transmitted by a transmitter through a wireless multipath channel. At operation 1704, the wireless signal is received through the wireless multipath channel by a receiver, where the wireless multipath channel is impacted by a moving device, which is one of the transmitter and the receiver. At operation 1706, a set of channel information (CI) of the channel is obtained based on the received wireless signal. At operation 1708, a set of similarity scores associated with many pairs of temporally adjacent CI is computed. At operation 1710, a similarity curve is computed based on the set of similarity scores.

At operation 1712, a transform of the similarity curve is matched to a reference curve about the similar scores. At operation 1714, an IQ-projection is computed based on a characteristic point of the reference curve matched to the similarity curve. At operation 1716, an IQ of a current movement of the moving device is computed based on the IQ-projection. At operation 1718, a spatial-temporal information (STI) of the moving device is computed based on the IQ and/or a past IQ. At operation 1720, the moving device is tracked based on the STI. According to various embodiments, the order of the operations in FIG. 17 may be changed.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks, and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous

We claim:

1. A tracking system, comprising:
a transmitter configured for transmitting a first wireless signal through a wireless multipath channel;
a receiver configured for receiving a second wireless signal through the wireless multipath channel between the transmitter and the receiver, wherein:
the transmitter is a located device at a known location,
the receiver is a moving device,
the second wireless signal differs from the first wireless signal due to the wireless multipath channel which is impacted by a movement of the moving device,
at least one of the transmitter and the receiver comprises a number of antennas,
the number is larger than or equal to a threshold that is at least two; and
a processor physically coupled to the moving device and configured for:
obtaining a plurality of time series of channel information (CI) of the wireless multipath channel based on the second wireless signal received from the transmitter, wherein each CI of the wireless multipath channel is one of: a channel state information (CSI), a channel impulse response (CIR), or a channel frequency response (CFR),
computing an intermediate quantity (IQ) comprising a moving distance of a current movement of the moving device, wherein the moving distance is computed based on the plurality of time series of CI (TSCI) and a beam strength, wherein the beam strength is a function of a radial distance along a beam axis, wherein the beam axis is orthogonal to an antenna axis associated with the number of antennas,
computing a spatial-temporal information (STI) of the moving device based on at least one of: the IQ or a past IQ, and
tracking the moving device based on the STI.

2. The tracking system of claim 1, wherein:
the threshold is one of: 10, 16, 20;
each of the plurality of TSCI is associated with a pair of a transmit antenna on the transmitter and a receive antenna on the receiver; and
the located device is stationary at a fixed location or moving at locations known to the processor.

3. The tracking system of claim 1, wherein the STI comprises at least one of:
a location, coordinate, horizontal location, map coordinate, vertical location, height, map location, locationing, relative location, navigation, guidance,
a direction, angle, bearing, base distance, distance, directional distance, radial distance, range, length, area, region, volume, capacity, displacement, movement, speed, velocity, acceleration, rotational speed, angular speed, rotational acceleration, angular acceleration, motion cycle, motion appearance, motion re-appearance, gait cycle, presence, period, frequency, count, quantity, rhythm, breathing rate, heart rate, motion type, motion classification, motion characteristics, motion signature, motion state, fall, danger, intrusion, gesture, expression, target motion, body expression, activity, motion sequence, event, timed event, sudden motion, transient motion, impulsive motion, periodic motion, period of the periodic motion, frequency of the periodic motion, occurrence rate, occurrence timing,
a timing, timestamp, starting time, ending time, time period, time window, sliding time window, time trend, daily trend, history, frequency trend, spatial-temporal trend, change, spatial-temporal change, and another analytics.

4. The tracking system of claim 1, wherein:

the moving device is moving with an object;

the processor is further configured for tracking an object based on tracking the moving device; and tracking at least one of the object and the moving device comprises at least one of:

determining a map location, tracking the location, tracking another analytics, navigating, guiding movement along a trajectory, guiding the movement to avoid an obstacle, tracking motion, tracking behavior, identifying behavior, detecting presence, detecting motion, recognizing motion, detecting vital sign, detecting periodic motion, detecting breathing, detecting heartbeat, monitoring breathing, monitoring heartbeat, detecting event, detecting fall-down, detecting intrusion, counting, recognizing gesture, recognizing activity, recognizing state, detecting deviation of regular activity, detecting anomaly, monitoring timing, monitoring trends, generating a presentation of at least one of: the IQ, the STI, the map location, the location, the analytics, the navigation, the trajectory, the guidance, the obstacle, the movement, the behavior, the identification, the presence, the motion, the vital sign, the periodic motion, the breathing, the heartbeat, the event, the fall-down, the intrusion, the counting, the gesture, the activity, the state, the deviation, the anomaly, the timing, the trends, generating a presentation of the location, displaying graphically on a user device, and generating another presentation.

5. The tracking system of claim 1, wherein the IQ comprises at least one of:

a time stamp, starting time, ending time, time code, timing, time period, time duration, frequency, period, cycle, rhythm, pace, count, indicator, occurrence, state, set, a location, distance, displacement, direction, speed, velocity, acceleration, angular distance, angular speed, angular acceleration, change of location, change of direction, change of speed, change of acceleration, proximity, presence, absence, appearance, disappearance, location, statistics, motion statistics, breathing statistics, distance statistics, speed statistics, acceleration statistics, metric, l_k distance metric, l_0 distance metric, l_1 distance metric, absolute distance metric, l_2 distance metric, Euclidean distance metric, l_infinity distance metric, path, volume, mass, surface area, shape, posture, energy, trend, time sequence, label, tag, class, category, time profile, time quantity, frequency quantity, transient quantity, incremental quantity, instantaneous quantity, averaged quantity, locally averaged quantity, filtered quantity, quantity change, repeating quantity, an event, recognized event, recognized motion sequence, gesture, hand gesture, finger gesture, wrist gesture, elbow gesture, arm gesture, shoulder gesture, head gesture, facial gesture, neck gesture, waist gesture, leg gesture, foot gesture, a maximum, minimum, constrained maximum, constrained minimum, local maximum, local minimum, first local maximum, first local minimum, k-th local maximum, k-th local minimum, average, weighted average, percentile, mean, median, mode, trimmed mean, conditional mean, conditional statistics, ordered statistics, variance, skewness, kurtosis, moment, high order moment, cumulant, correlation, covariance, co-skewness, co-kurtosis, first order statistics, second order statistics, third order statistics, high order statistics, robust quantity, argument associated with another quantity, a feature of CI, complex component of CI, magnitude of the complex component, phase of the complex component, function of the complex component of the CI, polynomial of the magnitude of the complex component, square of the magnitude of the complex component, time series of the feature of CI, autocorrelation function of the feature of CI, and a function of another quantity.

6. The tracking system of claim 1, wherein the processor is further configured for:

obtaining a supplementary quantity (SQ), wherein the SQ comprises at least one of:

an additional IQ of the current movement of the moving device computed based on an additional plurality of TSCI extracted from an additional wireless signal transmitted between an additional transmitter and an additional receiver, an additional quantity (AQ) of the current movement of the moving device needed for STI computation but not in IQ, wherein the AQ comprises at least one of: a direction, distance, speed, acceleration, map, movement constraint, boundary, a sensor quantity from at least one of: a sensor, inertia sensor, accelerometer, gyroscope, magnetometer, GPS device, infrared sensor, radar, proximity sensor, ambient light sensor, microphone, camera, touchscreen sensor, fingerprint sensor, pedometer, barcode sensor, QR code sensor, barometer, heart-rate sensor, thermometer, humidity sensor, and Geiger counter, a past quantity associated with at least one of: the STI, the IQ, the SQ, the additional IQ, the AQ, and the sensor quantity, and an initial quantity associated with at least one of: the STI, the IQ, the SQ, the additional IQ, the AQ, and the sensor quantity; and computing the STI based on both the IQ and the SQ.

7. The tracking system of claim 1, wherein the processor is further configured for:

computing an IQ-projection based on the plurality of TSCI; and computing the IQ base on the IQ-projection, wherein the IQ-projection is a projection of the IQ onto at least one of:

an along-beam direction as a baseline, a cross-beam direction orthogonal to the baseline, a direction relative to the baseline, a direction of at least one antenna of the located device, a direction of at least one antenna of the moving device, a direction of the number of antennas, wherein the baseline is determined based on the at least one antenna of the moving device and the at least one antenna of the located device and is time-varying as the moving device moves, wherein the baseline comprises at least one of:

a line between a region associated with the at least one antenna of the moving device and a region associated with the at least one antenna of the located device, the line being at least one of: a curve, a path, a transmission path, a piecewise straight and linear line, a locally straight line, a locally linear line, a straight line, a surface connecting a region associated with the at least one antenna of the moving device and a region associated with the at least one antenna of the located device, the surface being at least one of: a nonlinear surface, a manifold, a linear surface, a locally linear surface, a hyperplane, a 1-dimensional plane, a 2-dimensional plane, and a higher-dimensional plane, a line connecting an antenna of the moving device and an antenna of the located device, a line connecting an antenna of the moving device and a characteristic location of the at least one antenna of the located device, a line connecting an antenna of the moving device and a center of the at least one antenna of the located device, a line connecting a characteristic location of the at least one antenna of the moving device and an antenna of the located device, a line connecting a characteristic location of the at least one antenna of the moving device and a characteristic location of the at least one antenna of the located device, a line connecting a characteristic location of the at least one antenna of the moving device and a center of the at least one antenna of the located device, a line connecting a center of the at least one antenna of the moving device and an antenna of the located device, a line connecting a center of the at least one antenna of the moving device and a characteristic location of the at least one antenna of the located device, and a line connecting a center of the at least one antenna of the moving device and a center of the at least one antenna of the located device.

8. The tracking system of claim 5, wherein the processor is further configured for:

computing a set of similarity scores associated with many pairs of temporally adjacent CI of the plurality of TSCI, each pair comprising two temporally adjacent CI of one of the plurality of TSCI; and computing the IQ based on the similarity scores, wherein each of the similarity scores comprises at least one of: a time reversal resonating strength (TRRS), a correlation, a cross-correlation, an auto-correlation, an auto-correlation function (ACF), an auto-correlation focusing strength (ACFS), a covariance, a cross-covariance, an auto-covariance, an inner product of two vectors, a distance score, norm, metric, statistical characteristics, a discrimination score, a metric, a neural network output, a deep learning network output, and another measure of similarity, wherein computing the set of similarity scores comprises at least one of: a similarity computation, machine learning, training, discrimination, weighted averaging, preprocessing, denoising, signal conditioning, filtering, time correction, timing compensation, phase offset compensation, transformation, component-wise operation, feature extraction, finite state machine, and another operation.

9. The tracking system of claim 8, wherein the processor is further configured for:

computing a similarity curve based on the set of similarity scores; and computing the IQ based on at least one of: the similarity curve and the set of similarity scores.

10. The tracking system of claim 9, wherein the processor is further configured for:

computing an IQ-projection based on at least one of: the similarity curve and the set of similarity scores, wherein the IQ-projection is a projection of the IQ onto a direction; and computing the IQ based on the IQ-projection.

11. The tracking system of claim 10, wherein:

computing the IQ-projection comprises matching a transform of the similarity curve to a reference curve associated with the set of similar scores, the transform is associated with at least one of: a scalar function, a 1-dimensional function, a vector function, a multi-variate function, a linear function, a nonlinear function, a magnitude, a phase, a polynomial, a function of the magnitude, a function of the phase, an exponential function, a logarithmic function, a trigonometric function, an inverse function, an absolute value, a thresholding function, a step function, an indicator function, and another transform, and the reference curve comprises at least one of: a trigonometric function, a tangent function, a sine function, a cosine function, an inverse function, an inverse trigonomic function, an arc-tangent function, an arc-sine function, an arc-cosine function, a hyperbolic tangent function, a sinc function, a logarithmic function, an exponential function, a parabolic function, an elliptic function, a hyperbola function, a polynomial, a Taylor series, an asympototic series, another series, a special function, Bessel function, sigmoid function, logistic function, generalized logistic function, error function, complementary error function, Gauss error function, Gundermannian function, smoothstep function, Gaussian function, generalized Gaussian function, hyperbolic function, hypergeometric function, Blasius function, de Brujin function, Buchstab function, Dawson function, Hankel function, Heine function, zeta function, Kelvin function, Riccati-Bessel function, Riemann zeta-function, Struve function, Wangerein function, Weber function, Weierstrass function, Whittaker function, a first function of a second function, and another function.

12. The tracking system of claim 11, wherein the processor is further configured for:

determining that the transform of the similarity curve is matched to a characteristic point of the reference curve, wherein the characteristic point comprises at least one of:

a local maximum, local minimum, local extremum, local extremum with positive argument, first local extremum with positive argument, n^th local extremum with positive argument, local extremum with negative argument, first local extremum with negative argument, n^th local extremum with negative argument, constrained maximum, constrained minimum, constrained extremum, maximum slope, minimum slope, local maximum slope, local minimum slope, local maximum slope with positive argument, local minimum slope with positive argument, constrained maximum slope, constrained minimum slope, maximum higher order derivative, minimum higher order derivative, constrained higher order derivative, zero-crossing, a distance between two zero-crossing, zero crossing with positive argument, n^th zero crossing with positive argument, zero crossing with negative argument, n^th zero crossing with negative argument, constrained zero-crossing, zero-crossing of slope, zero-crossing of higher order derivative, and another characteristics, wherein the IQ-projection is computed based on at least one of:
the characteristic point of the reference curve,
a property of the characteristic point of the reference curve, wherein the property comprises at least one of: a time, a time offset, a timing, a time duration, and a time range,
an argument of the reference curve to achieve the characteristic point of the reference curve,
a time offset associated with the characteristic point of the reference curve,
a length of a line between a region with the at least one antenna of the located device and a region with the at least one antenna of the moving device,
a length of a line on a surface connecting a region associated with the located device and a region associated with the moving device,
a distance between the located device and the moving device,
a distance between the located device and the moving device along the baseline,
a length of a segment of the baseline,
an angle between the baseline and the number of antennas,
an angle between the baseline and a direction of the at least one antenna of the moving device,
an angle between the baseline and a direction of the at least one antenna of the located device,
an angle between a direction of the at least one antenna of the moving device and a direction of the at least one antenna of the located device,
an angle between a direction of the current movement of the moving device and the baseline,
an angle between a direction of the current movement of the moving device and a direction of the at least one antenna of the moving device,
an angle between a direction of the current movement of the moving device and a direction of the at least one antenna of the located device,
an effective aperture of the number of antennas,
a scaling factor based on the angle between the baseline and the number of antennas,
a scaling factor comprising a trigonometric function of the angle between the baseline and the number of antennas,
a scaling factor comprising a cosine of the angle between the baseline and the number of antennas,
the effective aperture of the number of antennas scaled by a scaling factor,
the distance between the located device and the moving device scaled by a scaling factor, and
a carrier frequency of the second wireless signal.

13. The tracking system of claim 12, wherein:
the IQ-projection is computed based on a time quantity associated with the similarity curve, the transform of the similarity curve, the reference curve, and the characteristic point of the reference curve; and
the time quantity comprises at least one of:
a timing, a time stamp, a current time, a previous time, a sliding time,
a time associated with the matching of the characteristic point of the reference curve to the transform of the similarity curve,
a time associated with a matching of another characteristic point of the reference curve to the transform of the similarity curve,
a time associated with a matching of at least one of: the characteristic point, the another characteristic point, and yet another characteristic point of the reference curve to a transform of a past similarity curve,
a time associated with at least one of: a condition, a matching, a state, a status, a situation, and an event,
a timing associated with one of: a first condition, a first matching, a first state, a first status, a first situation, and a first event, and one of: a second condition, a second matching, a second state, a second status, a second situation, and a second event,
a time offset, a time difference, a time duration, a time period, an incremental time, and a timed quantity.

14. The tracking system of claim 5, wherein the processor is further configured for:
computing a speed based on at least one of:
a distance included in the IQ,
a derivative of the distance,
the distance divided by a duration taken to traverse the distance,
the distance divided by an incremental time, and
a fraction of an incremental distance associated with the distance over an associated increment time.

15. The tracking system of claim 14, wherein the processor is further configured for:
computing an acceleration based on at least one of:
the distance,
a derivative of the derivative of the distance,
a second derivative of the distance,
a derivative of the speed,
the speed divided by the duration taken to traverse the distance,
a change in speed divided by a duration taken to achieve the speed change,
a change in speed divided by a duration associated with the speed change,
a change in speed in a time interval divided by a duration of the time interval,
a fraction of: (a) a difference between the speed and a previous speed, over (b) the duration taken to traverse the distance,
a fraction of: (c) a difference between the speed and a previous speed, over (d) a duration associated with the speed and the previous speed, and
a fraction of: (e) a difference between the speed and a previous speed, over (f) a difference between a time associated with the speed and another time associated with the previous speed.

16. The tracking system of claim 14, wherein the processor is further configured for:
computing a distance-projection which is a projection of the distance onto a direction;
computing the distance based on the distance-projection;
computing a speed-projection which is a projection of the speed onto the direction;
computing the speed based on the speed-projection,
wherein the speed-projection is computed based on at least one of:
the distance-projection,
a derivative of the distance-projection,
a projection of a derivative of the distance onto the direction, and
a projection of the speed onto the direction.

17. The tracking system of claim 7, wherein the processor is further configured for:

resolving an ambiguity of at least one of: the IQ, the IQ-projection, and the STI, of the moving device based on at least one of:
an additional plurality of TSCI extracted from an additional wireless signal transmitted between the transmitter and an additional receiver,
an additional plurality of TSCI extracted from an additional wireless signal transmitted between an additional transmitter and the receiver,
an additional plurality of TSCI extracted from an additional wireless signal transmitted from an additional located device to the moving device,
an additional plurality of TSCI extracted from an additional wireless signal transmitted from the moving device to an additional located device,
a plurality of sets of TSCI, wherein each set of TSCI is extracted from a respective wireless signal transmitted between the transmitter and a respective one of a plurality of heterogeneous receivers,
a plurality of sets of TSCI, wherein each set of TSCI is extracted from a respective wireless signal transmitted from a respective one of a plurality of heterogeneous transmitters to the receiver,
a plurality of sets of TSCI, wherein each set of TSCI is extracted from a respective wireless signal transmitted between a respective one of a plurality of located devices and the moving device,
the IQ, the IQ-projection, the STI,
another IQ computed based on at least one of the above TSCI,
another IQ-projection based on at least one of the above TSCI,
another STI based on at least one of the above TSCI, and at least one supplementary quantity (SQ).

18. The tracking system of claim 1, wherein the processor is further configured for, for each of the plurality of TSCI:
determining a reference CI of the respective TSCI associated with a time t associated with a current movement of the moving device;
computing a series of similarity scores associated with the time t, each similarity score based on the reference CI, and one of a series of temporally adjacent CI of the respective TSCI within a time window around the time t; and
determining a respective similarity curve associated with the series of similarity scores,
wherein the STI of the moving device is computed based on at least one of:
a first combined characteristic point of a combined curve obtained by combining a large number of similarity curves, each similarity curve associated with a respective TSCI and its respective series of similarity scores,
a second combined characteristic point obtained by combining a large number of characteristic points each of a respective similarity curve associated with a respective TSCI and its respective series of similarity scores,
wherein at least one of a characteristic point and the combined characteristic point comprises at least one of:
a local maximum, local minimum, local extremum, local extremum with positive argument, first local extremum with positive argument, n^th local extremum with positive argument, local extremum with negative argument, first local extremum with negative argument, n^th local extremum with negative argument, constrained maximum, constrained minimum, constrained extremum, slope, derivative, higher order derivative, maximum slope, minimum slope, local maximum slope, local minimum slope, local maximum slope with positive argument, local minimum slope with positive argument, constrained maximum slope, constrained minimum slope, maximum higher order derivative, minimum higher order derivative, constrained higher order derivative, zero-crossing, a distance between two zero-crossing, zero crossing with positive argument, n^th zero crossing with positive argument, zero crossing with negative argument, n^th zero crossing with negative argument, constrained zero-crossing, zero-crossing of slope, zero-crossing of higher order derivative, and/or another characteristics;
wherein the large number of similarity curves and/or the large number of characteristic points are combined based on:
an average, weighted average, mean, median, mode, arithmetic mean, geometric mean, harmonic mean, weighted mean, trimmed mean, weighted median, percentile, maximal-ratio combining (MRC), principal component analysis (PCA), PCA with different kernels, independent component analysis (ICA), eigen-decomposition, Fisher linear discriminant, vector quantization, machine learning, supervised learning, unsupervised learning, clustering, self-organizing maps, auto-encoder, neural network, deep neural network, and another method.

19. The tracking system of claim 1, wherein the processor is further configured for:
combining at least two of the plurality of TSCI to form a time series of compound CI, each compound CI comprising a CI from each of the at least two TSCI;
determining a reference compound CI associated with a time t associated with a current movement of the moving device;
computing a series of compound similarity scores associated with the time t, wherein each compound similarity score is computed based on the reference compound CI and one of a series of temporally adjacent compound CI within a time window around the time t; and
determining a similarity curve associated with the series of compound similarity scores, wherein the STI of the moving device is computed based on a characteristic point of the similarity curve.

20. The tracking system of claim 1, wherein the processor is further configured for:
computing at least one heterogeneous time series of compound CI (CCI), wherein:
each heterogeneous time series of CCI (TSCCI) is associated with at least one respective TSCI,
each CCI of the TSCCI comprises a weighted CI from each of the at least one respective TSCI, and
the weighted CI is weighted by a respective weight associated with the respective TSCI; and
for each heterogeneous TSCCI:
determining a reference CCI of the TSCCI associated with a time t associated with a current movement of the moving device,
computing a series of compound similarity scores associated with the time t, wherein each compound similarity score is computed based on the reference CCI and a temporally adjacent CCI of the TSCCI within a time window around the time t, and determining a similarity curve associated with the series of compound similarity scores,
wherein the STI of the moving device is computed based on at least one of:
  a first combined characteristic point of a combined curve obtained by combining at least one similarity curve, each of which being associated with a respective TSCCI and its respective series of compound similarity scores,
  a second combined characteristic point obtained by combining at least one characteristic point, each of which being associated with a respective TSCCI and its respective series of compound similarity scores,
wherein at least one of a characteristic point and the combined characteristic point comprises at least one of:
  a local maximum, local minimum, local extremum, local extremum with positive argument, first local extremum with positive argument, n^th local extremum with positive argument, local extremum with negative argument, first local extremum with negative argument, n^th local extremum with negative argument, constrained maximum, constrained minimum, constrained extremum, slope, derivative, higher order derivative, maximum slope, minimum slope, local maximum slope, local minimum slope, local maximum slope with positive argument, local minimum slope with positive argument, constrained maximum slope, constrained minimum slope, maximum higher order derivative, minimum higher order derivative, constrained higher order derivative, zero-crossing, a distance between two zero-crossing, zero crossing with positive argument, n^th zero crossing with positive argument, zero crossing with negative argument, n^th zero crossing with negative argument, constrained zero-crossing, zero-crossing of slope, zero-crossing of higher order derivative, and/or another characteristics,
wherein the at least one similarity curve and/or the at least one characteristic point are combined based on:
  an average, weighted average, mean, median, mode, arithmetic mean, geometric mean, harmonic mean, weighted mean, trimmed mean, weighted median, percentile, maximal-ratio combining (MRC), principal component analysis (PCA), PCA with different kernels, independent component analysis (ICA), eigen-decomposition, Fisher linear discriminant, vector quantization, machine learning, supervised learning, unsupervised learning, clustering, self-organizing maps, auto-encoder, neural network, deep neural network, and/or another method.

21. The tracking system of claim 1, wherein the processor is further configured for:
  computing a similarity score associated with a current movement of the moving device based on the plurality of TSCI; and
  determining the moving device to be stationary and the current movement to be a null movement when the similarity score is greater than a threshold.

22. The tracking system of claim 1, wherein the processor is further configured for:
  preprocessing the plurality of TSCI, wherein the preprocessing comprises at least one of: doing nothing, denoising, smoothing, conditioning, enhancement, restoration, feature extraction, weighted averaging, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, Fourier transform, Laplace, Hadamard transform, transformation, decomposition, selective filtering, adaptive filtering, derivative, first order derivative, second order derivative, higher order derivative, integration, zero crossing, indicator function, absolute conversion, convolution, multiplication, division, another transform, another processing, another filter, a third function, and another preprocessing; and
  computing a similarity score based on the preprocessed plurality of TSCI, wherein the STI is computed based on at least one of: the similarity score and the preprocessed TSCI,
wherein the similarity score comprises at least one of: a time reversal resonating strength (TRRS), a correlation, a cross-correlation, an auto-correlation, a covariance, a cross-covariance, an auto-covariance, an inner product of two vectors, a distance score, a discriminating score, a metric, a neural network output, a deep learning network output, and another score,
wherein each CI of the wireless multipath channel comprises at least one of:
  a signal strength, signal amplitude, signal phase, an attenuation of the wireless signal through the wireless multipath channel, a received signal strength indicator (RSSI), a channel state information (CSI), channel impulse response (CIR), channel frequency response (CFR), an equalizer information, a time domain transfer function, a frequency domain transfer function,
  information associated with at least one of: a frequency band, a frequency signature, a frequency phase, a frequency amplitude, a frequency trend, a frequency characteristics, a frequency-like characteristics, an orthogonal decomposition characteristics, and a non-orthogonal decomposition characteristics,
  information associated with at least one of: a time period, a time signature, a time amplitude, a time phase, a time trend, and a time characteristics, information associated with at least one of: a time-frequency partition, a time-frequency signature, a time-frequency amplitude, a time-frequency phase, a time-frequency trend, and a time-frequency characteristics, information associated with a direction, an angle of arrival, an angle of a directional antenna, and a phase, and another CI.

23. The tracking system of claim 1, wherein the processor is further configured for:
  determining an initial location of the moving device at an initial time based on an additional wireless signal transmitted from an additional transmitter to an additional receiver through an additional wireless multipath channel at the initial time, wherein the additional receiver is close to the moving device and moves with the moving device; and
  computing a location of the moving device based on the initial location at the initial time prior to a current movement of the moving device, wherein the moving device is tracked based on the location of the moving device, wherein the initial location is determined to be a known location associated with the additional wireless signal based on at least one of:
  obtaining an identification of at least one of: the additional transmitter and the additional wireless signal received at the initial time,
  associating the identification with the known location based on a location database, and
  sending a query to a query device, wherein the query device contains a location database and an associated query service based on the location database.

24. The tracking system of claim 23, wherein:
the additional transmitter is stationary and comprises a directional antenna such that the additional wireless signal is steered towards a target area; the additional receiver receives the additional wireless signal when the additional receiver is in the target area; and
the known location is at least one of:
  an installation location of the additional transmitter,
  a location near the installation location,
  the target area associated with the additional wireless signal,
  a location near the target area, and
  a location that is near the target area and adaptively determined based on at least one of: a height of the moving device and a likelihood of the height.

25. The tracking system of claim 23, wherein:
the additional transmitter is moving;
a previous location of the additional transmitter is known; and
the location database comprises an updated location of the additional transmitter.

* * * * *